United States Patent
Bauknecht et al.

(10) Patent No.: US 7,651,432 B2
(45) Date of Patent: Jan. 26, 2010

(54) MULTI-STAGE AUTOMATIC TRANSMISSION

(75) Inventors: Gert Bauknecht, Friedrichshafen (DE); Peter Ziemer, Tettnang (DE); Armin Gierling, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 464 days.

(21) Appl. No.: 11/659,465

(22) PCT Filed: Aug. 8, 2005

(86) PCT No.: PCT/EP2005/008598

§ 371 (c)(1),
(2), (4) Date: Apr. 11, 2007

(87) PCT Pub. No.: WO2006/015843

PCT Pub. Date: Feb. 16, 2006

(65) Prior Publication Data

US 2007/0293363 A1    Dec. 20, 2007

(30) Foreign Application Priority Data

Aug. 6, 2004  (DE) .................. 10 2004 038 279

(51) Int. Cl.
*F16H 3/44* (2006.01)
(52) U.S. Cl. .................. 475/284; 475/288
(58) Field of Classification Search .......... 475/271–291
See application file for complete search history.

(56) References Cited

U.S. PATENT DOCUMENTS

| | | | |
|---|---|---|---|
| 5,106,352 A | 4/1992 | Lepelletier | |
| 6,139,463 A | 10/2000 | Kasuya et al. | |
| 6,634,980 B1 | 10/2003 | Ziemer | |
| 6,887,178 B2 * | 5/2005 | Miyazaki et al. ............ | 475/276 |
| 6,929,576 B2 * | 8/2005 | Armstrong et al. .......... | 475/278 |
| 7,354,376 B2 * | 4/2008 | Rihn et al. .................. | 475/284 |
| 2002/0142880 A1 | 10/2002 | Hayabuchi et al. | |
| 2002/0183154 A1 | 12/2002 | Ziemer | |
| 2003/0083173 A1 | 5/2003 | Miyazaki et al. | |
| 2004/0072648 A1 | 4/2004 | Dreibholz et al. | |
| 2004/0116238 A1 | 6/2004 | Ziemer | |

(Continued)

FOREIGN PATENT DOCUMENTS

DE    199 49 507    4/2001

(Continued)

*Primary Examiner*—Roger Pang
(74) *Attorney, Agent, or Firm*—Davis & Bujold, P.L.L.C.

(57) ABSTRACT

A multi-stage automatic transmission comprising a drive shaft (AN), a double planetary front mounted gear set (VS), a main gear set (HS) which is embodied as a coupled planetary gear set comprising at least three non-coupled input elements and an output element, in addition to six switch elements (A to F). Engagement of the six switch elements (A to F) takes place in pairs thereby enabling at least eight forward gears to be shifted. One element of the front mounted gear set (VS) is determined on a housing (GG). The second and the sixth shift element (B, F) form a component which is arranged on the side of the front mounted gear set (VS) which is oriented away from the main gear set (HS) and is arranged in an at least partially axial manner, between the front mounted gear set (VS) and a housing wall (GW), which is secured to the gear housing and which extends in a radial manner.

42 Claims, 25 Drawing Sheets

U.S. PATENT DOCUMENTS

2005/0085332 A1    4/2005    Ziemer

FOREIGN PATENT DOCUMENTS

| | | |
|---|---|---|
| DE | 101 15 987 | 10/2002 |
| DE | 102 50 373 | 7/2003 |
| DE | 102 10 348 | 10/2003 |
| DE | 102 21 095 | 7/2004 |
| DE | 103 18 565 | 11/2004 |
| EP | 0 997 663 | 5/2000 |
| EP | 1 375 962 | 1/2004 |
| EP | 1 510 728 | 3/2005 |
| JP | 2001182785 | 7/2001 |
| JP | 2001 349395 | 12/2001 |
| JP | 2002 295 609 | 10/2002 |
| JP | 2002 323 098 | 11/2002 |
| WO | WO 03/087624 | 10/2003 |
| WO | WO 03/095865 | 11/2003 |
| WO | WO 2005/026579 | 3/2005 |
| WO | WO 2005/100819 | 10/2005 |

\* cited by examiner

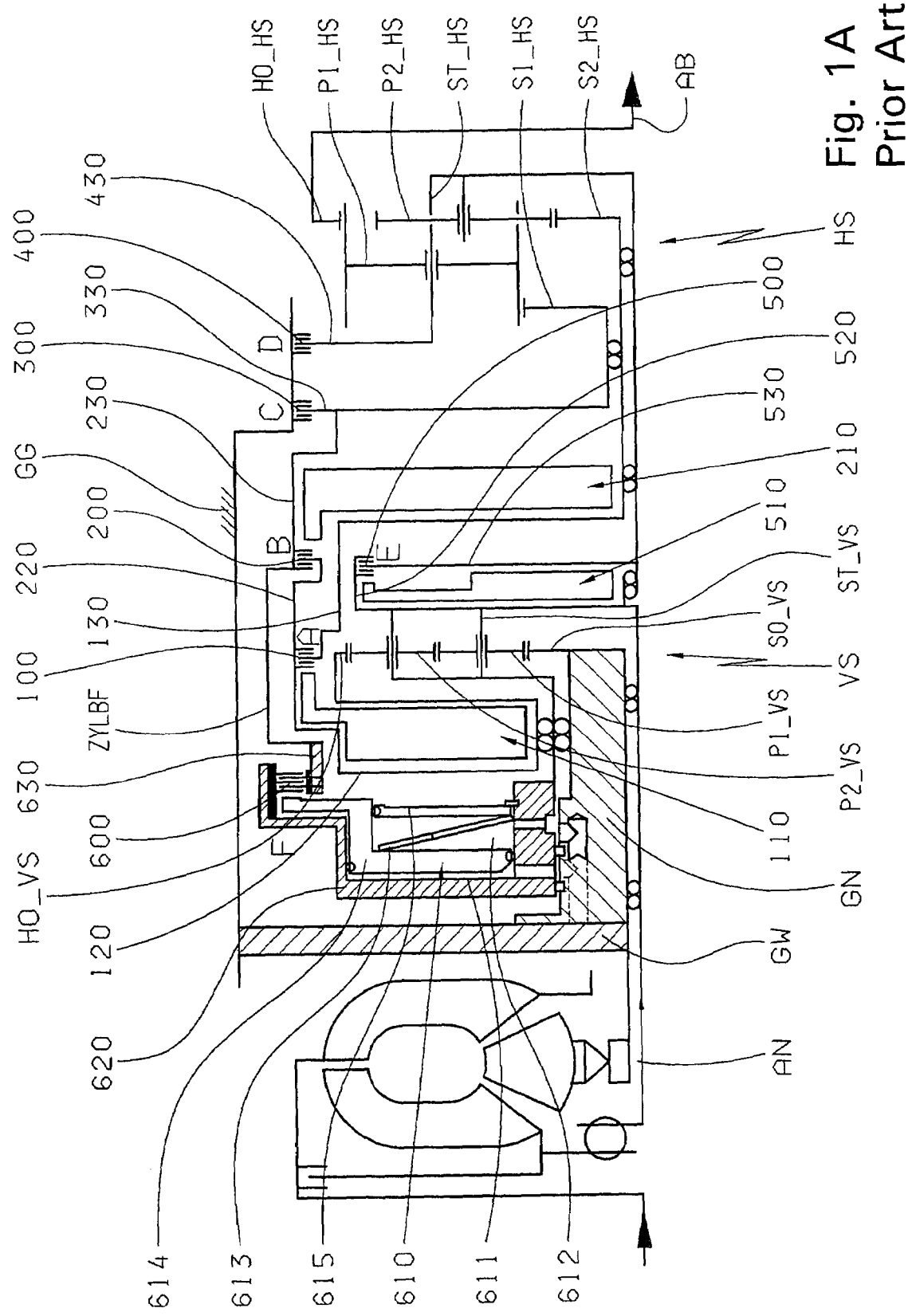

| Gear | Closed Shifting Element | | | | | |
|---|---|---|---|---|---|---|
| | A | B | C | D | E | F |
| 1 | • | | | • | | |
| 2 | • | | • | | | |
| 3 | • | • | | | | |
| 4 | • | | | | | • |
| 5 | • | | | | • | |
| 6 | | | | | • | • |
| 7 | | • | | | • | |
| 8 | | | • | | • | |
| R1 | | • | | • | | |
| R2 | | | | • | | • |

Fig. 1B
Prior Art

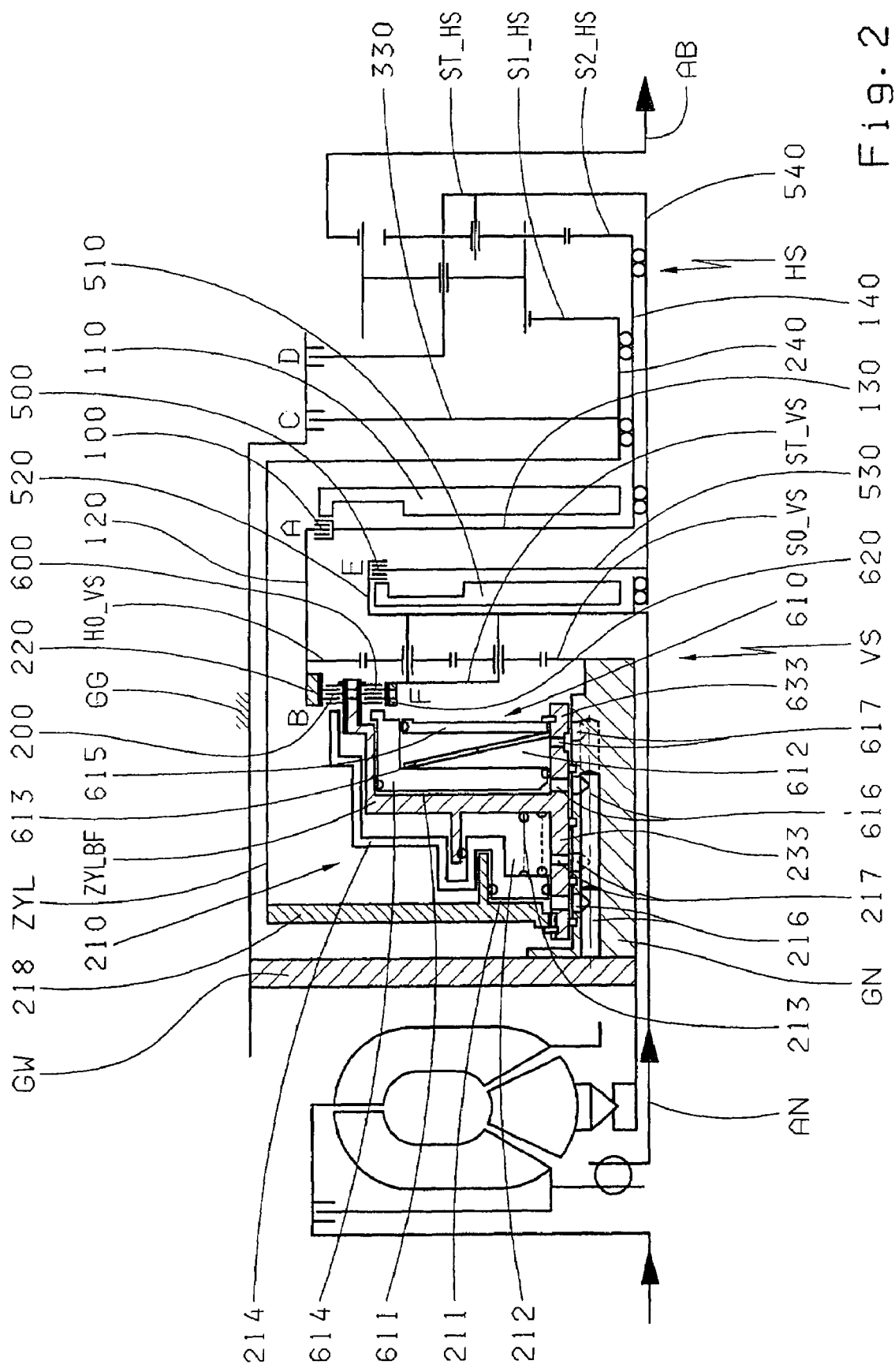

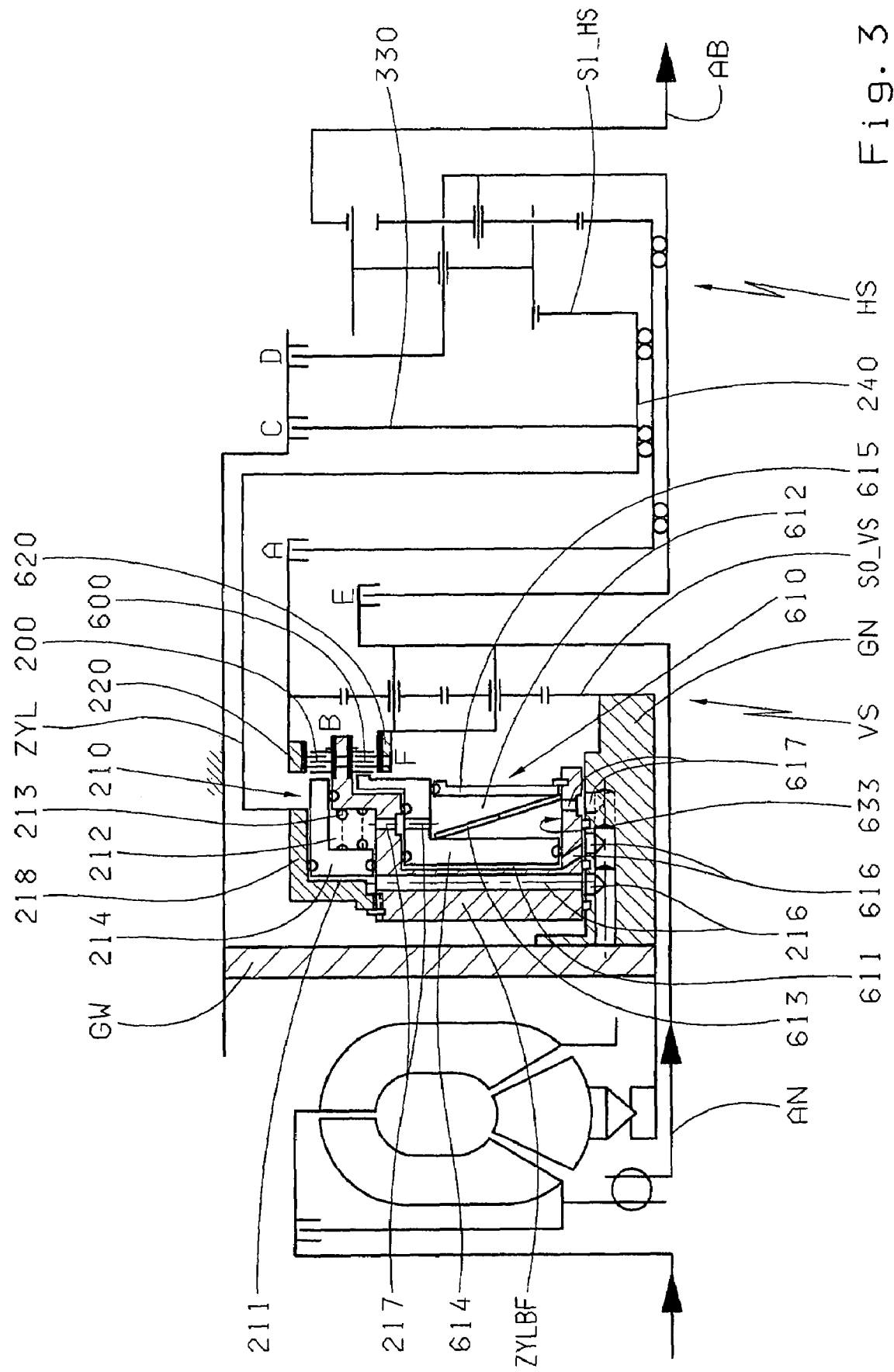

MULTI-STAGE AUTOMATIC TRANSMISSION

This application is a national stage completion of PCT/EP2005/008598 filed Aug. 8, 2005, which claims priority from German Application Serial No. 10 2004 038 279.4 filed Aug. 6, 2004.

FIELD OF THE INVENTION

The invention concerns a multi-stage automatic transmission.

BACKGROUND OF THE INVENTION

Automatic transmissions with several gears that can be engaged without range change are widely known. From U.S. Pat. No. 5,106,352 a 6-gear automatic transmission is known, in which a simple transfer planetary gearset is arranged coaxially with a two-carrier, four-shaft main gearset made as a Ravigneaux planetary gearset and five shift elements are provided. The transfer planetary gearset is made as a non-shiftable step-down stage with a sun gear fixed to a transmission housing, whose output speed is smaller than the speed of a drive input shaft of the automatic transmission and can be transferred via two clutches to two different elements of the main gearset, and one of the two elements can additionally be fixed relative to the transmission housing by a first brake. The input element of the main gearset, which can optionally be connected with the output element of the transfer planetary gearset or fixed relative to the transmission housing, will be referred to in what follows as the "first input element of the main gearset". Correspondingly, the other input element of the main gearset will be called the "second input element of the main gearset" in what follows. The speed of the drive input shaft can be transferred by a third clutch to a third input element of the main gearset, and this third element can also be fixed relative to the transmission housing by a second brake. A fourth element of the main gearset forms the output element of the main gearset and is exclusively in fixed connection with a drive output shaft of the automatic transmission.

Several arrangements of component, alternative to this automatic transmission described in U.S. Pat. No. 5,106,352, are known, for example from U.S. Pat. No. 6,139,463 and DE 102 10 348 A1.

In the unpublished German patent application DE 10 221 095.0 by the present applicant a further development of the 6-gear automatic transmission known from U.S. Pat. No. 5,106,352, into a 7-gear automatic transmission, is described. Compared with U.S. Pat. No. 5,106,352, the transfer planetary gearset is made as a simple, shiftable 'positive' planetary gearset of double-planetary structure and an additional, sixth shift element is added. A carrier of the transfer planetary gearset forms the input element of the transfer planetary gearset in fixed connection with the drive input shaft of the automatic transmission. In contrast to U.S. Pat. No. 5,106,352 a sun gear of the transfer planetary gearset can be fixed relative to a transmission housing by the sixth shift element. Correspondingly, an ring gear of the transfer planetary gearset forms the output element of the transfer planetary gearset that can be connected with two different elements of the main gearset, and rotates at a speed lower than or equal to that of the drive input shaft. For this kinematic coupling of the individual gearset elements and shift elements, DE 10 221 095.0 discloses numerous embodiments of the transmission components differently arranged relative to one another.

JP 2001/182785 A describes a further development of the 6-gear automatic transmission known from U.S. Pat. No. 5,106,352 into an 8-gear automatic transmission. Compared with U.S. Pat. No. 5,106,352, in this case the transfer planetary gearset is made as a simple, non-shifting 'positive' planetary gearset of double-planetary structure and an additional, sixth shift element is added. A carrier of the transfer planetary gearset forms the input element of the transfer planetary gearset in fixed connection with the drive input shaft of the automatic transmission. A sun gear of the transfer planetary gearset is fixed relative to a transmission housing. Correspondingly, an ring gear of the transfer planetary gearset forms the output element of the transfer planetary gearset that can be connected with two different elements of the main gearset, and always rotates at a speed lower than or equal to that of the drive input shaft. Via the additional, sixth shift element compared with U.S. Pat. No. 5,106,352, the first input element of the main gearset—which can optionally be connected with the output element of the transfer planetary gearset or fixed relative to the transmission housing—can now optionally also be connected to the drive input shaft of the transmission. As regards the spatial arrangement of the shift elements relative to one another and relative to the planetary gearsets, it is proposed in JP 2001/182785 A to arrange the two shift elements by way of which the first and second input elements of the main gearset can be connected with the ring gear of the transfer planetary gearset, together with the additional, sixth shift element compared with U.S. Pat. No. 5,106,352, as a single structural group axially between the transfer planetary gearset and the main gearset. The (fifth) shift element already known from U.S. Pat. No. 5,106,352, by which the drive input shaft can be connected to the third input element of the main gearset, is arranged on the opposite side of the main gearset to this structural group, i.e., on the side of the main gearset facing away from the transfer planetary gearset. In addition, JP 2001/182785 A proposes to arrange the additional, sixth shift element compared with U.S. Pat. No. 5,106,352 within the structural group spatially radially over the shift element by way of which the first input element of the main gearset can be connected to the ring gear of the transfer planetary gearset.

In the unpublished German patent application DE 10 318 565.8 by the present applicant, an improved component arrangement of the 8-gear automatic transmission known from JP 2001/182785 A is described. In order to make only comparatively few design changes compared to the basic design of the 6-gear automatic transmission according to U.S. Pat. No. 5,106,352 upon which these embodiments are modelled, in DE 10 318 565.8 it is proposed to maintain the spatial position of the transfer planetary gearset, the Ravigneaux main gearset and the first five shift elements relative to one another in the transmission housing, known from the 6-gear automatic transmission, and to arrange the additional, sixth shift element compared with U.S. Pat. No. 5,106,352 in the transmission housing on the side of the transmission facing a drive engine, spatially between a transmission housing wall on the drive input side and a first shift element, by which the output element of the transfer planetary gearset can be connected with the second input element of the main gearset, but spatially also between the transmission housing wall on the drive input side and the transfer planetary gearset. The additional, sixth shift element compared with U.S. Pat. No. 5,106,352 is thus arranged on the side of the transfer planetary gearset facing away from the main gearset.

The purpose of the present invention is to develop further the multi-stage automatic transmission described in JP 2001/182785 A and DE 10 318 565.8 with eight forward gears, and to provide alternative component arrangements for the planetary gearsets and the six shift elements.

SUMMARY OF THE INVENTION

The starting point for the invention is the transmission layout described in JP 2001/182785 A or the unpublished German patent application DE 10 318 565.8 by the present applicant, for a multi-stage automatic transmission with at least eight forward gears, comprising a drive input shaft, a drive output shaft, a transfer gearset made as a double planetary gearset, a main gearset made as a coupled planetary gearset with at least three non-coupled input elements and an output element, and at least six shift elements. By the selective closing of two of the shift elements at a time, a speed of the drive input shaft can be transferred to the drive output shaft in such manner that to shift from one gear to the next gear up or down, only one of the shift elements actuated at the time is opened and one other shift element is engaged. The entire disclosure content of the unpublished German patent application DE 10 318 565.8 by the present Applicant, is expressly, incorporated by reference, as part of the disclosure content of the present invention.

An input element of the transfer planetary gearset is in permanent connection with the drive input shaft. An output element of the transfer planetary gearset always rotates at a speed lower than that of the drive input shaft. A third element of the transfer planetary gearset is fixed relative to a transmission housing. The output speed of the transfer planetary gearset can be transferred via two shift elements to two different input elements of the main gearset. The speed of the drive input shaft can also be transferred to two different input elements of the main gearset by two other shift elements. The output element of the main gearset is in permanent connection with the drive output shaft.

In a preferred embodiment of this transmission layout as an 8-gear automatic transmission, a (coupled) carrier of the transfer planetary gearset forms its input element permanently connected with the drive input shaft, an ring gear of the transfer planetary gearset forms an output element that can be connected with two different input elements of the main gearset, and a sun gear of the transfer planetary gearset forms its third element fixed relative to the transmission housing. The transfer and main gearsets are arranged co-axially with one another. The main gearset can be made as a two-carrier, four-shaft transmission having the structure of a "Ravigneaux planetary gearset", with a first sun gear as the first input element of the main gearset, which can optionally be connected with the ring gear of the transfer gearset or the drive input shaft or can be fixed relative to the transmission housing, with a second sun gear as the second input element of the main gearset, which can be connected with the ring gear of the transfer gearset, with a (coupled) carrier as the third input element of the main gearset, which can optionally be connected with the drive input shaft or fixed relative to the transmission housing, and with an ring gear as the output element of the main gearset, which is permanently connected with the drive output shaft. In this case:

- an input element of the first shift element is connected to the output element of the transfer gearset;
- an output element of the first shift element is connected to the second input element of the main gearset;
- an input element of the second shift element is connected to the output element of the transfer gearset;
- an output element of the second shift element is connected to the first input element of the main gearset;
- an input element of the third shift element is connected to the transmission housing;
- an output element of the third shift element is connected to the first input element of the main gearset;
- an input element of the fourth shift element is connected to the transmission housing;
- an output element of the fourth shift element is connected to the third input element of the main gearset;
- an input element of the fifth shift element is connected to the drive input shaft;
- an output element of the fifth shift element is connected to the third input element of the main gearset;
- an input element of the sixth shift element is connected to the drive input shaft;
- an output element of the sixth shift element is connected to the first input element of the main gearset, and
- the output element of the main gearset is permanently connected to the drive output shaft.

The main gearset can, however, also be made as a two-carrier, four-shaft transmission with two coupled, one-carrier planetary gearsets, such that for example the first input element of this main gearset which can optionally be connected to the ring gear of the transfer gearset or fixed in relation to the transmission housing is formed by a sun gear of the first of these two one-carrier planetary gearsets of the main gearset and a carrier of the second of these two one-carrier planetary gearsets of the main gearset connected with this first sun gear of the main gearset, and such that the second input element of this main gearset which can be connected with the ring gear of the transfer gearset is formed by a sun gear of the second of the two one-carrier planetary gearsets of the main gearset, and such that the third input element of the main gearset which can optionally be connected to the drive input shaft or fixed relative to the transmission housing is formed by a carrier of the first of the two one-carrier planetary gearsets of the main gearset and an ring gear of the second of the two one-carrier planetary gearsets of the main gearset connected with this first carrier of the main gearset, and such that an ring gear of the first of the two one-carrier planetary gearsets of the main gearset is permanently connected to the drive output shaft as the output element of this main gearset. In this case the interconnection of the input and output elements of the six shift elements to the three input elements of the main gearset corresponds to the interconnection described earlier for the example of the Ravigneaux main gearset.

The main gearset can for example also be made as a "three-carrier, five-shaft transmission" with three coupled one-carrier planetary gearsets, or else as a "three-carrier, five-shaft transmission reduced to a two-carrier unit" with three coupled one-carrier planetary gearsets, in which at least two of these individual planetary gearsets are coupled to one another ("reduced") by a common carrier and a further common central gear (i.e., either via their sun gears or via their ring gears). Accordingly, the main gearset can also be made for example as a "four-carrier, six-shaft transmission reduced to a two-carrier unit", in which the in principle four individual planetary gearsets present and coupled to one another are combined in such manner that the main gearset comprises only two carriers. In contrast to the connections of the six shift elements to the input elements of a main gearset of the "two-carrier, four-shaft planetary gearset" type, in relation to the kinematic connection of the input and output elements of the third and sixth shift elements to the individual main gearset elements there are various possibilities, in which case:

- the input element of the third shift element is connected to the transmission housing;
- the output element of third shift element is connected to the first input element of the main gearset or to an input element of the main gearset whose speed range is close to this first input element;

the input element of the sixth shift element is connected to the drive input shaft;

the output element of the sixth shift element is connected to the first input element of the main gearset or to an input element of the main gearset which is close to this first input element in the speed diagram.

In all the design embodiments mentioned, in the first forward gear the first and fourth shift elements are engaged, in the second forward gear the first and third shift elements, in the third forward gear the first and second shift elements, in the fourth forward gear the first and sixth shift elements, in the fifth forward gear the first and fifth shift elements, in the sixth forward gear the fifth and sixth shift elements, in the seventh forward gear the second and fifth shift elements, and in the eighth forward gear the third and fifth shift elements are engaged. In the reverse gear the fourth, and in addition either the second or the sixth shift elements are engaged.

According to the invention, it is now proposed that the second shift element, by which the first input element of the main gearset can be connected to the output element of the transfer gearset, and the sixth shift element, by which the first input element of the main gearset can be connected to the drive input shaft of the transmission, now form a structural group arranged spatially at least mainly on the side of the transfer gearset facing away from the main gearset, preferably in an area axially between the transfer gearset and a radially extending wall of the transmission housing located on the side of the transfer gearset facing away from the main gearset. In this way the transfer and main gearsets are arranged co-axially with one another.

The first shift element, by which the second input element of the main gearset can be connected to the output element of the transfer gearset, can be spatially arranged in an area axially between the transfer gearset and the main gearset. In this case the structural group comprising the second and sixth shift elements is axially directly adjacent to the transfer gearset. In another component arrangement, however, the first shift element, in particular a servomechanism for actuating the first shift element, can also be axially adjacent to the transfer gearset on the side of the latter facing away from the main gearset, and a disk set of the first shift element can then also be arranged spatially in an area radially over the transfer gearset. In this arrangement embodiment of the first shift element, the structural group comprising the second and sixth shift elements is axially directly adjacent to the first shift element, in particular axially adjacent to the servomechanism of the first shift element.

The fifth shift element, by which the third input element of the main gearset can be connected to the drive input shaft of the transmission, can be spatially arranged both axially between the transfer and main gearsets, axially adjacent to the transfer gearset (VS), and also axially on the side of the main gearset facing away from the transfer gearset, axially adjacent to the main gearset (HS).

As regards the spatial arrangement of the second and sixth shift elements relative to one another (and relative to the main gearset), several embodiments are proposed:

Disk set of the second shift element at least in part radially above the disk set of the sixth shift element;

Disk set of the sixth shift element at least in part radially above the disk set of the second shift element;

Disk sets of the second and sixth shift elements axially next to one another and on the same or at least a similar diameter, with the disk set of the second shift element closer to the main gearset than is the disk set of the sixth shift element; and Disk set of the second shift element axially next to the disk set of the sixth shift element but on a larger diameter than the disk set of the sixth shift element, preferably with the disk set of the second shift element closer to the main gearset than is the disk set of the sixth shift element.

In all the various arrangements according to the invention, the output element of the second shift element and the output element of the sixth shift element, which are both connected to the first input element of the main gearset, completely overlap the transfer gearset and the first shift element in the axial direction, radially on the outside. In accordance with the kinematic connection to the first input element of the main gearset, the output element of the second shift element and the output element of the sixth shift element can at least partially be formed as a common structural unit. If the fifth shift element is spatially arranged between the transfer and main gearsets, in particular adjacent to the transfer gearset, the output elements of the second and sixth shift elements also completely overlap this fifth shift element in the axial direction, radially on the outside.

In accordance with the proposed component arrangement it can also be provided that the input element of the second shift element connected to the output element of the transfer gearset and/or the input element of the sixth shift element connected to the drive input shaft overlap the disk sets of the second and sixth shift elements in the axial direction, radially on the outside.

Within the scope of several further developments of this component arrangement according to the invention, it is proposed to provide a common disk carrier for the second shift element and the adjacent sixth shift element close to it. This common disk carrier can be formed for example as the outer disk carrier of the sixth shift element and the inner disk carrier of the second shift element, or else as the outer disk carrier of the second shift element and the inner disk carrier of the sixth shift element, or as the outer disk carrier of both shift elements.

In a first embodiment of the invention, as regards the spatial arrangement of servomechanisms for actuating the second and sixth shift elements, it is proposed that the servomechanism of the sixth shift element always rotates at the speed of the first input element of the main gearset. The output element of the sixth shift element connected to the first input element of the main gearset accommodates the servomechanism of the sixth shift element, and this servomechanism comprises at least a pressure chamber and a piston, and preferably also a pressure equalization chamber for compensating the dynamic coupling pressure of the rotating pressure chamber.

In a second embodiment of the invention, as regards the spatial arrangement of the servomechanisms for actuating the second and sixth shift elements, it is proposed that the servomechanism of the sixth shift element always rotates at the speed of the drive input shaft of the transmission. The input element of the sixth shift element connected to the drive input shaft accommodates the servomechanism of the sixth shift element, comprising at least a pressure chamber and a piston and preferably also a pressure equalization chamber for compensating the dynamic coupling pressure of the rotating pressure chamber.

In a third embodiment of the invention, as regards the spatial arrangement of the servomechanisms for actuating the second and sixth shift elements, it is proposed that the servomechanism of the second shift element always rotates at the speed of the first input element of the main gearset. The output element of the second shift element connected to the first input element of the main gearset accommodates the servomechanism of the second shift element, and this servomechanism again comprises at least a pressure chamber and a piston and preferably also a pressure equalization chamber for compensating the dynamic coupling pressure of the rotating pressure chamber. Depending on the design of the input and output elements of the second and sixth shift elements, this arrangement of the servomechanism of the second shift element can be combined with both the first and the second embodiments described above in relation to the spatial arrangement of the servomechanism of the sixth shift element.

In a fourth embodiment of the invention, as regards the spatial arrangement of the servomechanisms for actuating the second and sixth shift elements, it is proposed that the servomechanism of the second shift element always rotates at the speed of the output element of the transfer gearset. The input element of the second shift element connected to the output element of the transfer gearset accommodates the servomechanism of the second shift element, which again comprises at least a pressure chamber and a piston and preferably also a pressure equalization chamber for compensating the dynamic coupling pressure of the rotating pressure chamber. Depending on the design of the input and output elements of the second and sixth shift elements, this arrangement of the servomechanism of the second shift element too can be combined with both the first and the second embodiments described above in relation to the spatial arrangement of the servomechanism of the sixth shift element.

In all the embodiments of the invention described so far as regards the spatial arrangement of the servomechanisms for actuating the second and sixth shift elements, the respective disk sets of the second and sixth shift elements—in relation to the pressure chamber and the movement direction of the piston associated with that pressure chamber in the respective servomechanism—can, when the elements are being engaged, be actuated either by being pushed together or pulled apart. Correspondingly, there are also numerous embodiments concerning the spatial arrangement of the respective pressure chambers for actuating the disks of the second and sixth shift elements and—when present for the dynamic compensation of the rotational pressure of the rotating pressure chambers—of the respective pressure equalization chambers of the servomechanisms of the second and sixth shift elements, relative to one another and relative to the nearby structural elements.

In combination with an arrangement in which the disk set of the second shift element, viewed in the axial direction, is arranged at least in part radially over the disk set of the sixth shift element, the following expedient embodiments in particular are possible, whose characteristics can also be combined with one another at least in part:

the disk set and the servomechanism of the sixth shift element are at least largely arranged inside a coupling space of the second shift element formed by an outer disk carrier of the second shift element;

the servomechanisms of the second and sixth shift elements are arranged at least for the most part on the side of the disk sets of the second and sixth shift elements facing away from the transfer gearset;

the pressure chamber of the servomechanism of the sixth shift element is positioned closer to the transfer gearset than is the pressure chamber of the servomechanism of the second shift element;

the pressure chamber of the servomechanism of the sixth shift element is arranged axially close to the pressure equalization chamber of the servomechanism of the second shift element, in particular separated therefrom by a casing surface of the disk carrier common to the second and sixth shift elements;

the pressure chambers of the servomechanisms of the second and sixth shift elements are arranged axially close to one another, in particular separated from one another by a casing surface of the disk carrier common to the second and sixth shift elements;

the piston of the servomechanism of the second shift element (or an actuating element connected to this piston for actuating the disks of the second shift element) overlaps the disk set of the second shift element in the axial direction, radially on the outside;

the pressure chamber of the servomechanism of the second shift element, viewed in the axial direction, is at least for the most part arranged radially over the pressure chamber of the servomechanism of the sixth shift element;

the pressure equalization chamber of the servomechanism of the second shift element, viewed in the axial direction, is arranged at least for the most part over the pressure equalization chamber of the servomechanism of the sixth shift element;

the pressure equalization chamber of the servomechanism of the second shift element is filled with lubricant via the pressure equalization chamber of the servomechanism of the sixth shift element;

the pressure equalization chamber of the servomechanism of the second shift element is arranged closer to the transfer gearset than is the pressure chamber of the servomechanism of the second shift element;

the pressure equalization chamber of the servomechanism of the sixth shift element is arranged closer to the transfer gearset than is the pressure chamber of the servomechanism of the sixth shift element.

In combination with an arrangement in which the disk set of the sixth shift element, viewed in the axial direction, is arranged at least partially radially above a disk set of the second shift element, the following expedient embodiments in particular are possible, whose characteristics can also be combined with one another at least in part:

the disk set and the servomechanism of the second shift element are arranged at least mostly inside a coupling space of the sixth shift element, formed by an outer disk carrier of the sixth shift element;

the servomechanisms of the second and sixth shift elements are arranged axially close to the transfer gearset, the disk sets of the second and sixth shift elements being arranged on the side of the servomechanisms of the second and sixth shift elements facing away from the transfer gearset;

the pressure chamber of the servomechanism of the sixth shift element is positioned closer to the transfer gearset than is the pressure chamber of the servomechanism of the second shift element;

the pressure chamber of the servomechanism of the second shift element is arranged axially close to the pressure equalization chamber of the servomechanism of the sixth shift element, in particular separated therefrom by a casing surface of the disk carrier common to the second and sixth shift elements;

the pressure chambers of the servomechanisms of the second and sixth shift elements are arranged axially close to one another, in particular separated from one another by a casing surface of the disk carrier common to the second and sixth shift elements;

the pressure chamber of the servomechanism of the sixth shift element, viewed in the axial direction, is arranged at least for the most part radially over the pressure chamber of the servomechanism of the second shift element;

the pressure equalization chamber of the servomechanism of the sixth shift element, viewed in the axial direction, is arranged at least mostly radially over the pressure equalization chamber of the servomechanism of the second shift element;

the pressure equalization chamber of the servomechanism of the sixth shift element is filled via the pressure equalization chamber of the servomechanism of the second shift element;

the pressure chamber of the servomechanism of the second shift element is arranged closer to the transfer gearset than is the pressure equalization chamber of the servomechanism of the second shift element;

the pressure chamber of the servomechanism of the sixth shift element is arranged closer to the transfer gearset than is the pressure equalization chamber of the servomechanism of the sixth shift element.

In combination with an arrangement in which the disk sets of the second and sixth shift elements are arranged axially next to one another, in particular the following expedient embodiments are possible, whose characteristics can also in part be combined with one another:

the disk set and the servomechanism of the second shift element are arranged at least mostly inside a coupling space of the sixth shift element, formed by an outer disk carrier of the sixth shift element;

the disk set and the servomechanism of the sixth shift element are arranged completely inside a coupling space of the second shift element, formed by an outer disk carrier of the second shift element;

the servomechanisms of the second and sixth shift elements are arranged at least mainly on the side of the respective disk set associated with the second or sixth shift element facing away from the transfer gearbox;

the servomechanism of the second shift element is arranged at least mainly on the side of the disk set of the second shift element facing away from the transfer gearset, and the servomechanism of the sixth shift element is arranged mainly on the side of the disk set of the sixth shift element facing toward the transfer gearset;

the pressure chamber of the servomechanism of the second shift element is arranged closer to the transfer gearset than is the pressure chamber of the servomechanism of the sixth shift element;

the pressure chamber of the servomechanism of the second shift element is arranged closer to the transfer gearset than is the pressure equalization chamber of the servomechanism of the second shift element;

the pressure chamber of the servomechanism of the second shift element is arranged axially close to the pressure equalization chamber of the servomechanism of the sixth shift element;

the pressure chamber of the servomechanism of the sixth shift element is arranged closer to the transfer gearset than is the pressure chamber of the servomechanism of the second shift element;

the pressure chamber of the servomechanism of the sixth shift element is arranged closer to the transfer gearset than is the pressure equalization chamber of the servomechanism of the sixth shift element;

the pressure equalization chamber of the servomechanism of the sixth shift element is arranged closer to the transfer gearset than is the pressure chamber of the servomechanism of the sixth shift element;

the pressure chamber of the servomechanism of the sixth shift element is arranged axially close to the pressure equalization chamber of the servomechanism of the second shift element;

the pressure chambers of the servomechanisms of the second and sixth shift elements are arranged axially next to one another, in particular separated from one another by a casing surface of the disk carrier common to the second and sixth shift elements;

the piston of the servomechanism of the sixth shift element (or an actuation element connected to this piston for actuating the disks of the sixth shift element) overlaps the disk sets of the second and sixth shift elements in the axial direction, radially on the outside;

the pressure equalization chambers of the servomechanisms of the second and sixth shift elements are arranged axially next to one another.

BRIEF DESCRIPTION OF THE DRAWINGS

The invention will now be described, by way of example, with reference to the accompanying drawings in which the same indexes are used to denote comparable structural elements. The Figures show:

FIG. 1A is a transmission layout according to the relevant prior art;

FIG. 1B is a shift scheme for the transmission of FIG. 1A;

FIG. 2 is an example of a first transmission layout according to the invention;

FIG. 3 is an example of a second transmission layout according to the invention;

DETAILED DESCRIPTION OF THE INVENTION

Figure 1C:
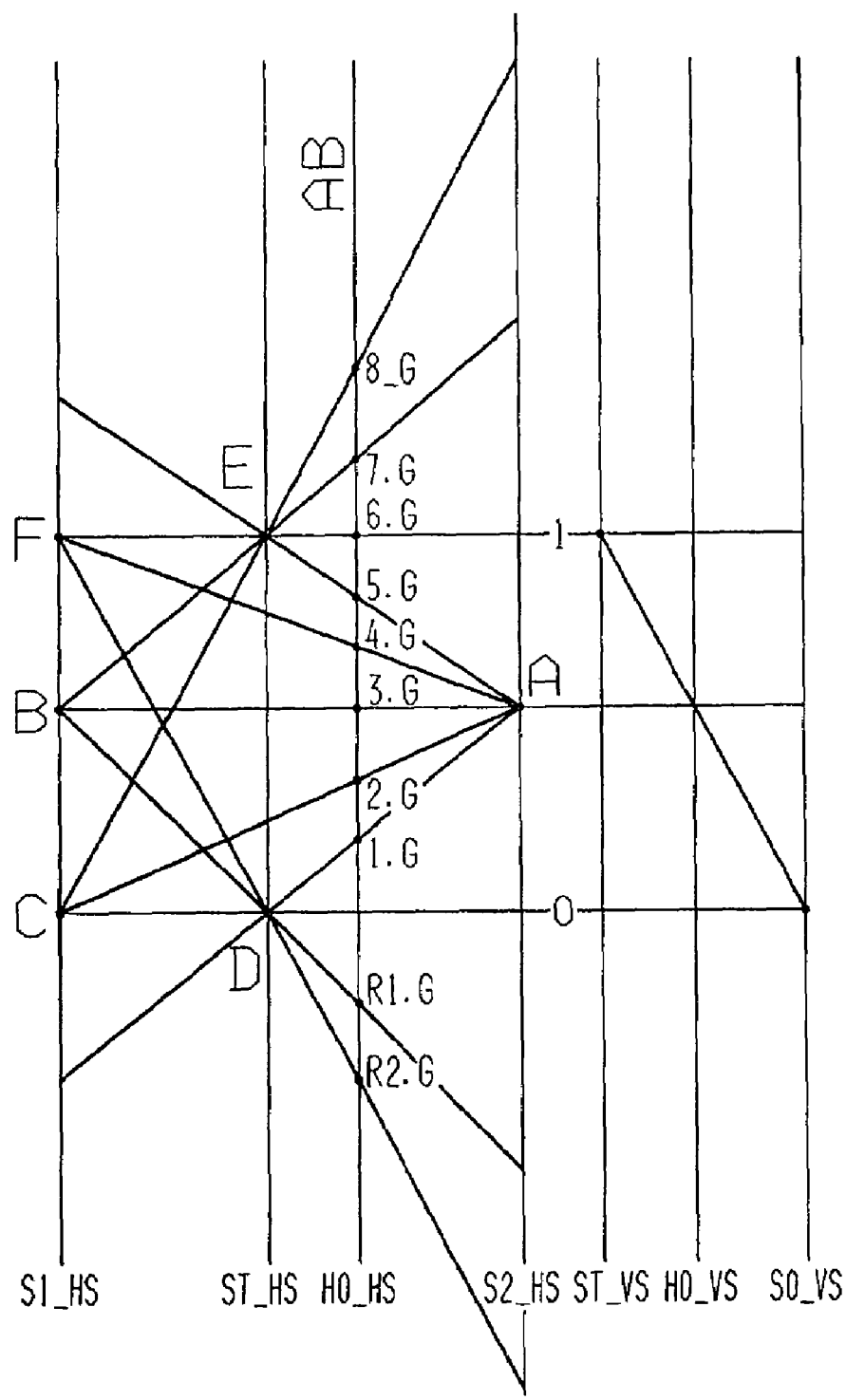
FIG. 1C is a speed diagram for the transmission of FIG. 1A.

For a better understanding, the prior art upon which the invention is based will first be explained. FIG. 1A shows the transmission layout of relevant prior art according to DE 10 318 565.8, and FIG. 1B the corresponding shift scheme. In FIG. 1A, AN denotes a drive input shaft of the automatic transmission which is in active connection with a drive engine (not shown) of the automatic transmission, in the example shown via a torque converter with a torsion damper and a converter bridging clutch. AB denotes a drive output shaft of the automatic transmission arranged co-axially with the drive input shaft AN, which is in active connection with at least one drive axle of the motor vehicle. Clearly, instead of the torque converter, a frictional clutch could be arranged as the starting element for the automatic transmission between the drive engine and the automatic transmission. The drive engine could also be connected with the drive input shaft AN of the transmission via a simple torsion damper or a dual-mass flywheel or a solid shaft, and in that case a frictional shift element would have to be formed within the automatic transmission as the starting element of the transmission.

The automatic transmission comprises a transfer gearset VS and a main gearset HS arranged co-axially with (but not directly adjacent to) this transfer gearset VS. The transfer gearset VS is made as a positive planetary gearset of double planetary structure, with an ring gearwheel HO_VS, with a sun gearwheel SO_VS, and with a carrier ST_VS formed of two individual carriers, on which are mounted inner planetary gears P1_VS, which mesh with the sun gear SO_VS, and outer planetary gears P2_VS, which mesh with the inner planetary gears P1_VS and the ring gear HO_VS, so that they can rotate. This transfer gearset VS therefore operates as a non-shifting step-down stage and produces an output speed lower than the input speed of the drive input shaft AN of the automatic transmission. For this, the sun gear SO_VS of the transfer gearset VS is fixed relative to a transmission housing GG and the carrier ST_VS is permanently connected to the drive input shaft AN. The ring gear HO_VS forms the output element of the transfer gearset VS and can be connected with individual input elements of the main gearset HS via two shift elements A, B.

The main gearset HS is made as a coupled two-carrier, four-shaft planetary gearset with three input elements not coupled to one another and one output element, in the structural form of a Ravigneaux gearset with two sun gears S1_HS and S2_HS, an ring gear HO_HS and a coupled carrier ST_HS, on which long planetary gears P1_HS, which mesh with the first sun gear S1_HS and the ring gear HO_HS, and short planetary gears P2_HS which mesh with the second sun gear S2_HS and the long planetary gears P1_HS, so as to rotate. In this, the first sun gear S1_HS forms the first input element of the main gearset HS, the second sun gear S2_HS the second input element of the main gearset HS, the coupled carrier ST_HS the third input element of the main gearset HS and the ring gear HO_HS the output element of the main gearset HS.

The automatic transmission has a total of six shift elements A to F. The shift elements A, B, E and F are formed as clutches, and the shift elements C and D as brakes. For this, the second sun gear S2_HS of the main gearset HS can be connected via the first shift element A with the ring gear HO_VS of the transfer gearset VS. Furthermore, the fourth sun gear S1_HS of the main gearset HS can be connected via the second shift element B with the ring gear HO_VS of the transfer gearset VS, via the third shift element C it can be fixed relative to the transmission housing GG, and via the sixth shift element F it can be connected with the drive input shaft AN. In addition, the carrier ST_HS of the main gearset HS can be fixed relative to the transmission housing GG via the fourth shift element D, and can be connected with the drive input shaft AN via the fifth shift element E. As a result of this interconnection of the individual elements of the main gearset HS to the individual shift elements, the carrier ST_HS of the main gearset HS can also be connected with the first sun gear S1_HS of the main gearset HS by simultaneous engagement of the fifth and sixth shift elements E, F. The ring gear HO_HS of the main gearset HS is permanently and exclusively connected to the drive output shaft AB.

FIG. 1B shows a shift scheme for the multi-stage automatic transmission represented in FIG. 1A. A total of eight forward gears can be engaged without range change, in such manner that to change from one gear to the next higher or lower gear, of the shift elements actuated at the time in each case only one shift element is disengaged and a different shift element is engaged. In first gear "1" the clutch A and the brake D are engaged, in second gear "2" the clutch A and brake C are engaged, in third gear "3" the clutches A and B, in fourth gear "4" the clutches A and F, in fifth gear "5" the clutches A and E, in sixth gear "6" the clutches E and F, in seventh gear "7" the clutches B and E, and in eighth gear "8" the brake C and the clutch E. In a first reverse gear "R1" the clutch B and the brake D are engaged. A second reverse gear "R2" can also be provided, by engaging clutch F and brake D. FIG. 1C shows a speed diagram for the multi-stage automatic transmission of FIG. 1A.

Returning to FIG. 1A, the disk sets and individual input and output elements of the shift elements are indexed individually. Thus, the disk set of the first shift element A is indexed 100, the input element of the first shift element A is 120, the output element of first shift element A is 130, and a servomechanism for the actuation of the disk pack 100 of the first shift element A is 110. Correspondingly, the disk set of the other shift element B, C, D, E and F are indexed 200, 300, 400, 500 and 600, and the input elements of the other shift elements B, C, D, E and F are 220, 320, 420, 520 and 620. Also correspondingly, the output elements of the other clutches B, E and F are indexed 230, 530 and 630, and the servomechanisms of the other clutches B, E and F for actuating their respective disk sets 200, 500 and 600 are indexed 210, 510 and 610.

As regards the spatial arrangement of the shift elements and gearsets relative to one another within the transmission housing indexed GG, DE 103 18 565.8 proposes the following: viewed axially, the fifth shift element E formed as a clutch, is arranged between the transfer gearset VS and the main gearset HS, axially directly adjacent to the transfer gearset VS. The second shift element B, also made as a clutch, is also arranged axially between the transfer gearset VS and the main gearset HS, with the disk set 200 of this clutch B spatially approximately radially over the disk set 500 of the clutch E and the servomechanism 210 of the clutch B axially adjacent to the clutch E on its side facing away from the transfer gearset VS. Viewed axially in the direction of the main gearset HS, the clutch B is followed first by the third shift element C made as a brake, then by the fourth shift element D also made as a brake, and then by the main gearset HS. The disk set 100 of the first shift element A made as a clutch is spatially arranged approximately over the transfer gearset VS. The servomechanism 110 of this clutch A is at least for the most part arranged on the side of the transfer gearset VS facing away from the main gearset HS. On the side of the servomechanism 110 of the clutch A facing away from the transfer gearset VS, viewed axially between the clutch A and a housing wall GW fixed to the housing on the drive side, i.e., on the side of the clutch A and the transfer gearset VS facing away from the main gearset HS, is arranged the sixth shift element F made as a clutch.

As an example embodiment of a servomechanism of a shift element, the servomechanism 610 of the sixth shift element F is shown in more detail in FIG. 1A. This servomechanism 610 is arranged inside a cylindrical disk carrier, which forms the input element 620 of the clutch F and correspondingly rotates always at the speed of the drive input shaft AN of the transmission. The servomechanism 610 has a pressure chamber 611 formed by a casing surface section of the disk carrier of clutch F and a piston 614 of the servomechanism 610. When this pressure chamber 611 is pressurized, the piston 614 moves against the force of a restoring element 613 of the servomechanism 610, here made for example as a cup spring, axially in the direction of the transfer gearset VS so as to actuate or close the disk set 600 of the clutch F. For the preferably complete compensation of a dynamic pressure of the rotating pressure chamber 611, the servomechanism 610 also comprises a pressure equalization chamber 612 that can be filled with unpressurized lubricant and is formed by a surface of the piston 614 and a diaphragm plate 615. The input element 620 is mounted to rotate on a hub GN fixed to the transmission housing, which extends from the fixed housing wall GW into the inside space of the transmission housing GG, axially in the direction of the transfer gearset VS as far as the sun gear SO_VS of the transfer gearset VS and is in rotationally fixed connection with this sun gear SO_VS. Correspondingly, this hub GN fixed on the transmission housing also has channels for the supply of pressure medium and lubricant to the pressure chamber and pressure equalization chamber of the clutch F.

With reference to FIG. 2, a first example transmission layout according to the present invention will now be explained. The differences compared with the relevant prior art illustrated in FIG. 1A concern essentially the spatial arrangement and design of the clutches B, E and A. Otherwise, the structure of the transmission with its drive input shaft AN and drive output shaft AB running co-axially to it, with the transfer gearset VS on the drive input side and the main gearset HS arranged co-axially therewith on the drive output side, with the clutch E directly adjacent to the transfer gearset VS on its side facing toward the main gearset HS, and with the two brakes C and D close to the main gearset, corresponds essentially to the transmission shown in FIG. 1A.

The two clutches B and F now form a structural group easy to preassemble from the standpoint of production technology, which is ranged between the transfer gearset VS and a housing wall GW fixed on the transmission housing and facing a drive engine of the transmission in active connection with the drive input shaft AN, i.e., on the side of the transfer gearset VS facing away from the main gearset HS and directly adjacent to the transfer gearset VS and the housing wall GW. Of course, the housing wall GW and the transmission housing GG can also be made as one piece. The structural group comprises a disk carrier ZYLBF common to both of the clutches B, F, the disk sets 200, 600 of the two clutches B, F, and the servomechanisms 210, 610 for actuating those two disk sets 200, 600. This disk carrier ZYLBF forms the output element for both clutches B, F and, in accordance with the aforesaid kinematic coupling to the first input element (i.e., here the first sun gear S1_HS), is in rotationally fixed connection with the main gearset HS, as will be explained in more detail later. For the clutch F, the disk carrier ZYLBF is made as an outer disk carrier to hold the outer disks of the disk set 600 of this clutch F, preferably made as externally toothed steel disks, and for the clutch B as an inner disk carrier, to hold the inner disks of the disk set 200 of this clutch B preferably made as internally toothed lining disks. Viewed spatially, the disk set 200 of clutch B is arranged in an area radially over the disk set 600 of clutch F. Correspondingly, the input element 620 of clutch F is made as an inner disk carrier to hold the inner disks of the disk set 600 of the clutch F preferably made as internally toothed lining disks, and is in rotationally fixed connection with a carrier plate of the coupled carrier ST_VS of the transfer gearset VS remote from the main gearset, this coupled carrier ST_VS—as shown in FIG. 1A—being connected on its side near the main gearset with the drive input shaft AN. Of course, the said carrier plate and the inner disk carrier 620 can also be made as one piece. The input element 220 of clutch B is made as an outer disk carrier to hold the outer disks of the disk set 200 of this clutch B preferably made as externally toothed steel disks, and is in rotationally fixed connection with the ring gear HO_VS of the transfer gearset VS. Of course, the ring gear HO_VS and the outer disk carrier 220 can also be made as one piece. Of course, instead of the steel disks (with no friction layer) and lining disks arranged in alternation, steel disks covered on one side with a friction lining can be used, and in that case an externally toothed coated steel disk and an internally toothed steel disk have to be assembled in alternation to form a disk set. Of course, instead of the proposed steel disks, disks made of carbon or carbon fibers or other suitable composite materials can be used.

Geometrically, the disk carrier ZYLBF common to clutches B, F has an essentially cylindrical structure and is mounted to rotate on a hub GN fixed on the transmission housing, which extends from the housing wall GW inward into the transmission axially toward the transfer gearset VS. The sun gear SO_VS of the transfer gearset VS is fixed on this hub GN by way of a suitable connection. Of course, the hub GN and the housing wall GW can also be made in one piece. For example, the hub GN can also be a vane shaft of a torque converter arranged in the force flow between the drive input shaft AN and the drive engine of the transmission. On the outer diameter of the disk carrier ZYLBF is provided a cylindrical section on whose inside diameter the outer disks of the disk set 600 of clutch F, and on whose outer diameter the inner disks of the disk set 200 are arranged, so that both disk sets 600, 200 are axially adjacent to the transfer gearset VS. Starting from the end of the cylindrical section of the disk carrier ZYLBF remote from the transfer gearset, i.e., on the side of the disk set 600 remote from the transfer gearset, an at least largely disk-shaped section of the disk carrier ZYLBF extends radially inward as far as the hub of the disk carrier ZYLBF. Thus, the hub is divided into two hub sections 633 and 233. Starting from the inside diameter of the disk shaped section of the disk carrier ZYLBF, the hub section 633 extends axially toward the transfer gearset VS and (as can be seen from the nomenclature chosen) is associated with the output element of the clutch F. The other hub section 233 is associated with the output element of clutch B and extends, starting from the inside diameter of the disk shaped section of the disk carrier ZYLBF, axially toward the housing wall GW.

The servomechanism 610 of clutch F, comprising a pressure chamber 611, a pressure equalization chamber 612, a piston 614, a restoring element 613 and a diaphragm plate 615, is arranged completely inside a cylindrical space formed by the disk carrier ZYLBF, essentially radially above the hub section 633. The piston 614 is mounted on the disk carrier ZYLBF and able to move axially. Correspondingly, the servomechanism 610 always rotates at the speed of the first input element (i.e., here the first sun gear S1_HS) of the main gearset HS. To offset the rotational pressure of the rotating pressure chamber 611 of the servomechanism 610, an unpressurized lubricant is directed to the pressure equalization chamber 612 to provide dynamic pressure equalization, this pressure equalization chamber 612 being arranged closer to the transfer gearset VS (and the main gearset HS) than is the pressure chamber 611. The pressure chamber 611 is formed by a casing surface of the disk carrier ZYLBF (and part of its hub section 633) and the piston 614. The pressure equalization chamber 612 is formed by the piston 614 and the diaphragm plate 615, which is fixed axially on the hub section 633 of the disk carrier ZYLBF, sealed against lubricant and able to move axially toward the piston 614. The piston 614 is pre-stressed axially against the hub section 633 of the disk carrier ZYLBF by the restoring element 613 in this case for example made as a cup spring. When the pressure chamber 611 is pressurized with pressure medium to close the clutch F, the piston 614 moves axially toward the transfer gearset VS (and main gearset HS) and actuates the disk set 600 associated with it against the spring force of the restoring element 613.

Viewed spatially, the servomechanism 610 of clutch F is arranged closer to the main and transfer gearsets HS, VS than is the servomechanism 210 of clutch B. Viewed spatially, the servomechanism 210 is arranged mainly in an area radially over the second hub section 233 of the disk carrier ZYLBF, and can also move axially on the disk carrier ZYLBF. Correspondingly, the servomechanism 210 also always rotates at the speed of the first input element (i.e., here the first sun gear S1_HS) of the main gearset HS. The servomechanism 210 of clutch B comprises a pressure chamber 211, a pressure equalization chamber 212, a piston 214 with a meandering shape in sections, a restoring element 213 and a support disk 218 which is cylindrical in sections. To compensate the rotational pressure of the rotating pressure chamber 211 of the servomechanism 210, dynamic pressure equalization by way of the pressure equalization chamber 212 is provided. To form the pressure chamber 211, the support disk 218 is attached at the end of the hub section 233 of the disk carrier ZYLBF close to the housing wall, sealed against pressure medium and rotationally fixed to the hub section 233, in the example shown by way of a sealed carrier profile and a locking ring. The cylindrical section of the support disk 218 extends axially toward the transfer gearset VS. The piston 214 of the servomechanism 210 can move axially and is sealed against pressure medium tight on this cylindrical section of the support disk 218 and on the hub section 233 of the disk carrier ZYLBF, and in this area has a meandering contour. Correspondingly, the pressure chamber 211 of the servomechanism 210 is formed by the piston 214, the cylindrical section of the support disk 218, the disk-shaped section of the support disk 218 located radially under this cylindrical section of the support disk 218, and part of the hub section 233 of the disk carrier ZYLBF. To form the pressure equalization chamber 212 of the servomechanism 210, the disk carrier ZYLBF has a second cylindrical section on a defined diameter larger than the diameter of the cylindrical section of the support disk 218, which extends starting from the disk-shaped section of the disk carrier ZYLBF, in this case for example made as one piece, axially toward the housing wall GW. The piston 214, which is meander-shaped in this area, can move axially and is sealed against lubricant on this second cylindrical section of the disk carrier ZYLBF. Accordingly, the pressure equalization chamber 212 is formed by the piston 214, the cylindrical section of the disk carrier ZYLBF and the disk shaped section of the disk carrier ZYLBF located under this second cylindrical section of the disk carrier ZYLBF. Along its further geometrical course the piston 214 extends at least largely along the outer contour of the radially upper area of the disk carrier ZYLBF, radially on the outside and axially in the direction of the transfer gearset VS as far as the disk set 200 of clutch B associated with it on the side remote from the transfer gearset. The piston 214 is axially pre-stressed by the restoring element 213, in this case for example formed as a spiral spring packet arranged axially between the disk-shaped section of the disk carrier ZYLBF and the piston 214. When the pressure chamber 211 is pressurized with pressure medium to close the clutch B, the piston 214 moves axially toward the transfer gearset VS (and main gearset HS), and actuates the disk set 200 associated it against the spring force of the restoring element 213. Thus, the piston 214 almost completely overlaps the disk carrier ZYLBF common to the clutches B, F.

Thus, the pressure equalization chamber 212 of the servomechanism 210 of clutch B is arranged closer to the transfer gearset VS (and main gearset HS) than is the pressure chamber 211 of this servomechanism 210, so that the pressure equalization chamber 212 of clutch B and the pressure chamber 611 of the servomechanism 610 of clutch F are arranged directly adjacent to one another, separated from one another only by a casing surface of the disk carrier ZYLBF common to both clutches B, F.

The mounting of the disk carrier ZYLBF on the hub GN attached on the housing allows constructively relatively simple pressure and lubricant medium supply to the two clutches B, F via corresponding ducts or holes passing partly within the housing hub GN and partly within the hub of the disk carrier ZYLBF. The pressure medium supply to the pressure chamber 211 of the servomechanism 210 of clutch B is indexed 216, the lubricant supply to the pressure equalization chamber 212 of the servomechanism 210 of clutch B is indexed 217, the pressure medium supply to the pressure chamber 611 of servomechanism 610 of clutch F is indexed 616 and the lubricant supply to the pressure equalization chamber 612 of the servomechanism 610 of clutch F, is indexed 617.

As can also be seen from FIG. 2, the clutch E is positioned axially directly adjacent to the transfer gearset VS on its side facing toward the main gearset HS. The input element 520 of clutch E is connected to the carrier plate of the coupled carrier ST_VS of the transfer gearset VS on its side near the main gearset, and to the drive input shaft AN, and is formed for example as an outer disk carrier to hold the outer disks of disk set 500 of clutch E for example made as externally toothed steel disks. The output element 530 of clutch E is made for example as a largely disk-shaped inner disk carrier to hold inner disks of the disk set 500 of clutch E, for example made as internally toothed lining disks, and is connected via a carrier shaft 540 to the third input element of the main gearset HS—i.e., in this case to the coupled carrier ST_HS of the main gearset HS, so that the carrier shaft 540 passes centrally through the main gearset HS. Geometrically, the disk set 500 of clutch E is arranged for example in the diameter region of the ring gear HO_VS of the transfer gearset VS. Expediently, a servomechanism 510 for actuating the disk set 500 is arranged within the input element 520 of clutch E. Appropriately, this servomechanism 510, represented only schematically here for the sake of simplicity, also comprises dynamic pressure equalization, since it always rotates at the speed of the drive input shaft AN.

Viewed in the direction of the main gearset HS, the clutch A is axially adjacent to the clutch E. The input element 120 of this clutch A connected to the ring gear HO_VS of the transfer gearset VS completely overlaps the clutch E and is in this case formed for example as an outer disk carrier to hold outer disks of the disk set 100 of clutch A, preferably made as externally toothed lining disks. Correspondingly, the output element 130 of clutch A is here formed for example as a largely disk-shaped inner disk carrier to hold inner disks of the disk set 100, preferably made as internally toothed steel disks, and is connected via a second sun shaft 140 with the second input element—i.e., here the second sun gear S2_HS—of the main gearset HS. This second sun shaft 140 encloses the carrier shaft 540 in sections and along its axial course passes centrally through the first sun gear S1_HS of the main gearset HS close to the transfer gearset. Of course, the second sun gear S2_HS and the second sun shaft 140 can also be made as one piece. Of course, the output element (inner disk carrier) 130 of clutch A and the second sun shaft 140 can be made as one piece, such that the second sun shaft 140 then forms a hub of the output element (inner disk carrier) 130 mounted on the carrier shaft 540. In the example shown, the disk sets 100, 200 of clutches A, B are arranged on an at least similar diameter. Correspondingly, a disk carrier common to both clutches A, B can also be provided as their input element. To actuate the disk set 100 of clutch A, a servomechanism 110 is provided, in this case for example arranged on the side of disk set 100 closer to the main gearset and actuating the disk set 100 when clutch A is engaged, axially in the direction of the transfer gearset VS. Preferably, this servomechanism 110 represented here only schematically for the sake of simplicity, also comprises dynamic pressure equalization, since the servomechanism 110 always rotates at the speed of the second sun gear S2_HS of the main gearset HS. In another arrangement embodiment the servomechanism 110 of clutch A can also be arranged on the side of the disk set 100 associated with it that is closer to the transfer gearset, and when the clutch A is engaged this disk set 100 is then actuated in the direction of the main gearset HS.

Of course, for the clutches E and A, instead of the alternately arranged steel disks (with no friction lining) and lining disks provided in the example embodiment, steel disks lined on one side with the friction lining can also be used, and then in each case an externally toothed, lined steel disk and an internally toothed lined steel disk have to be combined in alternation to form a disk set. Of course, instead of the proposed steel disks, disks made of carbon or carbon fibers or other suitable composite materials can be used.

As already mentioned, the disk carrier ZYLBF common to the two clutches B, F forms the output element for the two clutches B, F connected with the first input element of the main gearset HS. The speed and torque transfer between this disk carrier ZYLBF and the first sun gear S1_HS of the main gearset HS then takes place via the support disk 218, a cylindrical connecting element ZYL and the first sun gear 240. The support disk 218 is in rotationally fixed connection close to the housing wall GW, with the hub of the disk carrier ZYLBF, extends axially adjacent to the housing wall GW radially outward, and in the area of its outer diameter is connected with the cylindrical connecting element ZYL, for example by way of a carrier profile. This cylindrical connecting element ZYL in turn, is geometrically formed as a pot open toward the housing wall GW, with an ring casing surface which completely overlaps the structural group of the two clutches B, F, the transfer gearset VS and the two clutches E and A in the axial direction, and has a disk-shaped pot bottom which extends, next to the clutch A on its side facing the main gearset HS, radially inward as far as just above the second sun shaft 140. In its hub area the cylindrical connecting element ZYL is rotationally fixed to the first sun shaft 249, which in turn is connected with the output element 330 of the brake C and the first sun gear S1_HS of the main gearset HS close to the transfer gearset, and along its axial course encloses part of the second sun shaft 140.

Referring to FIG. 3, a second example transmission layout according to the present invention will now be explained, which is based on the first transmission layout according to the invention described with reference to FIG. 2. Compared with FIG. 2, the differences concern only the design of the disk carrier ZYLBF for the two clutches B, F and the spatial position of the servomechanisms 210, 610 of those two clutches B, F. Thus, there is no need here to repeat the descriptions of the other structural elements of the transmission.

As can be seen from FIG. 3, the structural group with the two clutches B and F comprises the disk carrier ZYLBF common to the two clutches B and F as in FIG. 2, the disk sets 200, 600 of the two clutches B, F, and the servomechanisms 210 and 610 for actuating those disk sets 200 and 600, and is arranged axially between the transfer gearset VS and the housing wall GW fixed on the transmission housing close to the drive engine, being mounted to rotate on the hub GN fixed on the transmission housing. As in FIG. 2, the disk carrier ZYLBF forms the output element for both clutches B, F, is made as the inner disk carrier or clutch B and outer disk carrier for clutch F and, as appropriate for the kinematic coupling described, is in rotationally fixed connection with the first input element (i.e., here the first sun gear S1_HS) of the main gearset HS. The input element 220 of clutch B made as an outer disk carrier and the input element 620 of clutch F made as an inner disk carrier are as shown in FIG. 2. Otherwise than in FIG. 2, when viewed spatially the clutch B is now arranged completely radially over the clutch F, the disk set 200 of clutch B being positioned radially over the disk set 600 of clutch F and the servomechanism 210 of clutch B being positioned radially over the servomechanism 610 of clutch F.

As can also be seen from FIG. 3, the disk carrier ZYLBF common to the two clutches B, F is made geometrically in the form of a pot open in the direction of the transfer gearset VS (and the main gearset HS). On the outer diameter of this disk carrier ZYLBF is provided a stepped cylindrical section at whose end near the transfer gearset are arranged, on its inside diameter the outer disks of the disk set 600 of the (radially inner) clutch F, and on its outer diameter the inner disks of the disk set 200 of the (radially outer) clutch B. Thus, the two disk sets 600, 200 are axially adjacent to the transfer gearset VS. Starting from the end of the stepped cylindrical section of the disk carrier ZYLBF remote from the transfer gearset, a disk-shaped section of the disk carrier ZYLBF extends parallel to the housing wall GW radially inward as far as a hub 633 of the disk carrier ZYLBF. This hub 633 extends starting from the inside diameter of the disk-shaped section of the disk carrier ZYLBF, axially toward the transfer gearset VS and is mounted to rotate on the hub GN fixed on the transmission housing, to which the sun gear SO_VS of the transfer gearset VS is also attached.

The servomechanism 610 of clutch F is arranged completely inside a cylindrical space formed by the stepped cylindrical section of the disk carrier ZYLBF, and therefore always rotates at the speed of the first input element (i.e., here the first sun gear S1_HS) of the main gearset HS. This servomechanism 610 comprises a pressure chamber 611, a pressure equalization chamber 612, a piston 614, a restoring element 613 and a diaphragm plate 615. The piston 614 is fitted axially movably and sealed against pressure medium in the disk carrier ZYLBF, and is pre-stressed axially toward the hub section 633 of the disk carrier ZYLBF by the restoring element 613 in this case made for example as a cup spring. The pressure chamber 611 is formed by the piston 614 and part of the inner casing surface of the disk carrier ZYLBF. To offset the rotational pressure of the rotating pressure chamber 611, dynamic pressure equalization is provided by the pressure equalization chamber 612, this pressure equalization chamber 612 being formed by the piston 614 and the diaphragm plate 615 and being arranged closer to the transfer gearset VS (and main gearset HS) than is the pressure chamber 611.

The supply of the servomechanism 610 of clutch F with pressure medium and lubricant takes place in a constructively relatively simple manner via the hub GN fixed to the transmission housing, the corresponding ducts or holes extending partly within the housing hub GN and partly within the hub 633 of the disk carrier ZYLBF. The pressure medium supply to the pressure chamber 611 of the servomechanism 610 of clutch F is indexed 616, and the lubricant supply to the pressure equalization 612 of the servomechanism 610 of clutch F is indexed 617. When the pressure chamber 611 is pressurized with pressure medium to close the clutch F, the piston 614 moves axially toward the transfer gearset VS (and main gearset HS) and actuates the disk set 600 associated with it against the spring force of the restoring element 613.

As already mentioned, when viewed spatially the servomechanism 210 of the (radially outer) clutch B is arranged in an area radially over the servomechanism 610 of the (radially inner) clutch F. This servomechanism 210 comprises a pressure chamber 211, a pressure equalization chamber 212, a piston 214, a restoring element 213 and a support disk 218. The pressure chamber 211 of the servomechanism 210 of the (radially outer) clutch B is arranged at least approximately radially over the pressure chamber 611 of the servomechanism 610 of the (radially inner) clutch F, and the pressure equalization chamber 212 of the servomechanism 210 of the (radially outer) clutch B is arranged at least approximately radially over the pressure equalization chamber 612 of the servomechanism 610 of the (radially inner) clutch F. The pressure chamber 211 is formed by the piston 214, the support disk 218 and part of the outer casing surface of the disk carrier ZYLBF. For this, the support disk 218 is formed geometrically in the shape of a pot open toward the disk set 200 (or in the direction of the transfer gearset VS), whose casing surface encloses the piston 214 on the outside, and whose pot bottom is attached on its inside diameter to the outside diameter of the disk-shaped section of the disk carrier ZYLBF. In the example shown, a carrier profile is provided for attaching the support disk 218 to the disk carrier ZYLBF, which can transmit torque and is sealed against the pressure medium, and a locking ring is provided for axial securing. Thus, the piston 214 is mounted and able to move axially and sealed against pressure medium between the inside diameter of the cylindrical section of the support disk 218 and the outside diameter of the stepped cylindrical section of the disk carrier ZYLBF, and is pre-stressed by the restoring element 213 axially against the disk carrier ZYLBF. Here, the restoring element 213 is made for example as a spring packet of spiral springs arranged in a circle.

The supply of pressure medium 216 to the pressure chamber 211 of the servomechanism 210 of clutch B passes partly within the hub GN attached to the transmission housing, and partly within the disk carrier ZYLBF. To save structural length, the pressure equalization chamber 212 of the servomechanism 210 of the (radially outer) clutch B is filled with unpressurized lubricant directly via the pressure equalization chamber 612 of the servomechanism 610 of the (radially inner) clutch F. For this, at least one radial hole is provided at the outer diameter of the piston 614 of the servomechanism 610, which opens at one end into the pressure equalization chamber 612 of the servomechanism 610 and at the other end into an ring duct sealed on the outside against lubricant, on the inside diameter of the stepped cylindrical section of the disc carrier ZYLBF. In addition, at least one radial hole is provided in the stepped cylindrical section of the disk carrier ZYLBF, which opens at one end into the ring duct on the inside diameter of the stepped cylindrical section of the disk carrier ZYLBF and at the other end into the pressure equalization chamber 212 of the servomechanism 210. The corresponding holes and ducts between the two pressure equalization chambers 612, 212 are indexed 217 in FIG. 3. When the pressure chamber 211 of the servomechanism 210 is filled with pressure medium to engage the clutch B, the piston 214 moves axially toward the transfer gearset VS (and main gearset HS) and actuates the disk set 200 associated with it against the spring force of the restoring element 213.

To enable speed and torque transfer between the disk carrier ZYLBF, which forms the output element of the two clutches B, F, and the first sun gear S1_HS of the main gearset HS, as in the case of FIG. 2 a cylindrical connecting element ZYL is provided, which is formed geometrically as a pot opened in the direction of the housing wall GW with an ring casing surface which partially overlaps the structural group comprising the two clutches B, F and completely overlaps the transfer gearset VS and the two clutches E and A radially in the axial direction, and is rotationally fixed at its end facing the housing wall GW to the support disk 218 by way of a suitable carrier profile and to a disk-shaped pot bottom that extends radially inward next to the clutch A on its side facing the main gearset HS and is in rotationally fixed connection in its hub area with the first sun shaft 240. This first sun shaft 240, in turn, is connected to the output element 330 of the brake C and to the first sun gear S1_HS of the main gearset HS close to the transfer gearset.

Figure 4:
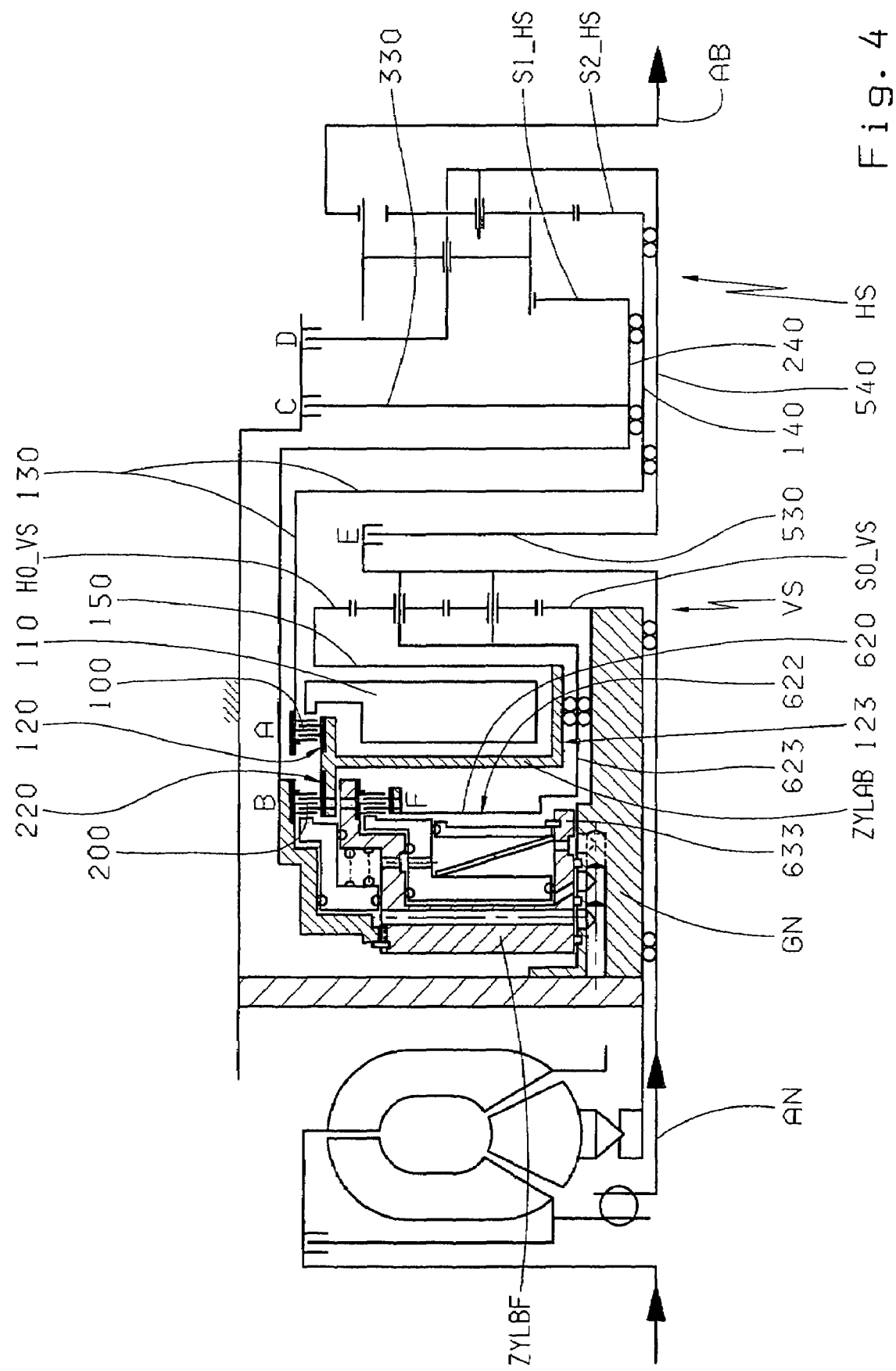
FIG. 4 is an example of a third transmission layout according to the invention.

Referring to FIG. 4, a third example transmission layout according to the present invention will now be explained, which is based on the second transmission layout according to the invention described with reference to FIG. 3. The essential difference compared with FIG. 3 concerns the spatial position of the clutch A. At least the disk set 100 of clutch A is now arranged on the side of the transfer gearset VS facing away from the main gearset HS, axially between this transfer gearset VS and the structural group consisting of the two clutches B and F. This provides the possibility of mounting the input element 620 of clutch F effectively, in combination with a proper mounting of the input elements 120, 220 of clutches A and B.

In the example shown in FIG. 4, the input element 620 of clutch F, in this case made as an inner disk carrier, has a disk-shaped section 622 which extends, starting from the disk set 600 of clutch F, radially inward as far as just above the hub GN fixed on the transmission housing, and a hub 623 attached to the disk-shaped section 622 in the area of its inside diameter, which extends axially toward the transfer gearset VS as far as just before its sun gear SO_VS, being in rotationally fixed connection in that area with the carrier plate of the coupled carrier ST_VS of the transfer gearset VS remote from the main gearset. Here, this hub 623 of the input element 620 is mounted to rotate on the hub GN fixed to the transmission housing with a relatively wide bearing base.

For the two clutches A, B a common disk carrier ZYLAB is provided, which forms the input element 120, 220 of both clutches A, B. Geometrically, this disk carrier ZYLAB is formed essentially as a cylinder. A hub 123 of the disk carrier ZYLAB is mounted to rotate on the hub 623 of the input element 620 of clutch F. A disk-shaped section of the disk carrier ZYLAB is attached to the hub 123 and extends radially outward as far as a diameter somewhat larger than the diameter of the ring gear HO_VS of the transfer gearset and corresponding approximately to the inside diameter of the disk sets 100, 200 of the two clutches A, B. At the outer diameter of the disk-shaped section of the disk carrier ZYLAB is attached, on the one hand, a first cylindrical section, associated with the input element 120 of clutch A, which extends axially toward the transfer gearset VS and holds on its outer diameter the inner disks of the disk set 100 of clutch A (here for example made as internally toothed steel disks). On the other hand, attached at the outer diameter of the disk-shaped section of the disk carrier ZYLAB is a second cylindrical section, which is associated with the input element 220 of clutch B, extends axially in the direction opposite to the transfer gearset VS, and on its outer diameter holds the inner disks of the disk set 200 of clutch B (here for example made as internally toothed lining disks). For the kinematic connection of the disk carrier ZYLAB, which forms the input element for both clutches A, B, to the output element of the transfer gearset VS—i.e., to the ring gear HO_VS—a carrier disk 150 is provided, which extends directly next to the transfer gearset VS parallel to its side facing away from the main gearset and is connected by suitable connection means to the ring gear HO_VS of the transfer gearset VS and the hub 123 of the disk carrier ZYLAB.

The output element 130 of clutch A is formed as an outer disk carrier, geometrically in the form of a pot open in the direction opposite to the main gearset HS, which overlaps the disk set 100 and a servomechanism 110 of clutch A, the transfer gearset VS and the clutch E radially in the axial direction. At the end of its cylindrical section remote from the main gearset this outer disk carrier 130 holds the outer disks of the disk set 100 of clutch A (here for example made as externally toothed lining disks). At the end of the cylindrical section of the outer disk carrier 130 close to the main gearset is attached a disk-shaped section ("pot bottom"), which extends adjacent and parallel to the output element 530 of clutch E radially inward and is in rotationally fixed connection in its hub area with the second sun shaft 140. This second sun shaft 140, in turn, encloses the carrier shaft 540 connected to the output element 530 of clutch E and extends radially inside the first sun shaft 240 connected with the first sun gear S1_HS of the main gearset HS axially toward the latter, passing centrally through the first sun gear S1_HS and being connected to the second sun gear S2_HS of the main gearset HS.

The servomechanism 110 provided for actuating the disk set 100 of clutch A is in this case for example arranged radially above the hub 123 of the disk carrier ZYLAB, rotates always with the speed of the output element—i.e., the ring gear HO_VS—of the transfer gearset VS, and actuates the disk set 100 associated with it when clutch A is engaged, axially in the direction opposite to the transfer gearset VS (and the main gearset HS). Of course, the servomechanism 110 here shown only schematically for the sake of simplicity, can have dynamic pressure compensation. Expediently, the pressure medium and lubricant supply (not shown in detail here) to the servomechanism 110 passes through corresponding ducts or holes partly within the hub GN attached to the transmission housing, partly within the hub 623 of the inner disk carrier 620 of clutch F, and partly within the hub 123 of the disk carrier ZYLAB common to the clutches A, B.

In another design embodiment of the spatial position of the servomechanism 110 of clutch A, it can for example also be provided that a piston of that servomechanism 110 is mounted to move axially within the output element 130 of clutch A, and a pressure chamber or pressure equalization chamber of this servomechanism 110 is arranged in the area axially next to the output element 530 of the clutch E. In this case it is appropriate for the outer disks of the disk set 100 of clutch A to be made as externally toothed steel disks and the inner disks of disk set 100 as internally toothed lining disks.

The spatial arrangement of the other structural elements of the transmission in the third transmission layout according to the invention shown in FIG. 4 corresponds to the arrangement illustrated in FIG. 3, and it is, therefore, unnecessary to repeat their description here.

Figure 5:
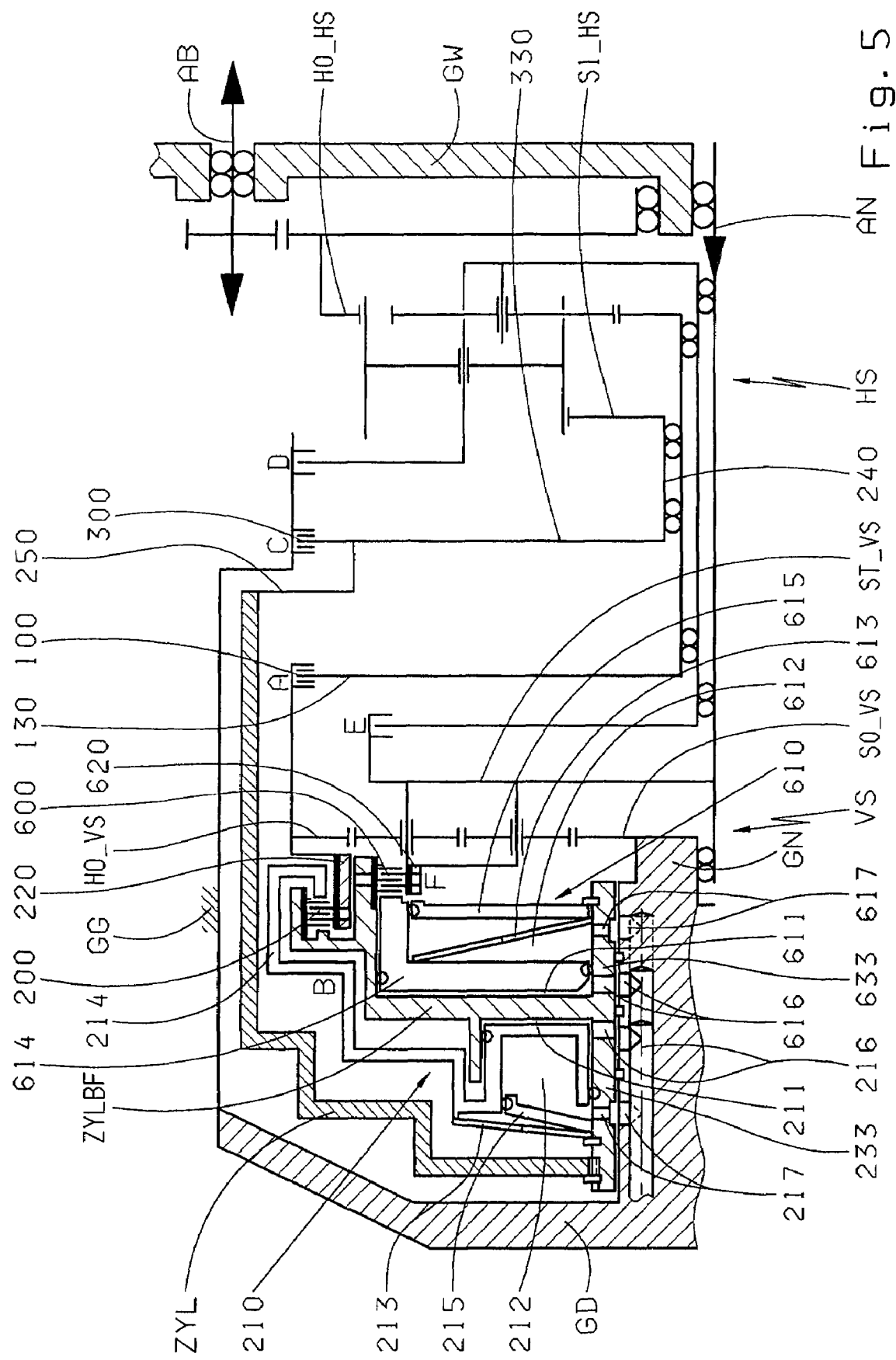
FIG. 5 is an example of a fourth transmission layout according to the invention.

Referring to FIG. 5, a fourth example transmission layout according to the present invention will now be explained, which is based on the first transmission layout according to the invention described with reference to FIG. 2. The essential differences from FIG. 2 concern the design of the disk carrier ZYLBF common to the two clutches B and F, the actuation direction of the servomechanism 210 of clutch B when engaging, and the spatial position of the transmission's drive input and drive output relative to one another. In the example shown in FIG. 5, the drive input shaft AN and the drive output shaft AB are now not arranged co-axially with one another, but with their axes parallel. The drive output of the transmission is now arranged close to a drive engine (not shown here) connected to the drive input shaft AN of the transmission. A first sun gear of the transmission output connected with the output element—i.e., here the ring gear HO_HS—of the main gearset HS and a second sun gear of the transmission output that meshes with this first sun gear are mounted to rotate on a housing wall GW attached to the transmission housing close to the drive engine. The second sun gear is connected simply with the drive output shaft AB. Of course, a differential can be kinematically interposed between these two sun gears and the drive output shaft AB. The drive input shaft AN passes through the housing wall GW centrally. From FIG. 5, however, it can immediately be seen that although this fourth transmission layout according to the invention, by virtue of the particular constructive design of the structural group with the two clutches B, F, is particularly well suited for use in use in a motor vehicle with a so-termed "front-transverse drive", those with knowledge of the subject would be able to modify this arrangement of the drive input and drive output shafts AN, AB if necessary without particularly great design effort, for a drive train with a co-axial arrangement of the drive input and output shafts.

As can also be seen from FIG. 5, the main gearset HS is now arranged close to the drive engine and the drive input shaft AN coupled with the carrier ST_VS of the transfer gearset VS passes centrally completely through it in the axial direction. Correspondingly, the transfer gearset VS is now on the side of the main gearset HS facing away from the drive engine. The spatial positions of the shift elements E, A, C and D—in particular the frictional elements of those shift elements E, A, C, D—in the area axially between the transfer gearset VS and the main gearset HS are the same as in FIG. 2. As in FIG. 2, the clutches B and F form a structural group which, from the standpoint of production technology, can easily be preassembled, and this is arranged on the side of the transfer gearset VS facing away from the main gearset HS, immediately adjacent to the transfer gearset VS and now axially between the transfer gearset VS and a housing cover GD fixed to the transmission housing. This housing cover GD forms the outer wall of the transmission housing GG opposite the drive engine. Of course, the housing cover GD and the transmission housing GG can also be formed as one piece. Here, the housing cover GD comprises a hub GN fixed on the housing, which extends axially toward the transfer gearset VS and on which the disk carrier ZYLBF common to the two clutches B, F is mounted to rotate. The sun gear SO_VS of the transfer gearset VS is fixed on this hub GN on the transmission housing GG.

For both clutches B, F the disk carrier ZYLBF forms their output element which is connected with the first input element (sun gear S1_HS) of the main gearset HS, but in contrast to FIG. 2, is now formed for both clutches B, F as the outer disk carrier which holds the outer disks of the respective disk sets 200 and 600. Correspondingly, the input elements 220, 620 of the two clutches B, F are now made as inner disk carriers which hold the inner disks of the respective disk sets 200 and 600. The disk set 200 of clutch B is arranged on a larger diameter than the disk set 600 of clutch F, spatially in an area approximately radially over this disk set 600.

Geometrically, the disk carrier ZYLBF common to the two clutches B, F has an essentially cylindrical structure. A hub of the disk carrier ZYLBF is mounted to rotate on the hub GN of the housing wall GW attached to the transmission housing. Starting from this hub of the disk carrier ZYLBF, the first disk-shaped section of the disk carrier ZYLBF extends approximately at the middle of the hub radially outward, approximately to the outer diameter of the disk set 600 of clutch F (here for example, approximately to the diameter of the ring gear HO_VS of the transfer gearset VS) and so divides this hub of the disk carrier ZYLBF geometrically into two hub sections 633 and 233. The hub section 633 extends axially in the direction of the transfer gearset VS as far as its sun gear SO_VS and—as can be seen from the nomenclature chosen—is associated with the output element of clutch F. The other hub section 233 is associated with the output element of clutch B and extends axially toward the housing cover GD. At the outer diameter of the first disk-shaped section of the disk carrier ZYLBF is connected a first cylindrical section of the disk carrier ZYLBF, which extends axially toward the transfer gearset VS as far as above the disk set 600 of clutch F axially adjacent to the transfer gearset VS, having on its inside diameter a suitable carrier profile for holding the outer disks of this disk set 600. At the outer diameter of this first cylindrical section of the disk carrier ZYLBF—here for example, spatially approximately in the middle of the section—is connected a second disk-shaped section of the disk carrier ZYLBF which extends radially outward approximately to the outer diameter of the (radially outer) disk set 200 of clutch B. At the outer diameter of this second disk-shaped section of the disk carrier ZYLBF is connected a second cylindrical section of the disk carrier ZYLBF, which extends axially toward the transfer gearset VS as far as above the disk set 200 of clutch B close to the transfer gearset VS, and has on its inside diameter a suitable carrier profile to hold the outer disks of this disk set 200.

The servomechanism 610 of clutch F, comprising a pressure chamber 611, a pressure equalization chamber 612, a piston 614, a restoring element 613 and a diaphragm plate 615, is arranged completely inside a cylindrical space formed by the first disk-shaped section and the first cylindrical section of the disk carrier ZYLBF, essentially radially above the hub section 633. The piston 614 is mounted to move axially and sealed against pressure medium (specifically on the hub section 633 and the first cylindrical section of the disk carrier ZYLBF). Correspondingly, the servomechanism 610 always rotates at the speed of the first input element (i.e., here the sun gear S1_HS) of the main gearset HS. To offset the rotational pressure of the rotating chamber 611 of the servomechanism 610, an unpressurized lubricant is directed to the pressure equalization chamber 612 to provide dynamic pressure compensation, this pressure equalization chamber 612 being arranged closer to the transfer gearset VS (and main gearset HS) than is the pressure chamber 611. The pressure chamber 611 is formed by a casing surface of the disk carrier ZYLBF (specifically, by the first disk-shaped section of the disk carrier ZYLBF, part of the first cylindrical section of the disk carrier ZYLBF and part of the hub section 633) and the piston 614. The pressure equalization chamber 612 is formed by the piston 614 and the diaphragm plate 615, which is fixed axially on the hub section 633 of the disk carrier ZYLBF and can move axially relative to the piston 614, sealed against lubricant. The piston 614 is pre-stressed axially against the hub section 633 of the disk carrier ZYLBF by the restoring element 613, in this case made for example as a cup spring. When the pressure chamber 611 is pressurized with pressure medium to close the clutch F, the piston 614 moves axially in the direction of the transfer gearset VS (and the main gearset HS) and actuates the disk set 600 associated with it against the spring force of the restoring element 613.

Viewed spatially, the servomechanism 210 of clutch B is arranged at least mainly in an area radially over the second hub section 233 of the disk carrier ZYLBF, and is also mounted to move axially on the disk carrier ZYLBF. Correspondingly, the servomechanism 210 also always rotates at the speed of the first input element (i.e., here the first sun gear S1_HS) of the main gearset HS. The servomechanism 210 of clutch B comprises a pressure chamber 211, a pressure equalization chamber 212, a piston 214 formed with a meander shape in sections, a restoring element 213 and a diaphragm plate 215. To offset the rotational pressure of the rotating pressure chamber 211 of the servomechanism 210, dynamic pressure equalization is provided by the pressure equalization chamber 212 when filled with unpressurized lubricant. To form the pressure chamber 211, the disk carrier ZYLBF has a third cylindrical section which extends on a defined diameter starting from the first disk-shaped section of the disk carrier ZYLBF, axially toward the housing wall GW. The piston 214 is sealed against pressure medium and mounted to move axially on the disk carrier ZYLBF, specifically on the hub section 233 and on the third cylindrical section of the disk carrier ZYLBF. Correspondingly, the pressure chamber 211 is formed by a casing surface of the disk carrier ZYLBF (specifically, by part of the first disk-shaped section of the disk carrier ZYLBF, part of the third cylindrical section of the disk carrier ZYLBF and part of the hub section 233) and the piston 214. Along its further geometrical course the piston 214 overlaps the third cylindrical section of the disk carrier ZYLBF in a meander shape in the axial and radial direction, and extends essentially along the outer contour of the disk carrier ZYLBF radially on the outside, as far as its outer diameter, then overlaps the disk set 200 of clutch B in the axial and radial direction, so that an actuation finger or actuation ring connected to the piston on the side of the disk set 200 facing toward the transfer gearset VS acts on this disk set 200. The piston 214 is pre-stressed axially toward the hub section 233 of the disk carrier ZYLBF by the restoring element 213, here for example made as a cup spring. When the pressure chamber 211 is pressurized with pressure medium to close the clutch B, the piston 214 moves axially in the direction opposite to the transfer gearset VS (and main gearset HS), and actuates the disk set 200 associated with it against the spring force of the restoring element 213.

Thus, in contrast to FIG. 2, the pressure chamber 211 of the servomechanism 210 of clutch B is now arranged directly adjacent to the pressure chamber 611 of the servomechanism 610 of clutch F, and is separated from the latter only by a casing surface of the disk carrier ZYLBF common to the clutches B, F. The actuation directions of these two servomechanisms 210, 610 when closing the respective clutches B and F are different. Relative to the spatial position of the pressure chamber 211 and the disk set 200, the clutch B is now actuated "by tension" when it is engaged.

As already mentioned, the servomechanism 210 of clutch B also has dynamic pressure compensation. Viewed spatially, the corresponding pressure equalization chamber 212 is arranged on the side of the piston 214 of the servomechanism 210 facing away from the pressure chamber 211 of the servomechanism 210, in an area radially under the third cylindrical section of the disk carrier ZYLBF. This pressure equalization chamber 212 is formed by the piston 214 and the diaphragm plate 215, which can move axially relative to the piston 214, sealed against lubricant, and is axially fixed on the hub section 233 of the disk carrier ZYLBF.

By virtue of the mounting of the disk carrier ZYLBF on the hub GN of the housing wall GW fixed to the transmission housing, relatively simply designed pressure medium and lubricant supply is possible to the two clutches B, F via corresponding ducts or holes, which extend partially within the housing hub GN and partially within the hub of the disk carrier ZYLBF. The pressure medium supply to the pressure chamber 211 of the servomechanism 210 of clutch B is indexed 216, the lubricant supply to the pressure equalization chamber 212 of the servomechanism 210 of clutch B is indexed 217, the pressure medium supply to the pressure chamber 611 of the servomechanism 610 of clutch F is indexed 616, and the lubricant supply to the pressure equalization chamber 612 of the servomechanism 610 of clutch F is indexed 617.

To enable speed and torque transfer between the disk carrier ZYLBF, which forms the output element of the two clutches B, F and the sun gear S1_HS of the main gearset HS, a cylindrical connecting element ZYL is provided, which is formed geometrically as a pot open in the direction of the main gearset HS. A pot bottom of this connecting element ZYL extends in the radial direction between the housing cover GD and the piston 214 of the servomechanism 210 of clutch B, and is adapted essentially to the contour of this piston 214, particularly in the radially outer area. In the example shown, this produces a contour of the pot bottom which has a number of bends but is essentially still disk-shaped. Thus, the radially outer end of the pot bottom is here for example located approximately radially over the first disk-shaped section of the disk carrier ZYLBF. The housing wall GW too is inclined axially on a larger diameter toward the transfer gearset VS, which is again particularly advantageous for fitting the transmission in a motor vehicle with "front-transverse drive", since the structural space available for the transmission in this area is usually considerably restricted by a vehicle longitudinal frame. In its hub area, the pot bottom of the connecting element ZYL is connected rotationally fixed to the end of the hub section 233 of the disk carrier ZYLBF on the housing cover side, here for example with positive locking by way of a suitable carrier profile. At the outer diameter of the pot bottom, on a diameter larger than the outer diameter of the piston 214, an ring casing surface of the cylindrical connecting element ZYL is fixed to the pot bottom and extends axially toward the main gearset HS, thereby overlapping the disk sets 200 and 600 of clutches B and F (essentially arranged radially over one another), the transfer gearset VS and the clutches E and A completely, in the axial direction. At its end close to the main gearset, viewed spatially in an area axially between the disk set 100 of clutch A and the disk set 300 of the brake C, the cylindrical connecting element ZYL is connected rotationally fixed to a carrier plate 250, for example with positive locking by way of a suitable carrier profile. This carrier plate 250, is connected to the output element 330 of the brake C formed as an inner disk carrier. The output element 330 of the brake C, in turn, extends radially inward axially adjacent to the output element 130 of clutch A, and is in rotationally fixed connection in its hub area with a sun shaft 240. This sun shaft 240, in turn, is connected to the sun gear S1_HS of the main gearset HS close to the transfer gearset.

In another design it can for example also be provided, that—with the spatial position of the disk set 300 of brake C in an area axially between the clutch A and the brake D—the cylindrical connecting element ZYL at the same time forms the inner disk carrier 330 of the brake. If the disk set 300 of brake C is arranged under the outer diameter of the connecting element ZYL, the section of the connecting element ZYL previously called the pot bottom must be made as a separate component. Of course, the brake C can also be arranged on a diameter larger than the outer diameter of the connecting element ZYL. In still another design, the brake C, viewed spatially, can also be arranged on the side of the transfer gearset VS facing away from the main gearset HS, for example, in an area radially over the clutch B or in an area between the housing cover GD and the pot bottom of the connecting element ZYL, radially above the pressure equalization chamber 212 of the servomechanism 210 of clutch B.

Figure 6:
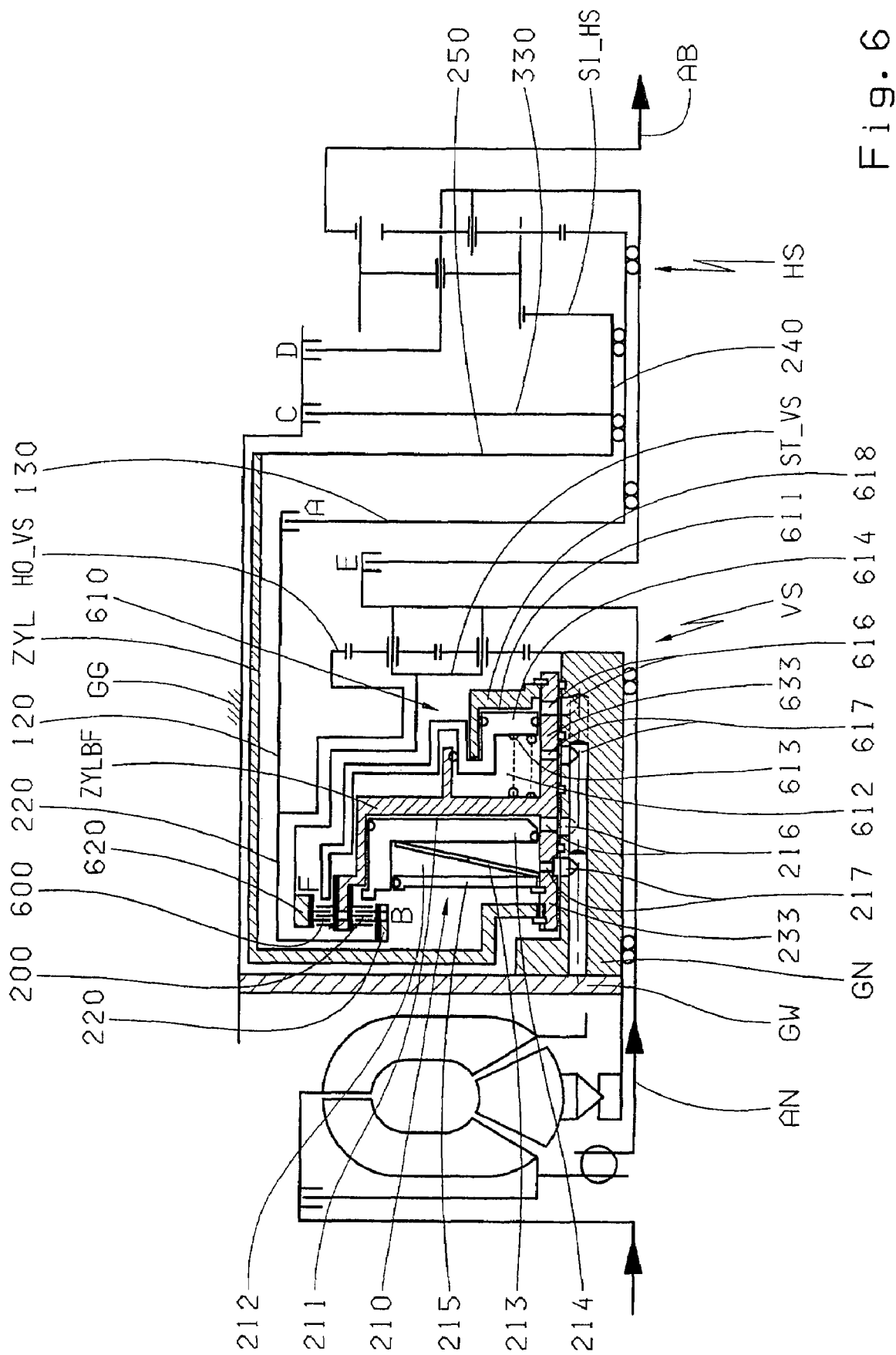
FIG. 6 is an example of a fifth transmission layout according to the invention.

With reference to FIG. 6, a fifth example transmission layout according to the present invention will now be explained, which is again based on the first transmission layout according to the invention described with reference to FIG. 2. The essential differences from FIG. 2 concern the design of the disk carrier ZYLBF common to the two clutches B and F, and the arrangement of the disk sets 200, 600 of the two clutches B, F relative to one another. In the example shown in FIG. 6, the preassembled structural group comprising the two clutches B and F is arranged, as before, on the side of the transfer gearset VS facing away from the main gearset HS, in an area axially between the transfer gearset VS and a housing wall GW fixed on the transmission housing. As before, this structural group with the two clutches B, F also comprises a disk carrier ZYLBF common to the two clutches B, F, the disk sets 200 and 600 of those two clutches B, F and the servomechanisms 210 and 610 for actuating these disk sets 200, 600. An essential difference compared with FIG. 2 is that the disk set 200 of clutch B is now arranged on a smaller diameter than the disk set 600 of clutch F, spatially in an area radially under this disk set 600. Thus, the two disk sets 200, 600 arranged radially one over the other are now positioned on the side of the structural group facing away from the transfer gearset VS and toward the housing wall GW fixed on the transmission housing.

The disk carrier ZYLBF common to the two clutches B, F forms their output element and is made for clutch F as an inner disk carrier to hold internally toothed disks of the (radially outer) disk set 600, and for clutch B as an outer disk carrier to hold externally toothed disks of the (radially inner) disk set 200. Correspondingly, the input element 620 of clutch F connected to the coupled carrier ST_VS of the transfer gearset VS and via this carrier ST_VS to the drive input shaft AN, is made as an outer disk carrier to hold externally toothed disks of the disk set 600 of the clutch F. The input element 220 of clutch B connected to the ring gear HO_VS of the transfer gearset VS is made as an inner disk carrier to hold the internally toothed inner disks of the disk set 200 of this clutch B. Corresponding to the spatial position of the two disk sets 200, 600 arranged radially one over the other on the side of the structural group facing away from the transfer gearset VS and facing toward the housing wall GW fixed to the transmission housing, the input element 220 of clutch B overlaps the input element 620 and the (radially outer) disk set 600 of clutch F and the (radially inner) disk set 200 of clutch B completely, in the axial and radial directions.

Geometrically, the disk carrier ZYLBF common to the clutches B, F has an essentially cylindrical structure and is mounted to rotate on a hub GN fixed to the transmission housing, which extends starting from the housing wall GW into the inside space of the transmission axially in the direction of the transfer gearset VS. The sun gear SO_VS of the transfer gearset VS is fixed on this hub GN by suitable connection means. Of course, the hub GN and the housing wall GW can also be made as one piece. For example, the hub GN can also be a vane shaft of a torque converter arranged in the force flow between the drive input shaft AN and the drive engine of the transmission. On the outer diameter of the disk carrier ZYLBF is provided a first cylindrical section, on whose inner diameter the outer disks of the disk sets 200 of clutch B, and on whose outer diameter the inner disks of the disk set 600 of clutch F are arranged, the two disk sets 600 and 200—as already mentioned—being positioned close to the housing wall GW fixed on the transmission housing. Starting from the end of the first cylindrical section of the disk carrier ZYLBF close to the transfer gearset, i.e., on the side of the disk set 200 near the transfer gearset, an at least largely disk-shaped section of the disk carrier ZYLBF extends radially inward as far as the hub of the disk carrier ZYLBF. This hub is divided into two hub sections 633 and 233. Starting from the inside diameter of the disk-shaped section of the disk carrier ZYLBF, the hub section 633 extends axially toward the transfer gearset VS and—as can be seen from the nomenclature chosen—is associated with the output element of the clutch F. The other hub section 233 is associated with the output element of clutch B and extends, starting from the inside diameter of the disk-shaped section of the disk carrier ZYLBF, axially toward the housing wall GW.

The servomechanism 610 of clutch F for actuating the radially outer disk set 600 comprises a pressure chamber 611, a pressure equalization chamber 612, a piston 614 formed in a meander shape in sections, a restoring element 613 and a partly cylindrical support disk 618, and is arranged essentially radially above the hub section 633 of the disk carrier ZYLBF (close to the transfer gearset), The piston 614 is mounted to move axially on the disk carrier ZYLBF. Correspondingly, the servomechanism 610 always rotates at the speed of the first input element (i.e., here the first sun gear S1_HS) of the main gearset HS. To offset the rotational pressure of the rotating pressure chamber 611 of the servomechanism 610, dynamic pressure compensation is provided by the pressure equalization chamber 612 when filled with unpressurized lubricant, the pressure chamber 611 being arranged closer to the transfer gearset VS (and the main gearset HS) than is this pressure equalization chamber 612. To form the pressure chamber 611 the support disk 618 is fixed, sealed against pressure medium and axially secured on the hub section 633 of the disk carrier ZYLBF at the end of the latter close to the transfer gearset. The cylindrical section of the support disk 618 extends axially in the direction opposite to the transfer gearset VS. The piston 614 of the servomechanism 610 can move axially and is sealed against pressure medium on this cylindrical section of the support disk 618 and on the hub section 633 of the disk carrier ZYLBF, and has a meander-shaped contour in this area. Correspondingly, the pressure chamber 611 of the servomechanism 610 is formed by the piston 614, the cylindrical section of the support disk 618, the disk-shaped section of the support disk 618 located radially under this cylindrical section of the support disk 618, and part of the hub section 633 of the disk carrier ZYLBF. To form the pressure equalization chamber 612 of the servomechanism 610, on a defined diameter larger than the diameter of the cylindrical section of the support disk 618 the disk carrier ZYLBF has a second cylindrical section, which extends starting from the disk-shaped section of the disk carrier ZYLBF, here for example made as one piece, axially in the direction of the transfer gearset VS. The piston 614, which is meander-shaped in this area, can move axially and is sealed against lubricant on this second cylindrical section of the disk carrier ZYLBF. Correspondingly, the pressure equalization chamber 612 is formed by the piston 614, the second cylindrical section of the disk carrier ZYLBF, and the disk-shaped section of the disk carrier ZYLBF located radially under this second cylindrical section of the disk carrier ZYLBF. Along its further geometrical course the piston 614 extends at least largely along the outer contour of the radially upper area of the disk carrier ZYLBF, radially on the outside and axially in the direction of the housing wall GW, as far as the side of the disk set 600 of clutch F associated with it close to the transfer gearset. The piston 614 is axially pre-stressed by the restoring element 613, here for example, made as a spiral spring packet arranged axially between the disk-shaped section of the disk carrier ZYLBF and the piston 614. When the pressure chamber 611 is pressurized with pressure medium to close the clutch V, the piston 614 moves axially toward the housing wall GW (i.e., axially in the direction opposite to the transfer gearset VS and main gearset HS) and actuates the disk set 600 associated with it against the spring force of the restoring element 613. Thus, the piston 614 almost completely overlaps the disk carrier ZYLBF common to the two clutches B, F.

Viewed spatially, the servomechanism 610 of clutch F is arranged closer to the main and transfer gearsets HS, VS than is the servomechanism 210 of the clutch B. This servomechanism 210 of clutch B, comprising a pressure chamber 211, a pressure equalization chamber 212, a piston 214, a restoring element 213 and a diaphragm plate 215, is arranged completely inside a cylindrical space formed by the first cylindrical section close to the housing wall and the disk-shaped section of the disk carrier ZYLBF, essentially radially above the hub section 233 (remote from the transfer gearset). The piston 214 is mounted to move axially on the disk carrier ZYLBF. Correspondingly, the servomechanism 210 also always rotates at the speed of the first input element (i.e., here the first sun gear S1_HS) of the main gearset HS. To offset the rotational pressure of the rotating pressure chamber 211 of the servomechanism 210, dynamic pressure compensation is provided by the pressure equalization chamber 212 when filled with unpressurized lubricant, the pressure chamber 211 being arranged closer to the transfer gearset VS (and main gearset HS) than is this pressure equalization chamber 212. The pressure chamber 211 is formed by a casing surface of the disk carrier ZYLBF (specifically, by part of the first cylindrical section of the disk carrier ZYLBF close to the housing wall, the disk-shaped section of the disk carrier ZYLBF and part of the hub section 233 of the disk carrier ZYLBF close to the housing wall) and the piston 214. The pressure equalization chamber 212 is formed by the piston 214 and the diaphragm plate 215, which is fixed axially on the hub section 233 of the disk carrier ZYLBF and can move axially relative to the piston 214, being sealed against lubricant. The pressure chamber 211 of the servomechanism 210 of clutch B is thus closer to the transfer gearset VS (and main gearset HS) than is the pressure equalization chamber 212 of this servomechanism 210, so that the pressure chamber 211 of clutch B and the pressure equalization chamber 612 of the servomechanism 610 of clutch F are arranged directly adjacent to one another and separated from one another only by a casing surface of the disk carrier ZYLBF common to both clutches B, F. The piston 214 of the servomechanism 210 is pre-stressed against the hub section 233 of the disk carrier ZYLBF by the restoring element 213, here for example made as a cup spring. When the pressure chamber 211 is pressurized with pressure medium to engage the clutch B, the piston 214 moves axially in the direction opposite to the transfer gearset VS (and main gearset HS) and actuates the disk set 200 associated with it against the spring force of the restoring element 213.

By virtue of the mounting of the disk carrier ZYLBF on the hub GN fixed to the transmission housing, relatively simply designed pressure medium and lubricant supply to the two clutches B, F is possible via corresponding ducts or holes, which pass partly within the housing hub GN and partly within the hub of the disk carrier ZYLBF. The pressure medium supply to the pressure chamber 211 of the servomechanism 210 of clutch B is indexed 216, the lubricant supply to the pressure equalization chamber 212 of the servomechanism 210 of clutch B is indexed 217, the pressure medium supply to the pressure chamber 611 of the servomechanism 610 of clutch F is indexed 616, and the lubricant supply to the pressure equalization chamber 612 of the servomechanism 610 of clutch F is indexed 617.

To connect the disk carrier ZYLB which, as already said, forms the output element of the two clutches B, F, with the first input element of the main gearset HS—i.e., in this case with the sun gear S1_HS close to the transfer gearset, of the main gearset HS for example again made as a Ravigneaux planetary gearset—a cylindrical connecting element ZYL is provided as in FIG. 5, which is geometrically formed as a pot open toward the main gearset HS. Axially adjacent to the housing wall GW and essentially parallel to it, an essentially disk-shaped pot bottom of this connecting element ZYL extends in the radial direction, axially between the housing wall GW and a disk-shaped section of the input element (inner disk carrier) 220 of the clutch B, which extends on the side of the disk sets 200, 600 of the clutches B, F arranged radially one over the other remote from the transfer gearset. On its inside diameter the pot bottom of the connecting element ZYL is connected rotationally fixed to the hub of the disk carrier ZYLBF, in the example shown with positive locking by way of a suitable carrier profile at the end of the hub section 233 on the housing wall side. At the outer diameter of the pot bottom, on a diameter larger than the outer diameter of the disk set 600 and the outer disk carrier 620 of clutch F, is connected to this pot bottom an ring casing surface of the cylindrical connecting element ZYL which extends axially in the direction of the main gearset HS and completely overlaps the disk sets 200 and 600 of the clutches B and F (arranged essentially radially over one another), the transfer gearset VS and the clutches E and A in the axial direction. At its end near the main gearset, the cylindrical connecting element ZYL is in rotationally fixed connection with a carrier plate 250, for example with positive locking by way of a suitable carrier profile. This carrier plate 250 extends in an area axially between the output element 130 of clutch A and the output element 330 of the brake C, and is in rotationally fixed connection with the sun shaft 240 in the area of its inside diameter. In turn, the sun shaft 240 is connected with the sun gear S1_HS of the main gearset HS close to the transfer gearset. Of course, this design solution for the kinematic connection of the disk carrier ZYLBF to the sun gear S1_HS should be regarded as an example; possible alternative example design solutions have already been explained in connection with FIG. 5.

The spatial arrangement of the remaining transmission structural elements of the fifth transmission layout according to the invention shown in FIG. 6 corresponds to the arrangement shown in FIG. 2 and, therefore, need not be described again at this point.

Figure 7:
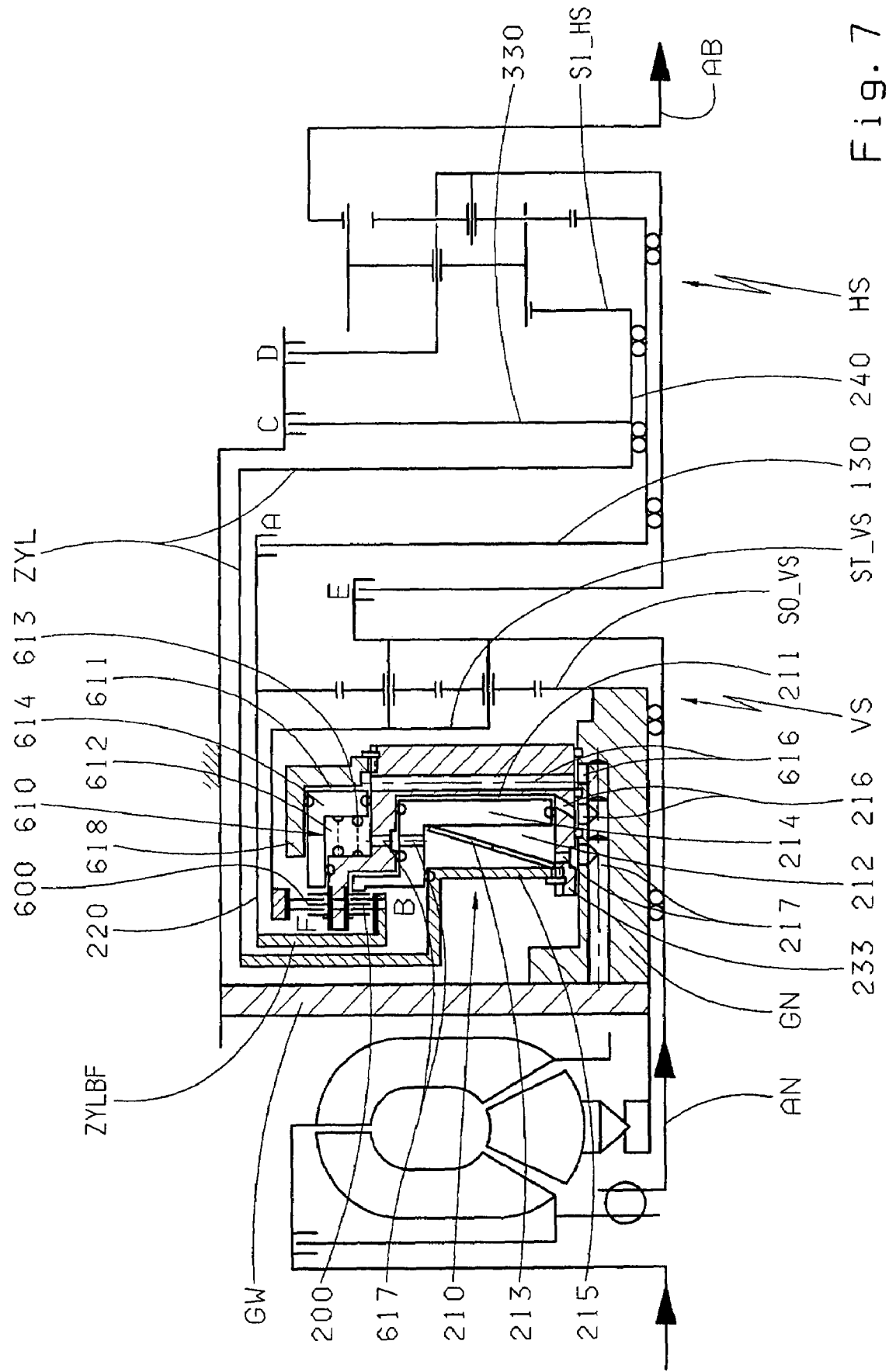
FIG. 7 is an example of a sixth transmission layout according to the invention.

Referring to FIG. 7, a sixth example transmission layout according to the present invention will now be explained, which is based on the fifth transmission layout according to the invention previously described with reference to FIG. 6. The changes compared with FIG. 6 concern only the design of the disk carrier ZYLBF common to the two clutches B, F and the spatial position of the servomechanisms 210, 610 of those two clutches B, F. Accordingly, descriptions of the other structural elements of the transmission need not be repeated here. As can be seen from FIG. 7, the principle according to which the servomechanisms of the structural group comprising the two clutches B, F, described with reference to FIG. 3, is now applied to the design of the disk carrier ZYLBF common to the two clutches B, F, in which the disk set 600 of clutch F is arranged radially over the disk set 200 of clutch B and both those disk sets 200, 600 are arranged on the side of the structural group facing away from the transfer gearset VS.

Now, the servomechanism 610 of clutch F is spatially arranged radially over the servomechanism 210 of clutch E. In this, a pressure chamber 611 of the (radially outer) servomechanism 610 is arranged approximately radially over a pressure chamber 211 of the (radially inner) servomechanism 210, and a pressure equalization chamber 612 for dynamic pressure compensation of the (radially outer) servomechanism 610 is arranged approximately radially over a pressure equalization chamber 212 for the dynamic pressure compensation of the (radially inner) servomechanism 210. The pressure chambers 211, 611 are arranged closer to the transfer gearset VS (and main gearset HS) than are the respective pressure equalization chambers 212, 612.

As can also be seen from FIG. 7, the disk carrier ZYLBF common to the two clutches B, F is made geometrically in the form of a pot open in the direction of the housing wall GW. On the outer diameter of this disk carrier ZYLBF a stepped cylindrical section is provided, at whose end near the housing wall are arranged, on the inside diameter the outer disks of the disk set 200 of the (radially inner) clutch B, and on the outer diameter the inner disks of the disk set 600 of the (radially outer) clutch F. Both disk sets 600, 200 are positioned adjacent to the housing wall GW. Starting from the end of the stepped cylindrical section of the disk carrier ZYLBF close to the transfer gearset, a disk-shaped section of the disk carrier ZYLBF extends radially inward adjacent to the coupled carrier ST_VS of the transfer gearset VS as far as a hub 233 of the disk carrier ZYLBF. Starting from the inside diameter of the disk-shaped section of the disk carrier ZYLBF, this hub 233 extends axially toward the housing wall GW and is mounted to rotate on a hub GN attached to the transmission housing, on which the sun gear SO_VS of the transfer gearset VS is also fixed.

The servomechanism 210 of clutch B is arranged completely inside a cylindrical space formed by the stepped cylindrical section and the disk-shaped section of the disk carrier ZYLBF, and accordingly always rotates at the speed of the first input element (i.e., here the first sun gear S1_HS) of the main gearset HS. This servomechanism 210 comprises the pressure chamber 211, the pressure equalization chamber 212, a piston 214, a restoring element 213 and a diaphragm plate 215. The piston 214 is mounted to move axially and sealed against pressure medium in the disk carrier ZYLBF, and is pre-stressed axially against the hub section 233 of the disk carrier ZYLBF by the restoring element 213 here made for example as a cup spring. The pressure chamber 211 is formed by the piston 214 and part of the inner casing surface of the disk carrier ZYLBF. The pressure equalization chamber 212 for compensating the rotational pressure of the rotating pressure chamber 211 is positioned on the side of the pressure chamber 211 facing away from the transfer gearset VS, and is formed by the piston 614 and the diaphragm plate 215.

The pressure medium and lubricant are supplied to the servomechanism 210 of clutch B in a relatively simply designed manner via the hub GN fixed on the transmission housing, the corresponding ducts or holes passing partly within the housing hub GN and partly within the hub 233 of the disk carrier ZYLBF. The pressure medium supply to the pressure chamber 211 of the servomechanism 210 of clutch B is indexed 216 and the lubricant supply to the pressure equalization chamber 212 of the servomechanism 210 of clutch B is indexed 217. When the pressure chamber 211 is pressurized with pressure medium to close the clutch B, the piston 214 moves axially in the direction opposite to the transfer gearset VS (and main gearset HS), and actuates the disk set 200 associated with it against the spring force of the restoring element 213.

As already mentioned, the servomechanism 610 of the (radially outer) clutch F is arranged spatially in an area radially over the servomechanism 210 of the (radially inner) clutch B. This servomechanism 610 comprises the pressure chamber 611, the pressure equalization 612, a piston 614, a restoring element 613 and a support disk 618. The pressure chamber 611 of the (radially outer) servomechanism 610 is arranged at least approximately radially over the pressure chamber 211 of the (radially inner) servomechanism 210, and the pressure equalization chamber 612 of the (radially outer) servomechanism 610 at least approximately radially over the pressure equalization chamber 212 of the (radially inner) servomechanism 210. The pressure chamber 611 is formed by the piston 614, the support disk 618 and part of the outer casing surface of the disk carrier ZYLBF. For this, the support disk 618 is formed geometrically in the shape of a pot open in the direction of the disk set 600 (or in the direction of the housing wall GW), whose casing surface encloses the piston 614 on the outside, and whose pot bottom is fixed, sealed against pressure medium at its inside diameter on the outer diameter of the disk-shaped section of the disk carrier ZYLBF. In the example shown, a carrier profile sealed against the pressure medium is provided for fixing the support disk 618 to the disk carrier ZYLBF, and a locking ring is provided for fixing it axially. Thus, the piston 614 is mounted to move axially and sealed against pressure medium between the inside diameter of the cylindrical section of the support disk 618 and the outer diameter of the stepped cylindrical section of the disk carrier ZYLBF, and is pre-stressed by the restoring element 613 axially against the disk carrier ZYLBF. In this case the restoring element 613 is made for example as a spring packet of spiral springs arranged in a ring.

The pressure medium supply 616 to the pressure chamber 611 of the servomechanism 610 of clutch F passes partly within the hub GN fixed to the transmission housing and partly within the disk carrier ZYLBF. In this case the pressure equalization chamber 612 of the servomechanism 610 of the (radially outer) clutch F is filled with unpressurized lubricant directly via the pressure equalization chamber 212 of the servomechanism 210 of the (radially inner) clutch B, in a structural length saving manner. For this, at the outer diameter of the piston 214 of the (radially inner) servomechanism 610, at least one radial hole is provided, which opens at one end into the pressure equalization chamber 212 of the servomechanism 210 and at the other end into an ring channel sealed against lubricant on the outside at the inside diameter of the stepped cylindrical section of the disk carrier ZYLBF. In addition, at least one radial hole is provided in the stepped cylindrical section carrier ZYLBF, which opens at one end into the ring channel on the inside diameter of the stepped cylindrical section of the disk carrier ZYLBF, and at the other end into the pressure equalization chamber 612 of the (radially outer) servomechanism 610. The corresponding holes or ducts between the two pressure equalization chambers 212, 612 are indexed 617 in FIG. 7. When the pressure chamber 611 of the servomechanism 610 is filled with pressure medium to close the clutch F, the piston 614 moves axially in the direction of the housing wall GW (or axially in the direction opposite to the transfer gearset VS and main gearset HS), and actuates the disk set 600 associated with it against the spring force of the restoring element 613.

To connect the disk carrier ZYLBF forming the output element of the two clutches B, F with the sun gear S1_HS of the main gearset HS close to the transfer gearset, a cylindrical connecting element ZYL is provided, which is formed geometrically as a pot open in the direction of the housing wall GW. A pot bottom of this connecting element ZYL extends axially between the output element 130 of clutch A and the output element 330 of the brake C, and is connected rotationally fixed in the area of its inside diameter to a sun shaft 240. In turn, this sun shaft 240 is connected both with the output element 330 of the brake C and also with the sun gear S1_HS of the main gearset HS close to the transfer gearset. At the outer diameter of the pot bottom of the connecting element ZYL, on a diameter larger than the outer diameter of clutch A, an ring casing surface of the connecting element ZYL is connected to the pot bottom and extends axially toward the housing wall GW, so overlapping the two clutches A and E, the transfer gearset VS and the clutch F (and therefore also the clutch B positioned radially under the clutch F) completely in the axial direction. At its end near the housing wall, the cylindrical connecting element ZYL is rotationally fixed to the diaphragm plate 215 of the servomechanism 210 of clutch B. As can be seen in FIG. 7, a radially outer section of this diaphragm plate 215 extends in the area of the joint to the connecting element ZYL axially between the housing wall GW and the disk-shaped section of the input element (inner disk carrier) 220 of clutch B, which extends on the side of the disk sets 200, 600 of the clutches B, F arranged radially one over the other remote from the transfer gearset. At its inside diameter the diaphragm plate—as already mentioned—is connected rotationally fixed to the hub 233 of the disk carrier ZYLBF by way of a torque-transmitting carrier profile.

Figure 8:
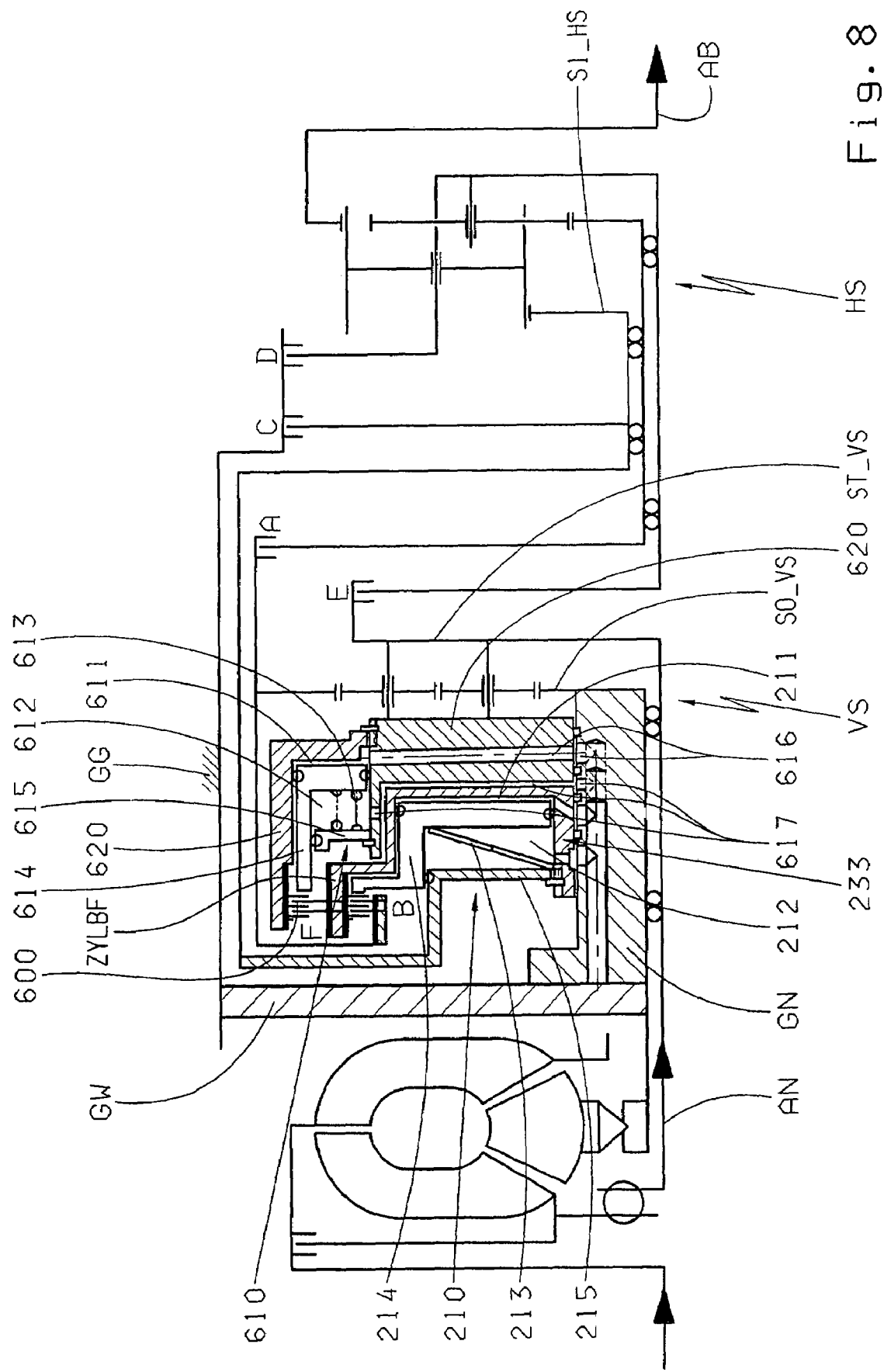
FIG. 8 is an example of a seventh transmission layout according to the invention.

Referring to FIG. 8, a seventh example transmission layout according to the present invention will now be described, based on the sixth transmission layout according to the invention described with reference to FIG. 7. The changes compared with FIG. 7 concern the design of the input element 620 of the clutch F and the design of the servomechanism 610 of clutch F. As in FIG. 7, the two clutches B and F are arranged on the side of the transfer gearset VS facing away from the main gearset HS, axially directly between the transfer gearset VS and the housing wall GW fixed to the transmission housing which, in the example shown, in combination with the co-axial arrangement of the drive input and drive output shafts AN, AB, forms an outer wall of the transmission housing GG facing toward a drive engine of the transmission not shown in more detail here. In this the clutch F, viewed spatially, is as before arranged radially over the clutch B, so that the disk set 600 of clutch F is radially over the disk set 200 of clutch B and the servomechanism 610 of clutch F is at least largely radially over the servomechanism 210 of clutch B. As in FIG. 7, a disk carrier ZYLBF common to the two clutches B, F is provided, which forms the output element of the two clutches B, F connected with the first input element—in this case the sun gear S1_HS—of the main gearset HS, which is formed geometrically as a pot open in the direction of the housing wall GW, which forms the inner disk carrier of clutch F and the outer disk carrier of clutch B, and which is mounted to rotate on the hub GN fixed on the transmission housing, to which the sun gear SO_VS of the transfer gearset VS is also fixed. The servomechanism 210 of the radially inner clutch B, comprising a pressure chamber 211, a pressure equalization chamber 212 to offset the dynamic pressure of the rotating pressure chamber 211, a piston 214, a restoring element 213 and a torque-transferring diaphragm plate 215 is, as far as a section of the torque-transferring diaphragm plate 215, arranged completely inside the cylindrical space formed by the disk carrier ZYLBF common to the two clutches B, F and always rotates with the speed of the first input element S1_HS of the main gearset HS.

Otherwise than in FIG. 7, the input element 620 of clutch F is now made as a two-part structural element, with an inner cylinder and an outer cylinder fixed onto this inner cylinder. Both of these cylinders are made as pots open in the direction of the housing wall GW. The inner cylinder of the input element 620 is arranged axially directly between the transfer gearset VS and the disk carrier ZYLBF, and thus forms a cylindrical space which at least partially encloses the cylindrical section of the disk carrier ZYLBF, inside which the pressure chamber 211 and pressure equalization chamber 212 of the servomechanism 210 are arranged. The disk-shaped pot bottom of this inner cylinder extends on the one hand parallel to the pot bottom of the disk carrier ZYLBF, and on the other hand parallel to the transfer gearset VS, and is mounted to rotate on the hub GN fixed on the transmission housing in the area axially between the hub 233 of the disk carrier ZYLBF and the sun gearset SO_VS. In addition, the inner cylinder of the input element 620 is connected with the coupled carrier ST_VS of the transfer gearset VS (and thereby, via this carrier ST_VS with the drive input shaft AN). Thus, the inner cylinder of the input element 620 can also be designed as a carrier plate of the carrier ST_VS remote from the main gearset. The outer cylinder of the input element 620 forms the outer disk carrier of clutch F and holds the outer disks of the disk set 600 of clutch F at the inside diameter of its cylindrical section, in the area of its end close to the housing wall. The disk-shaped pot bottom of this outer cylinder also extends parallel and adjacent to the transfer gearset VS and is in rotationally fixed connection and sealed against pressure medium with the disk-shaped pot bottom of the inner cylinder of the input element 620 in the area of its inside diameter.

The servomechanism 610 for actuating the disk set 600 of clutch F is arranged inside the cylindrical space formed by the outer cylinder of the input element 620, axially between the pot bottom of this outer cylinder and the disk set 600. On the other hand, the servomechanism 610, viewed spatially, is arranged at least largely radially over the inner cylinder of the input element 620. This servomechanism 610 comprises a pressure chamber 611, a pressure equalization chamber 612 to offset the dynamic pressure of the rotating pressure chamber 611, a piston 614, a restoring element 613 and a diaphragm plate 615. The piston 614 is mounted to move axially and sealed against pressure medium on the inside diameter of the outer cylinder of the input element 620 and on the outer diameter of the inner cylinder of the input element 620. In contrast to FIG. 7, the servomechanism 610 of clutch F in FIG. 8, therefore, always rotates with the speed of the drive input shaft AN. The pressure chamber 611 of the servomechanism 610 is formed by part of the casing surface of the outer cylinder of the input element 620, part of the casing surface of the inner cylinder of the input element 620, and the piston 614. The pressure equalization chamber 612 is arranged on the side of the piston 614 facing away from the transfer gearset VS, and is formed by part of the outer casing surface of the inner cylinder of the input element 620, the piston 614 and the diaphragm plate 615. In this case the restoring element 613 is made for example as a spring packet of spiral springs kinematically connected in parallel and arranged in a ring, and is held axially between the piston 614 and the diaphragm plate 615, against a support for the diaphragm plate 615 provided axially on the outer diameter of the inner cylinder of the input element 620.

The pressure medium supply 616 to the pressure chamber 611 of the servomechanism 610 of clutch F passes partly within the hub GN fixed on the transmission housing, and partly within the inner cylinder of the input element 620 of clutch F. When the pressure chamber 611 of the servomechanism 610 is filled with pressure medium to close the clutch F, the piston 614 moves axially in the direction of the housing wall GW (i.e., axially in the direction opposite to the transfer gearset VS and the main gearset HS), and actuates the disk set 600 associated with it against the spring force of the restoring element 613. The lubricant supply 617 to the pressure equalization chamber 612 of the servomechanism 610 of clutch F passes partly within the hub GN fixed on the transmission housing, partly through a gap between the disk carrier ZYLBF and the inner cylinder of the input element 620 of the clutch F, and partly through at least one radial hole in the cylindrical section of the inner cylinder of the input element 620 of clutch F. Advantageously, lubricant required for cooling the disk set 600 can also be supplied to this disk set 600 via the gap between the disk carrier ZYLBF and the inner cylinder of the input element 620. In this way the cooling of the radially outer clutch F can be designed largely independent of the cooling of the radially inner clutch B.

The spatial arrangement of the other transmission structural elements of the seventh transmission layout according to the invention shown in FIG. 8, is the same as the arrangement shown in FIG. 7 and need not therefore be described again.

Figure 9:
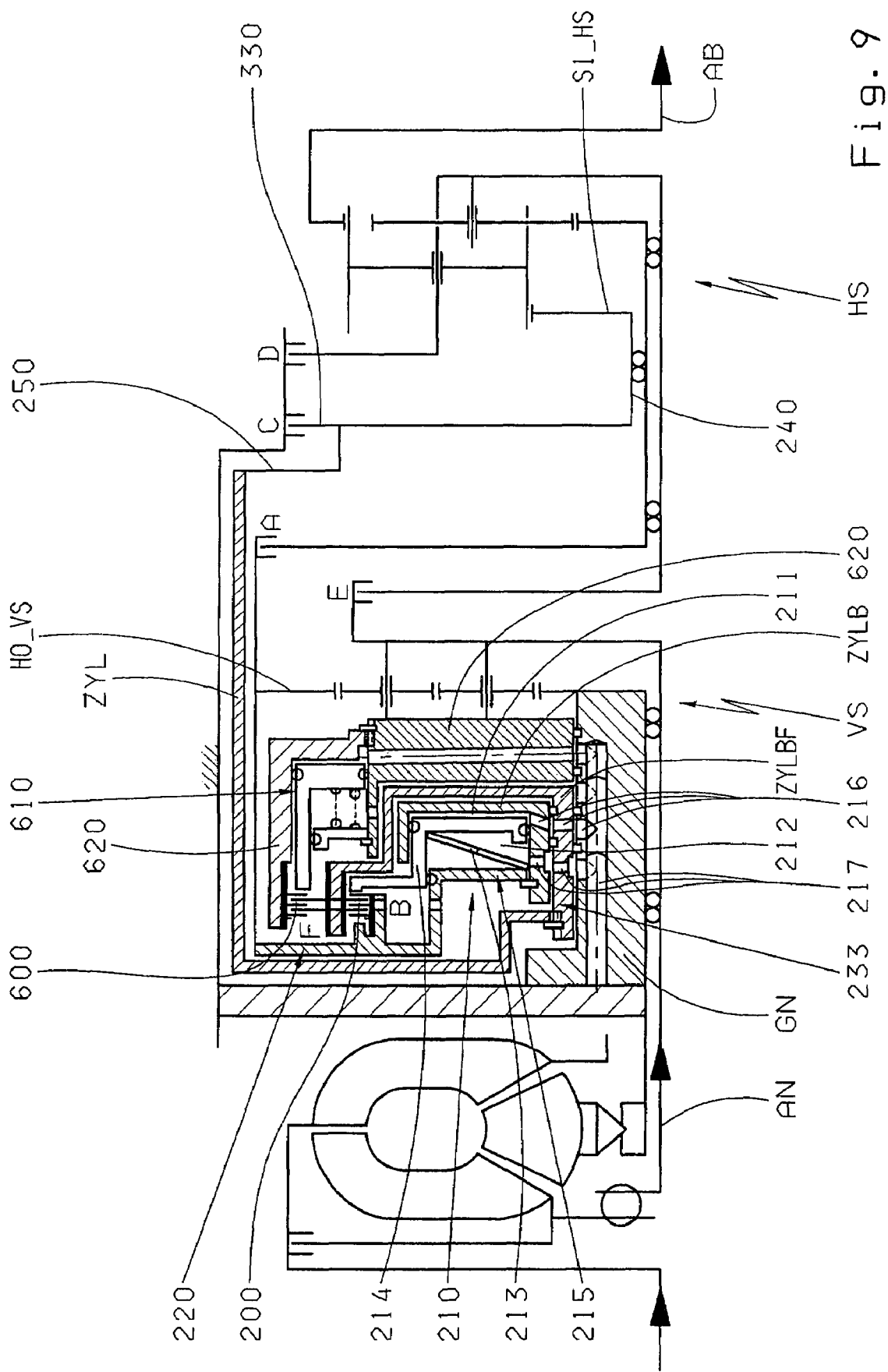
FIG. 9 is an example of an eighth transmission layout according to the invention.

Referring to FIG. 9, an eighth example transmission layout according to the present invention will now be explained, which is based on the seventh transmission layout according to the invention described above with reference to FIG. 8. The changes compared with FIG. 8 concern the design of the servomechanism 210 of clutch B, with the aim that the servomechanisms 210, 610 of the two clutches B and F should now always rotate at the speed of the drive input shaft AN, while maintaining the component arrangement of the seventh transmission layout according to the invention shown in FIG. 8. As can be seen from FIG. 9, for this, compared with FIG. 8 an additional structural element ZYLB to hold the servomechanism 210 of clutch B is provided, which is accommodated in the cylindrical space of the disk carrier ZYLBF common to the two clutches B, F.

Geometrically, this additional structural element ZYLB is formed as a cylinder open in the direction opposite to the transfer gearset VS. A hub of this cylinder ZYLB is mounted to rotate on the hub 233 of the disk carrier ZYLBF. As in FIG. 8, the servomechanism 210 of clutch B comprises a pressure chamber 211, a pressure equalization chamber 212 to offset the dynamic pressure of the rotating pressure chamber 211, a piston 214, a restoring element 213 for example made as a cup spring, and a diaphragm plate 215. The piston 214 is mounted to move axially on the inside diameter of the (outer) cylindrical section of the cylinder ZYLB and on the outer diameter of the hub of the cylinder ZYLB, sealed against pressure medium. The pressure chamber 211 is arranged inside the cylinder ZYLB on the side of the cylinder ZYLB facing away from the transfer gearset VS, and is formed by the piston 214 and a casing surface of the cylinder ZYLB. The pressure equalization chamber 212 is arranged on the side of the piston 214 opposite to the pressure chamber 211, and is formed by the piston 214 and the diaphragm plate 215 axially movable relative to this piston 214 and sealed against lubricant. This diaphragm plate 215 is fixed axially by way of a locking ring to the hub of the cylinder ZYLB at the end of the hub remote from the transfer gearset. The restoring element 213 is held axially between the piston 214 and the diaphragm plate 215, and so pre-stresses the piston against the cylinder ZYLB. The supply of pressure medium and lubricant to the servomechanism 210 of clutch B takes place via the hub GN fixed on the transmission housing, the corresponding ducts or holes passing partly within the housing hub GN, partly within the hub 233 of the disk carrier ZYLBF and partly within the hub of the cylinder ZYLB. The pressure medium supply to the pressure chamber 211 of the servomechanism 210 of clutch B is indexed 216 and the lubricant supply to the pressure equalization chamber 212 of the servomechanism 210 of clutch B is indexed 217. When the pressure chamber 211 is pressurized with pressure medium to close the disk set 200 of clutch B associated with the servomechanism 210, the piston 214 moves against the spring force of the restoring element 213 axially in the direction away from the transfer gearset VS, and actuates the disk set 200. In the example embodiment shown, the diaphragm plate 215 and the input element 220 are for example made as one piece. The servomechanism 210 of clutch B now always rotates at the speed of the ring gear HO_VS of the transfer gearset VS.

As can also be seen in FIG. 9, and as in FIG. 8, the disk carrier ZYLBF common to the two clutches B, F, the disk sets 200, 600 and the servomechanisms 210, 610 of these two clutches B, F are arranged largely inside a cylindrical space formed by the input element or outer disk carrier 620 of the clutch F, this input element or outer disk carrier 620 of clutch F being mounted to rotate on the hub GN fixed on the transmission housing in the area axially between the disk carrier ZYLBF and the transfer gearset VS, and the servomechanism 610 of clutch F correspondingly always rotates at the speed of the drive input shaft AN. The pressure medium and lubricant supply of the servomechanism 610 and the supply of coolant to the disk set 600 of clutch F correspond to those shown in FIG. 8. As in FIG. 8, the disk carrier ZYLBF forms the output element for both clutches B, F and is correspondingly connected to the first input element of the main gearset HS, namely to the sun gear S1_HS of the main gearset HS close to the transfer gearset, here for example—as in FIG. 5—by way of the connecting element ZYL, a carrier plate 250, an output element 330 of the brake C and a sun shaft 240. As regards the possible arrangements and designs of the other shift elements E, A, C and D of the main gearset HS and the drive output shaft AB, reference should be made to the other transmission layouts according to the invention illustrated in this application.

Figure 10:
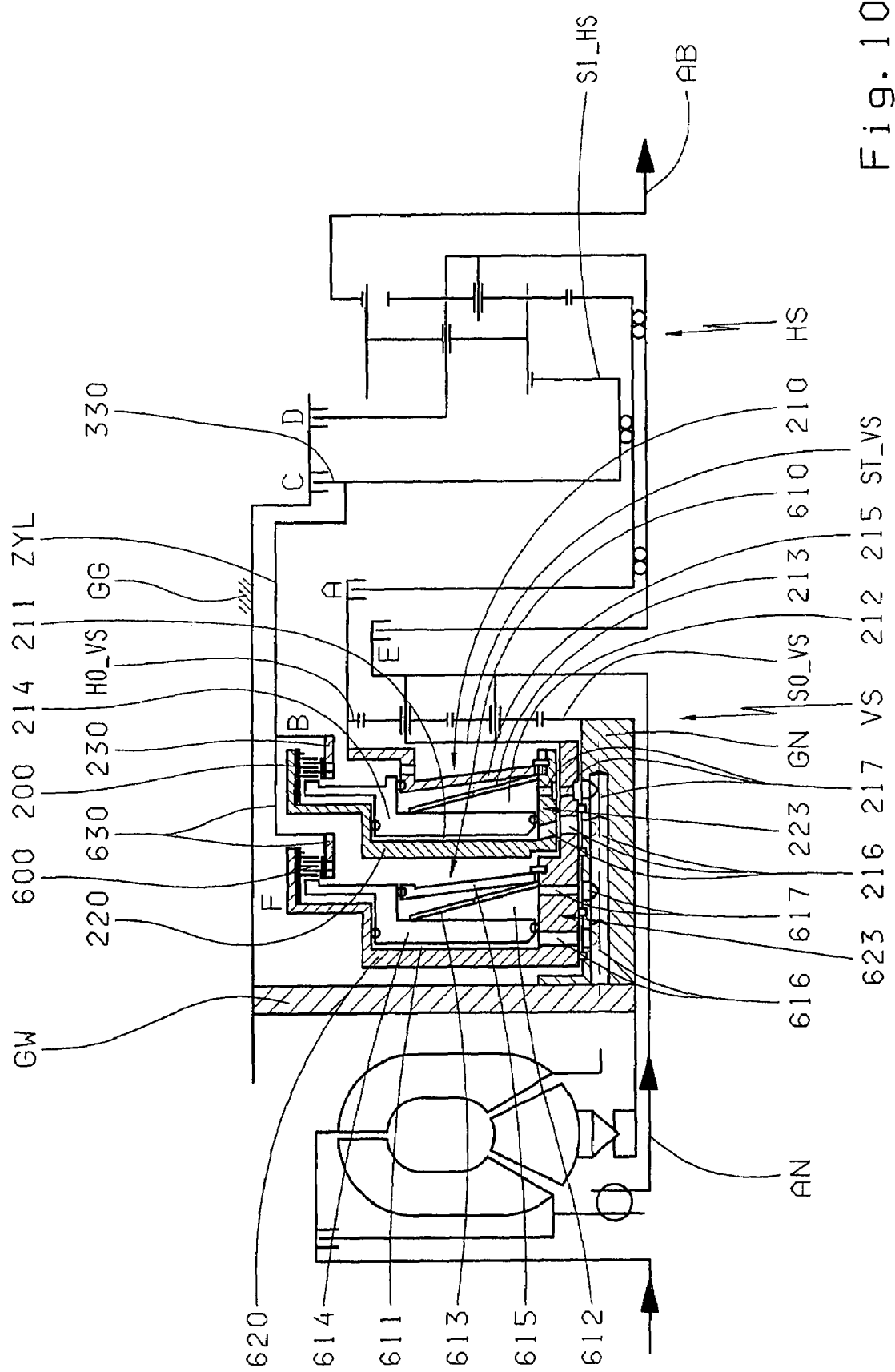
FIG. 10 is an example of a ninth transmission layout according to the invention.

Referring to FIG. 10, a ninth example transmission layout according to the present invention will now be explained, which is based on the first transmission layout according to the invention described with reference to FIG. 2. The changes compared with FIG. 2 concern the design of the preassembled structural group comprising the two clutches B and F, this structural group, as before, being arranged on the side of the transfer gearset VS facing away from the main gearset HS, spatially axially between the transfer gearset VS and an outer wall GW of the transmission fixed to the transmission housing. As can be seen in FIG. 10, the two clutches B and F are now arranged essentially axially next to one another. In particular, the disk sets 200, 600 of the two clutches B, F and the servomechanisms 210, 610 of the two clutches B, F for actuating the respective disk sets 200 and 600 are arranged axially next to one another, with the disk set 200 and its associated servomechanism 210 closer to the main gearset HS than are the disk set 600 and its associated servomechanism 610. The input elements 220, 620 of the two clutches B, F are each made as an outer disk carrier to hold the outer disks of the respective disk sets 200, 600, geometrically each in the form of a cylindrical pot open in the direction of the main gearset HS. The servomechanisms 210, 610 of the two clutches B, F are each accommodated completely inside a cylindrical space formed by the respective outer disk carrier 220 or 620. Thus, the servomechanism 210 of clutch B always rotates at the speed of the ring gear HS_VS of the transfer gearset VS, and the servomechanism 610 of clutch F always rotates at the speed of the drive input shaft AN.

Starting from the housing wall GW, a hub GN fixed on the transmission housing, through which the drive input shaft AN of the transmission passes centrally in the axial direction, extends inward into the transmission spatially as far as the transfer gearset VS. The sun gear SO_VS of this transfer gearset VS is fixed onto the transmission housing GG by way of this hub GN attached to the transmission housing. A hub 623 of the outer disk carrier 620 of clutch F mounted to rotate on the hub GN fixed to the transmission housing encloses this hub GN fixed to the transmission housing over almost its full axial length. At its end close to the transmission gearset the hub 623 is connected to a carrier plate of the coupled carrier ST_VS of the transfer gearset remote from the main gearset. A carrier plate of this carrier ST_VS close to the main gearset is connected to the drive input shaft AN. Starting from the end of the hub 623 near the housing wall, the pot bottom of the cylindrical outer disk carrier 620 extends axially adjacent to the housing wall GW. On the side of this pot bottom facing away from the housing wall GW is arranged the servomechanism 610 of clutch F. This servomechanism 610 comprises a pressure chamber 611, a pressure equalization chamber 612, a piston 614, a restoring element 613 and a diaphragm plate 615. The pressure chamber 611 and the pressure equalization chamber 612 provided to offset its dynamic pressure are separated from one another by the piston 614, the pressure equalization chamber 612 being arranged closer to the transfer gearset VS (and main gearset HS) than is the pressure chamber 611. The piston 614, sealed against pressure medium, is mounted to move axially in the outer disk carrier 620, and acts upon the disk set 600 of clutch F on the side of the disk set 600 facing away from the transfer gearset VS (and main gearset HS). The pressure chamber 611 arranged on the side of the piston 614 close to the housing wall is formed by this piston 614 and an inner casing surface of the outer disk carrier 620. The pressure equalization chamber 612 arranged on the side of the piston 614 near the transfer gearset is formed by the piston 614 and the diaphragm plate 615 axially movable relative to the piston 614 and sealed against lubricant. The diaphragm plate 615 is fixed on the hub 623 of the outer disk carrier 620, spatially approximately at the middle of the hub, by way of a locking ring. The restoring element 613, in this case for example made as a cup spring, is held axially between the piston 614 and the diaphragm plate 615, and thus pre-stresses the piston 614 axially against the outer disk carrier 620. For the supply of pressure medium to the pressure chamber 611, the hub GN fixed on the transmission housing and the hub 623 of the input element 620 of clutch F have corresponding ducts or holes 616. The supply of lubricant to the pressure equalization chamber 612 also takes place via the hub GN fixed on the transmission housing and the hub 623 of the input element 620, which also has corresponding ducts or holes indexed 617. When the pressure chamber 611 for closing clutch F is filled with pressure medium, the piston 614 of the servomechanism 610 moves against the spring force of the restoring element 613 axially toward the transfer gearset VS (or axially toward the main gearset HS) and actuates the disk set 600 associated with it.

The cylindrical outer disk carrier 220 of clutch B is spatially arranged axially between the servomechanism 610 of clutch F and the transfer gearset VS, so that the disk set 200 of clutch B is positioned on the one hand axially adjacent to the disk set 600 of clutch F and on the other hand at least largely on the side of the transfer gearset VS facing away from the main gearset HS. In this case, the two disk sets 200, 600 have for example the same diameter, so providing the possibility of equivalent component use. In this case the diameter of the disk sets 200, 600 is larger than the outer diameter of the transfer gearset VS. Corresponding to the spatial arrangement of the outer disk carrier 220 of clutch B and the hub 623 of the outer disk carrier 620 of clutch F, the outer disk carrier 220 is mounted to rotate on a cylindrical section of the hub 623, spatially located axially between the diaphragm plate 615 of the servomechanism 610 of clutch F and the carrier plate of the carrier ST_VS of the transfer gearset VS on the housing wall side. The hub of the outer disk carrier 220 of clutch B corresponding to this mounting is indexed 223. The pot bottom of the cylindrical outer disk carrier 220 extends—starting from the end of the hub 223 remote from the transfer gearset—radially outward, parallel and adjacent to the diaphragm plate 615 of the servomechanism 610 of clutch F. On the side of the pot bottom facing away from the diaphragm plate 615 and the housing wall GW is arranged the servomechanism 210 of clutch B. The servomechanism 210 comprises a pressure chamber 211, a pressure equalization chamber 212, a piston 214, a restoring element 213 and a diaphragm plate 215. The pressure chamber 211 and the pressure equalization chamber 212 provided to offset its dynamic pressure are separated from one another by the piston 214, with the pressure equalization chamber 212 arranged closer to the transfer gearset VS (and the main gearset HS) than is the pressure chamber 211. The piston 214 sealed against pressure medium is mounted to move axially in the outer disk carrier 220 and acts upon the disk set 200 of clutch B from the side of the disk set 200 facing away from the transfer gearset VS (and main gearset HS). The pressure chamber 211 arranged on the side of the piston 214 near the housing wall is formed by the piston 214 and an inner casing surface of the outer disk carrier 220.

The pressure equalization chamber 212 arranged on the side of the piston 214 close to the transfer gearset is formed by the piston 214 and the lubricant-sealed diaphragm plate 215 that can move axially relative to the piston 214. This diaphragm plate 215 is axially secured on the hub 223 of the outer disk carrier 220 by way of a locking ring, spatially at the end of the hub 223 close to the transfer gearset. The restoring element 213, here for example made as a cup spring, is held axially between the piston 214 and the diaphragm plate 215, and thus pre-stresses the piston 214 axially against the outer disk carrier 220. The torque and speed transferring connection of the outer disk carrier 220 which forms the input element of clutch B, to the ring gear HO_VS, which forms the output element of the transfer gearset VS, is effected by the ring disk-shaped diaphragm plate 215, which for this purpose is connected at its outer diameter rotationally fixed to the ring gear HO_VS and at its inner diameter rotationally fixed to the hub 223 of the outer disk carrier 220.

Pressure medium and lubricant are supplied to the servomechanism 210 of clutch B partly via the hub GN fixed to the transmission housing, partly through the hub 623 of the input element or outer disk carrier 620 of clutch F, and partly through the hub 223 of the input element or outer disk carrier 220 of clutch B. The corresponding ducts or holes for pressure medium supply to the pressure chamber 211 of servomechanism 210 are indexed 216, and the corresponding ducts or holes for lubricant supply to the pressure equalization chamber 212 of the servomechanism 210 are indexed 217. When the pressure chamber 211 is filled with pressure medium to close the clutch B, the piston 214 of the servomechanism 210 moves against the spring force of the restoring element 213 axially toward the transfer gearset VS (or axially toward the main gearset HS) and actuates the disk set 200 associated with it.

The output elements 230, 630 of the two clutches B, F are formed as inner disk carriers to hold the internally toothed disks of the respective disk sets 200 and 600. Kinematically, these two output elements 230, 630 and also the output elements 330 of the brake C likewise made as an inner disk carrier, are connected to the sun gear S1_HS of the main gearset HS close to the transfer gearset, which forms the first input element of the main gearset HS. For this, the inner disk carrier 630 of clutch F overlaps the outer disk carrier 220 and the disk set 200 of clutch B arranged inside it in the axial direction, and is connected to the inner disk carrier 230 of clutch B on the side of the disk set 200 facing the main gearset HS, spatially in an area radially over the transfer gearset VS. In this area an ring cylindrical connecting element ZYL is connected to the inner disk carrier 630 and the inner disk carrier 230, and extends axially toward the main gearset HS as far as the brake C, therefore overlapping the transfer gearset VS and the two clutches E and A. At its end close to the main gearset, this ring cylindrical connecting element ZYL is connected to the inner disk carrier 330 of brake C. In turn, the inner disk carrier 330 is connected to the sun gear S1_HS of the main gearset.

Of course, the spatial position of the disk sets 200, 600 of clutches B, F shown in FIG. 10 in an area on the side of the transfer gearset VS facing away from the main gearset HS should be regarded only as an example. Particularly when the drive torque to be transferred by the transmission is high, it may be necessary to construct the disk sets of the shift elements with a comparatively large number of disks. It may then be the case, for example, that the disk set 600 of clutch F extends axially as far as over part of the servomechanism 210 of clutch B, and the disk set 200 of clutch B extends axially as far as over the transfer gearset VS.

The (purely exemplary) spatial arrangement, structure and kinematic connection of the other transmission structural elements (shift elements E, A, C and D, main gearset HS) of the ninth transmission layout according to the invention shown in FIG. 10, corresponds essentially to the arrangement illustrated in FIG. 2, and there is, therefore, no need to repeat their descriptions here.

Figure 11:
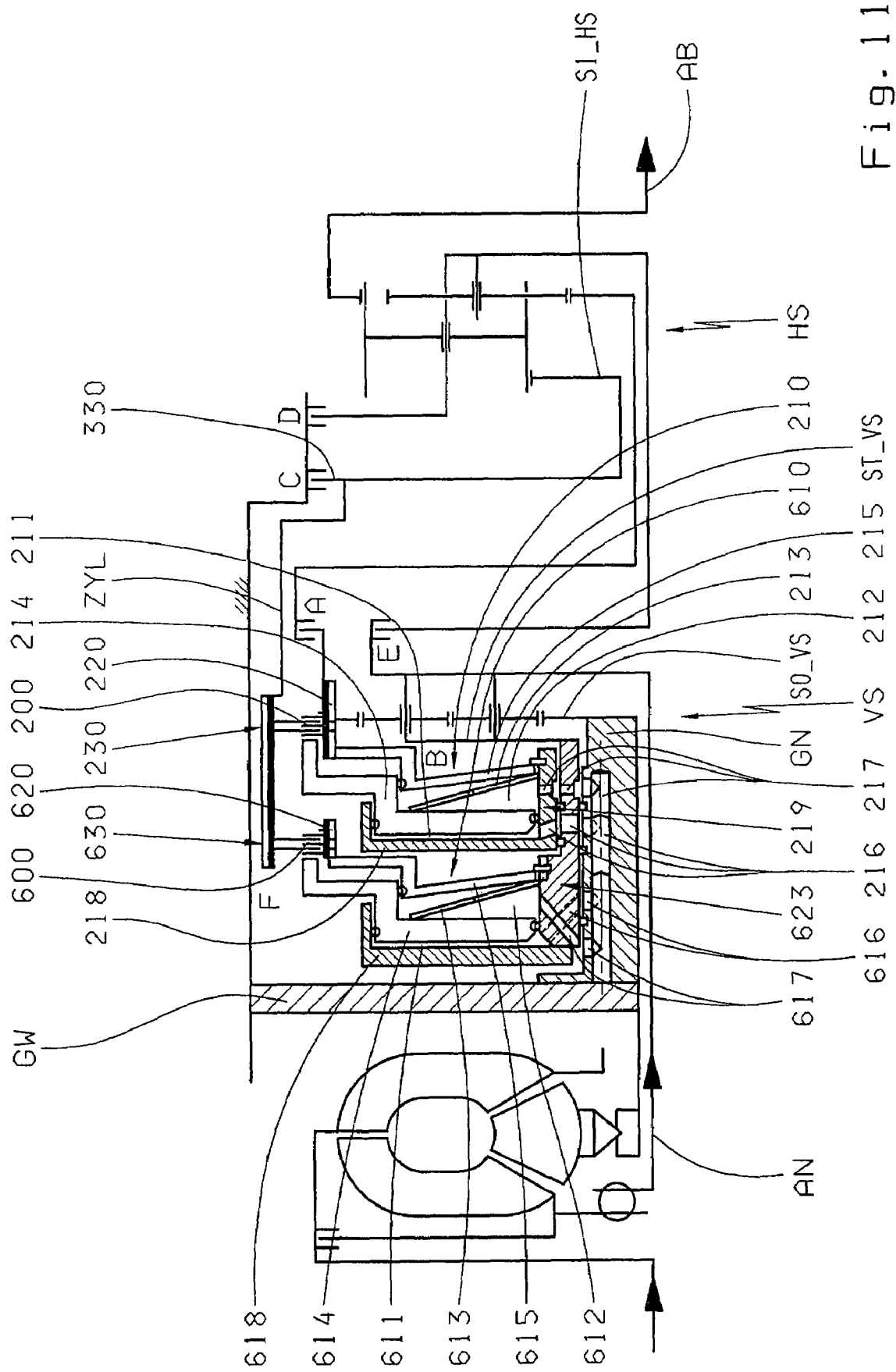
FIG. 11 is an example of a tenth transmission layout according to the invention.

Referring to FIG. 11, a tenth example transmission layout according to the present invention will now be explained, which is based on the ninth transmission layout according to the invention described above with reference to FIG. 10. In contrast to FIG. 10, the input elements 220, 620 of clutches B, F are now both made as inner disk carriers and the output elements 230, 630 of the clutches B, F are correspondingly both made as outer disk carriers. The connection between the input element 220 of clutch B and the ring gear HO_VS of the transfer gearset VS, and the connection between the input element 620 of clutch F and the carrier ST_VS of the transfer gearset VS are accordingly of modified design.

As can be seen from FIG. 11, and as in FIG. 10, the clutch B is directly adjacent to the transfer gearset VS on its side facing away from the main gearset HS. The clutch F is directly adjacent to the clutch B on its side facing away from the main gearset HS. Thus, the clutch F is arranged axially between the housing wall GW and the transfer gearset, spatially radially over a hub GN fixed to the transmission housing, which extends inward into the transmission as far as the transfer gearset VS and is in rotationally fixed connection with the sun gear SO_VS of the transfer gearset VS. With the input element 620 of clutch F is associated a hub 623, which is mounted to rotate on the hub GN fixed to the transmission housing and is connected with positive locking to the carrier plate of the coupled carrier ST_VS of the transfer gearset VS on the housing wall side. Thus, the hub 623 extends in the axial direction over almost the full axial length of the hub GN fixed to the housing. At the end of this hub 623 near the housing wall, a support disk 618 associated with the servomechanism 610 of clutch F and extending radially outward is connected to the hub 623. This support disk 618 is formed as a cylindrical pot, whose cylindrical section extends starting from the disk-shaped pot bottom of the support disk 618, axially toward the transfer gearset VS. Of course, the hub 623 and the support disk 618 can also be made of one piece. Approximately in the middle of this hub 623 is connected to the hub 623, here for example by way of a carrier profile, a diaphragm plate 615, which is associated with the servomechanism 610 of clutch F and extends radially outward. In the area of its outer diameter, this diaphragm plate 615 is on its side facing toward the transfer gearset VS connected rotationally fixed, for example by welding, to the input element 620 of clutch F made as an inner disk carrier to hold internally toothed disks of the disk set 600 of the clutch F. Of course, the diaphragm plate 615 and the inner disk carrier 620 can also be made as one piece. Thus, the inner disk carrier 620 of clutch F is in torque-transmitting connection with the drive input shaft AN via the diaphragm plate 615 of the servomechanism 610 of clutch F, the hub 623 and the carrier ST_VS of the transfer gearset VS.

In the area axially between the support disk 618 and the diaphragm plate 615, is arranged a piston 614 of the servomechanism 610 which acts upon the disk set 600 of clutch F and is mounted, sealed against pressure medium, to move axially on the support disk 618 and the hub 623. For example, the disk set 600 is arranged spatially approximately radially over the middle of the hub 623. Of course, the axial extension of the disk set 600 is ultimately determined by the number of disks required for torque transfer. A restoring element 613 of the servomechanism 610, for example made as a cup spring, is arranged axially between the piston 614 and the diaphragm plate 615, and pre-stresses the piston 614 axially against the hub 623. A pressure chamber 611 of the servomechanism 610 is arranged on the side of the piston 614 away from the transfer gearset, and is formed by the piston 614, the support disk 618 and a section of the hub 623. A pressure equalization chamber 612 of the servomechanism 610 which can be filled with unpressurized lubricant to offset the dynamic pressure of the pressure chamber 611 which is always rotating at the speed of the drive input shaft AN, is arranged on the side of the piston near the transfer gearset and is formed by the piston 614 and the diaphragm plate 615 axially movable relative to the piston 614 and sealed against lubricant. When the pressure chamber 611 is filled with pressure medium to close the clutch F, the piston 614 moves against the spring force of the restoring element 613 axially toward the transfer gearset VS, and actuates the disk set 600 associated with it. Pressure medium and lubricant are supplied to the servomechanism 610 of clutch F through corresponding ducts and holes in the hub GN fixed to the transmission housing and the hub 623 of clutch F. The corresponding ducts and holes for pressure medium supply to the pressure chamber 611 of the servomechanism 610 are indexed 616, and the corresponding ducts and holes for lubricant supply to the pressure equalization chamber 612 of the servomechanism 610 are indexed 617.

In the example shown in FIG. 11, the disk set 200 of clutch B is arranged spatially in an area radially over the ring gear HO_VS of the transfer gearset VS, and the axial extension of this disk set 200 depends ultimately on the number of disks required for torque transmission. Correspondingly, the input element 220 of clutch B made as an inner disk carrier to hold internally toothed disk of the disk set 200 is arranged spatially radially over the ring gear HO_VS and is in rotationally fixed connection with this ring gear HO_VS. For example, the inner disk carrier 220 and the ring gear HO_VS can also be made as one piece. The servomechanism 210 of clutch B, comprising a pressure chamber 211, a pressure equalization chamber 212, a piston 214, a restoring element 213, a diaphragm plate 215, a hub 219 and a support disk 218, is directly adjacent to the transfer gearset VS on its side near the housing wall, and is spatially arranged—as far as a pressure plate of the piston 214 that acts directly on the disk set 200—in an area radially under the disk set 600 of clutch F. The ring disk-shaped diaphragm plate 215 is directly adjacent to the transfer gearset VS on its side facing the housing wall GW and the clutch F, and is connected rotationally fixed with the inner disk carrier 220 of clutch B, for example by welding or by way of a carrier profile. The diaphragm plate 215 and the inner disk carrier 220 can also be made as one piece. In the area of its inside diameter the diaphragm plate 215 is fixed axially to the end of the hub 219 close to the transfer gearset. This hub 219 extends spatially in an area axially between the carrier plate of the carrier ST_VS of the transfer gearset VS on the housing wall side and the diaphragm plate 615 of the servomechanism 610 of clutch F, radially above a cylindrical section of the hub 623 of the input element 620 of clutch F close to the transfer gearset, and is mounted to rotate on this cylindrical section of the hub 623. At the end of the hub 219 on the housing wall side, the support disk 218 is connected to this hub 219, and the support disk 218 and hub 219 can for example be made as one piece. Geometrically, the support disk 218 is formed as a cylindrical pot open in the direction of the transfer gearset VS, whose disk-shaped pot bottom extends radially outward adjacent to the diaphragm plate 615 of the servomechanism 610 of clutch F on the side of this diaphragm plate 615 near the transfer gearset, as far as a diameter just below the inner disk carrier 620 of clutch F, and whose cylindrical section extends radially under the inner disk carrier 620 or radially under the disk set 600 of clutch F, axially toward the transfer gearset VS. Axially between the support disk 218 and the diaphragm plate 215 are arranged the pressure chamber 211 and the pressure equalization chamber 212 of the servomechanism 210 of clutch B, the pressure chamber 211 and the pressure equalization chamber 212 being separated from one another by the piston 214 of the servomechanism 210 and the pressure equalization chamber 212 being positioned closer to the transfer gearset VS than is the pressure chamber 211. The piston 214, sealed against pressure medium, is mounted to move axially on the inside diameter of the cylindrical section of the support disk 218 and on a cylindrical section of the hub 219. The restoring element 213, here made for example as a cup spring, pre-stresses the piston 214 against the diaphragm plate 215 secured on the hub 219 by way of a locking ring. The pressure chamber 211 is formed by an inner casing surface of the support disk 218, the piston 214 and a cylindrical section of the hub 219. The pressure equalization chamber 212 provided to offset the dynamic pressure of the pressure chamber 211 which always rotates at the speed of the ring gear HS_VS of the transfer gearset VS, and which can be filled with unpressurized lubricant, is formed by the piston 214 and the diaphragm plate 215 sealed against lubricant and axially movable at its outer diameter relative to the piston 214.

For the supply of pressure medium and lubricant to the servo-mechanism 210 of clutch B, the hub GN (or transmission guide vane shaft) fixed on the transmission housing, the hub 623 of the input element 620 of clutch F and the hub 219 of the servomechanism 210 of clutch B have corresponding ducts and holes. The ducts and holes for pressure medium supply to the pressure chamber 211 of the servomechanism 210 are indexed 216 and the corresponding ducts and holes for lubricant supply to the pressure equalization chamber 212 of the servomechanism 210 are indexed 217.

To be able to actuate the disk set 200 associate with it, a section of the piston 214 of the servomechanism 210 extends radially as far as the area axially between the two disk sets 600 and 200 positioned next to one another. Thus, a pressure plate of the piston 214 acting directly on the disk set 200 engages radially from the inside between these disk sets 600, 200 and actuates the disk set 200 associated with it when the clutch B is engaged, from the side of the disk set 200 facing toward the disk set 600, axially in the direction of the main gearset HS. When the pressure chamber 211 is filled with pressure medium to close the clutch B, the piston 214 of the servomechanism 210 moves axially against the spring force of the restoring element 213 in the direction of the main gearset HS. Thus, the actuation directions of the servo-mechanisms 210, 610 of the two clutches B, F arranged next to one another are the same when the clutches are engaged.

In accordance with the structure of the input elements 220, 620 of the two clutches B, F as inner disk carriers, the output elements 230, 630 of the two clutches B, F are each made as outer disk carriers to hold the externally toothed disks of the respective disk sets 200 and 600. In a manner advantageous from the standpoint of production technology, these two outer disk carriers 630, 230 are made as one piece and connected, via an ring cylindrical connecting element ZYL, which extends in the axial direction radially over the clutches E and A, to the output element 330 of the brake C made as an inner disk carrier. In turn, this inner disk carrier 330 is connected rotationally fixed to the sun gear S1_HS of the main gearset close to the transfer gear, such that this sun gear S1_SF forms the first input element of the main gearset HS in the example shown.

The spatial arrangement, structure, and kinematic connection of the other transmission structural elements (shift elements E, A, C and D, main gearset HS) of the tenth transmission layout according to the invention shown in FIG. 11, correspond to the arrangement shown in FIG. 10 and need not, therefore, be described again here.

Figure 12A:
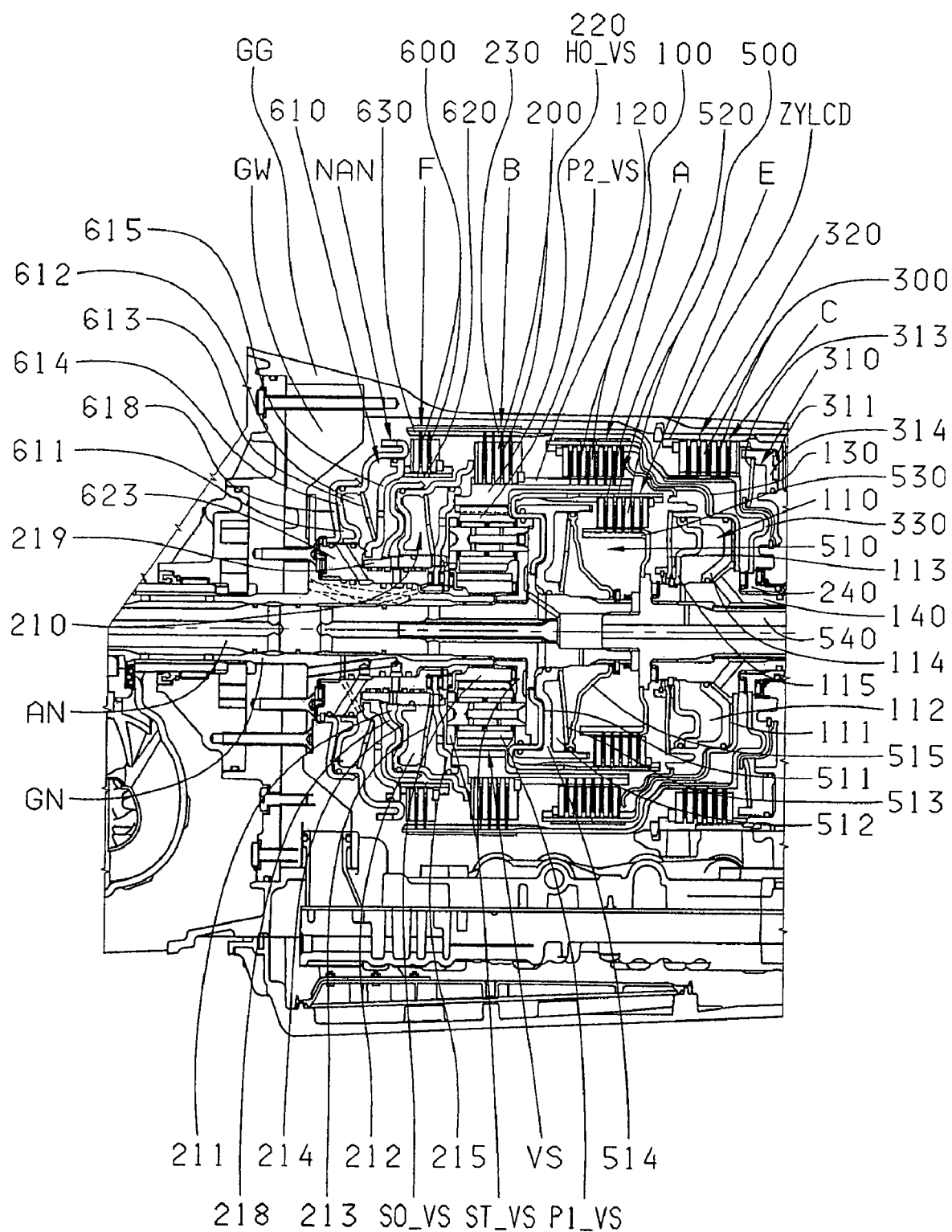
FIG. 12A is a first partial section of an example transmission design with the transmission layout of FIG. 11.
Figure 12B:
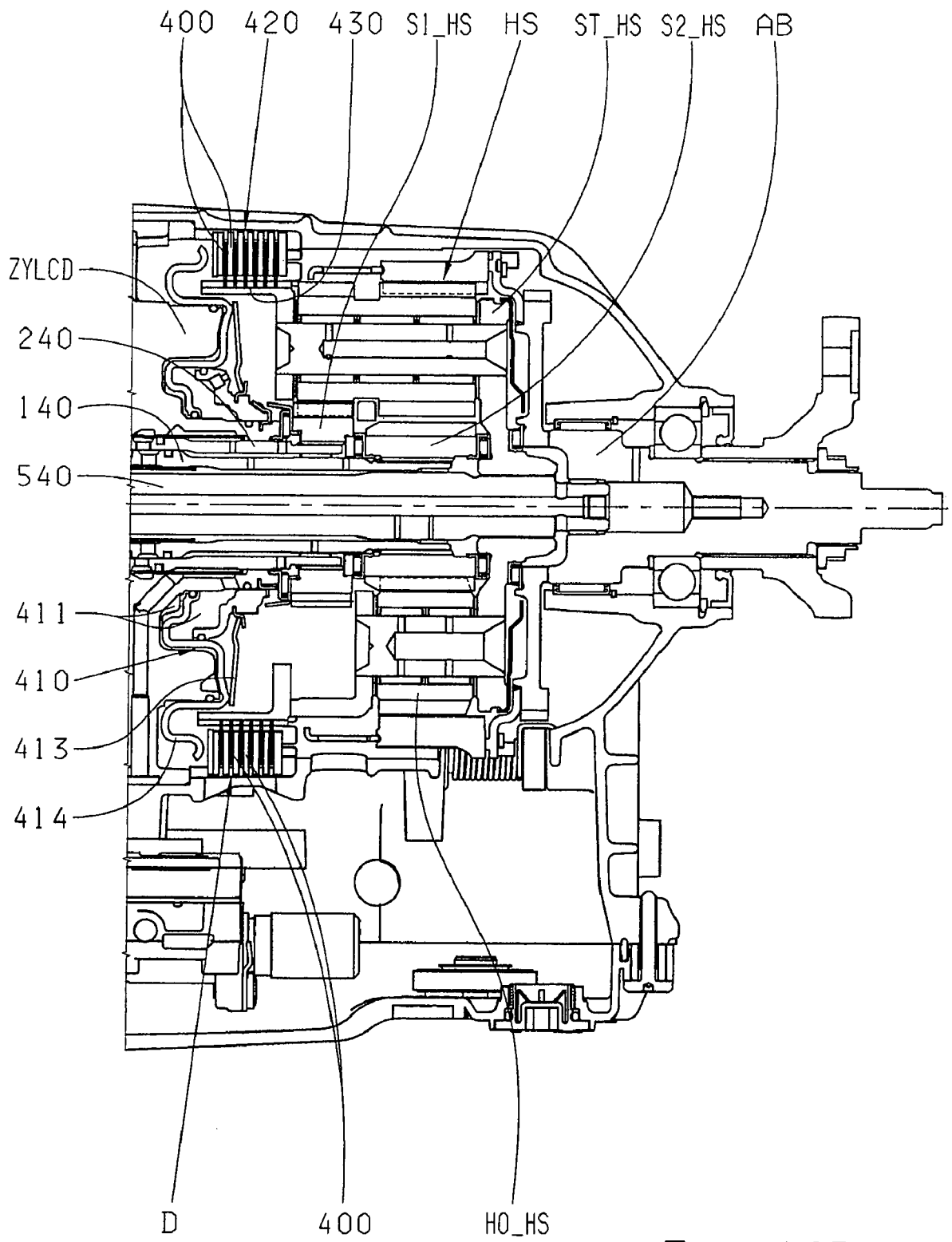
FIG. 12B is a second partial section of an example transmission design with the transmission layout of FIG. 11.

FIGS. 12A and 12B show examples of the detailed design of an automatic transmission of the same type as the tenth transmission layout according to the invention described with reference to FIG. 11, FIG. 12A showing a first partial section on the drive input side of this transmission design, and FIG. 12B a second partial section on the drive output side. The indexes are essentially the same as those used in FIG. 11, supplemented by the most important indexes for the shift elements E, A, C, D and for the main gearset HS, and its kinematic connection to the shift elements.

The drive input shaft AN and the drive output shaft AB are co-axial with one another. Here, the transmission housing GG is engaged apart from an aperture for the drive output shaft AB. On the drive input side, the transmission housing is engaged by the housing wall GW fixed to the transmission housing, this housing wall GW being passed through centrally by the hub GN fixed on the transmission housing, which in this case at the same time forms a guide vane shaft of a torque converter kinematically interposed between the drive input shaft AN and a drive engine of the transmission not shown in detail, and for its part, penetrated centrally in the axial direction by the drive input shaft AN. At the end of the hub GN inside the transmission the sun gear SO_VS of the transfer gearset VS is connected to the hub GN with positive locking. The drive input shaft AN is connected with positive locking to a carrier plate of the coupled carrier ST_VS of the transfer gearset VS facing away from the engine. On this side of the carrier ST_VS facing away from the engine the clutch E is connected axially to the transfer gearset VS, and in this case the input element 520 of clutch E, made as an outer disk carrier to hold externally toothed steel disks of the disk set 500 of clutch E, is welded to the drive input shaft AN. To be able to supply the planetary gears P1_VS, P2_VS of the transfer gearset VS mounted to rotate on the carrier ST_VS optimally with lubricant, the carrier plate of the carrier ST_VS remote from the drive is sealed against lubricant on a diameter larger than the bolt diameter of the outer planetary gear P2_HS to the outer disk carrier 520. Since there is no relative speed between the carrier ST_VS and the outer disk carrier 520, this seal can be designed simply as a static seal, for example an O-ring or a vulcanized sealing lip. The chamber so formed between the carrier ST_VS and the outer disk carrier 520 is filled with unpressurized lubricant and serves as a lubricant collector space, from which the lubricant is delivered through correspondingly formed axial and radiant lubricant oil holes to the planetary bolts of the transfer gearset VS.

The servomechanism 510 of clutch E arranged completely within the outer disk carrier 520 comprises a pressure chamber 511, a pressure equalization chamber 512, a piston 514, a restoring element 513 and a diaphragm plate 515. The piston 514, sealed against pressure medium, is mounted to move axially on the outer disk carrier 520 and the drive input shaft AN. Correspondingly, the servomechanism 510 always rotates at the speed of the drive input shaft AN. The pressure chamber 511 is arranged on the side of the piston 514 facing toward the transfer gearset VS, and is formed by a casing surface of the outer disk carrier 520 and a cylindrical section of the drive input shaft AN and the piston 514. The pressure equalization chamber 512, which can be filled with unpressurized lubricant to offset the dynamic pressure of the rotating pressure chamber 511, is arranged on the side of the piston 514 facing away from the transfer gearset VS, and is formed by the piston 514 and the diaphragm plate 515 sealed against lubricant and axially movable relative to the piston 514. The restoring element 513, in this case made as a cup spring, is held axially between the piston 514 and the diaphragm plate 515 secured by a locking ring on the drive input shaft AN, and so pre-stresses the piston 514 against the drive input shaft AN. When the pressure chamber 511 is pressurized with pressure medium to close the clutch E, the piston 514 moves against the spring force of the cup spring 513, axially in the direction opposite to the transfer gearset VS, and actuates the disk set 500 associated with it. Pressure medium and lubricant are supplied to the servomechanism 510 of clutch E via a central bore of the drive input shaft AN.

The output element 530 of clutch E is made as an inner disk carrier to hold internally toothed lining disks of the disk set 500 of clutch E, arranged radially under the disk set 500 and in its hub area welded to a carrier shaft 540. In turn, this carrier shaft 540, mounted to rotate in the drive input shaft AN, extends axially toward the drive output of the transmission, passing completely and centrally through the main gearset HS, here made as a Ravigneaux planetary gearset, and being connected with positive locking on the side of the main gearset HS facing away from the transfer gearset VS, to the coupled carrier ST_HS of the main gearset HS. Kinematically, this carrier ST_HS forms the third input element of the main gearset HS made as a two-carrier, four-shaft planetary transmission.

In a manner favourable from the standpoint of production technology, the ring gear HO_VS of the transfer gearset VS, the input element 220 of clutch B made as an inner disk carrier to hold internally toothed lining disks of the disk set 200 of clutch B, and the input element 120 made as an inner disk carrier to hold internally toothed lining disks of the disk set 100 of clutch A, are made as one piece, geometrically in the form of a cylindrical ring, which encloses the outer disk carrier 520 of clutch E partially in the axial direction. Viewed spatially, the disk set 200 of clutch B is arranged radially over the ring gear HO_VS and the disk set 100 of clutch A is arranged radially over the clutch E. The disk sets 100 and 200 are of at least similar diameter. The output element 130 of clutch A is formed as an outer disk carrier to hold externally toothed steel disks of the disk set 100 of clutch A. Geometrically, this outer disk carrier 130 is formed as a cylindrical pot open toward the transfer gearset VS, inside which the servomechanism 110 of clutch A associated with the disk set 100 is also arranged. A largely cylindrical section of the outer disk carrier 130 comprises several steps, in such manner that the disk set 100 is arranged in it at the end of the outer disk carrier 130 near the transfer gearset, the servomechanism 110 is arranged inside the outer disk carrier 130 on the side of the disk set 100 remote from the transfer gearset, axially adjacent to and at the same time radially under the disk set 100, as far as a pressure plate of the piston 114 of the servomechanism 110 which acts directly on the disk set 100, and the disk set 300 of brake C is arranged outside the outer disk carrier 130, radially over the servomechanism 110 of clutch A. The disk sets 100 and 300 are of at least similar diameter. In the area of its hub, the outer disk carrier 130 of clutch A is welded to a second sun shaft 140. This second sun shaft 140 is in turn formed as a hollow shaft, which extends axially toward the drive output of the transmission, in part enclosing the carrier shaft 540 in the axial direction and passing centrally and completely through the first sun gear S1_HS of the main gearset HS close to the transfer gear, and is connected with positive locking to the second sun gear S2_HS of the main gearset HS remote from the transfer gearset. Kinematically, this second sun gear S2_HS forms the second input element of the main gearset HS made as a two-carrier, four-shaft transmission.

The servomechanism 110 of clutch A, arranged completely within the outer disk carrier 130, comprises a pressure chamber 111, a pressure equalization chamber 112, a piston 114, a restoring element 113 and a diaphragm plate 115. The piston 114, sealed against pressure medium, is mounted to move axially on the outer disk carrier 130 and the second sun shaft 140. Correspondingly, the servomechanism 110 always rotates at the speed of the second sun gear S2_HS of the main gearset HS. The pressure chamber 111 is arranged on the side of the piston 114 facing away from the transfer gearset VS, and is formed by a casing surface of the outer disk carrier 130 and a cylindrical section of the second sun shaft 240 and the piston 114. The pressure equalization chamber 112 which can be filled with unpressurized lubricant to offset the dynamic pressure of the rotating pressure chamber 111, is arranged on the side of the piston 114 facing toward the transfer gearset VS and is formed by the piston 114 and the diaphragm plate 115 sealed against lubricant and axially movable relative to the piston 114. The restoring element 113, here formed as a cup spring, is in this case arranged on the side of the servomechanism 110 close to the transfer gearset and is held axially between the piston 114 and the second sun shaft 140. When the pressure the piston 114 moves against the spring force of the cup spring 113, axially in the direction of the transfer gearset VS, and actuates the disk set 100 associated with it. Lubricant is supplied to the servomechanism 110 of clutch A through a central bore of the carrier shaft 540.

The clutch F is arranged axially between the housing wall GW and the transfer gearset, spatially radially over the hub GN fixed on the transmission housing and radially over the section of the guide vane shaft, extending inward into the transmission. A hub 623 associated with the input element 620 of clutch F is mounted to rotate on this hub GN fixed to the transmission housing, and connected with positive locking to the carrier plate of the coupled carrier ST_VS of the transfer gearset VS on the housing wall side. At the end of this hub 623 near the housing wall a support disk 618 associated with the servomechanism 610 of clutch F and extending radially outward is fixed on the hub 623. This support disk 618 is made as a cylindrical pot whose cylindrical section, starting from the disk-shaped pot bottom of the support disk 618, extends axially toward the transfer gearset VS. A diaphragm plate 615 associated with the servomechanism 610 of clutch F and extending radially outward is welded to the hub 623 approximately in the middle. In the area of its outer diameter the diaphragm plate 615 is welded on its side facing toward the transfer gearset VS to the input element 620, which is made as an inner disk carrier to hold internally toothed steel disks of the disk set 600 of clutch F. In principle, therefore, the inner disk carrier 620 of clutch F is connected to the drive input shaft AN via the diaphragm plate 615 of the servomechanism 610 of clutch F, the hub 623 and the carrier ST_VS of the transfer gearset VS, in a torque-transmitting manner.

In the area axially between the support disk 618 and the disk set 600 is arranged a piston 614 of the servomechanism 610 which acts directly on the disk set 600, being sealed against pressure medium and mounted to move axially on the support disk 618 and the hub 623. Viewed spatially, the disk set 600 is arranged radially over the end of the hub 623 near the transfer gearset. A restoring element 613 of the servomechanism 610 made as a cup spring is arranged axially between the piston 614 and the diaphragm plate 615, and pre-stresses the piston 614 axially against the hub 623. A pressure chamber 611 of the servomechanism 610 is arranged on the side of the piston 614 remote from the transfer gearset, and is formed by the piston 614, the support disk 618 and a section of the hub 623. A pressure equalization chamber 612 of the servomechanism 610, which can be filled with unpressurized lubricant to offset the dynamic pressure of the pressure chamber 611 which always rotates at the speed of the drive input shaft AN, is positioned on the side of the piston 614 facing the transfer gearset and is formed by the piston 614 and the diaphragm plate 615 sealed against lubricant and axially movable relative to the piston 614. When the pressure chamber 611 is filled with pressure medium to close the clutch F, the piston 614 moves against the spring force of the restoring element 613 axially in the direction of the transfer gearset VS and actuates the disk set 600 associated with it. Pressure medium and lubricant are supplied to the servomechanism 610 of clutch F through corresponding ducts and holes in the hub GN (or transmission guide vane shaft) fixed on the transmission housing and the hub 623 of the clutch F.

The speed (and if necessary also the rotation direction) of the drive input shaft AN can be determined by the rotating servomechanism 610 of clutch F in an advantageously simply designed manner. For this, a toothed profile NAN is provided on the outer diameter of the piston 614 of this servomechanism 610, which is sensed radially or axially with no contact by a commercially available speed sensor (not shown), for example using the inductive or Hall measurement principle, so as to deliver measurement signals proportional to the transmission input speed.

As already mentioned, the disk set 200 of clutch B is arranged spatially radially over the ring gear HO_VS of the transfer gearset VS. The servomechanism 210 of clutch B, comprising a pressure chamber 211, a pressure equalization chamber 212, a piston 214, a restoring element 213, a diaphragm plate 215, a hub 219 and a support disk 218, is directly adjacent to the transfer gearset VS on its side close to the housing wall and is arranged spatially—as far as a pressure plate of the piston 214 that acts directly on the disk set 200—in an area radially under the disk set 600 of clutch F. The annular disk-shaped diaphragm plate 215 is positioned directly adjacent to the transfer gearset on its side facing the housing wall GW and the clutch F, and is welded to the ring gear HO_VS of the transfer gearset VS. In the area of its inside diameter, which is somewhat larger than the outer diameter of the sun gear SO_VS of the transfer gearset VS, the diaphragm plate 215 is connected with the hub 219 of the servomechanism 210 with positive locking. This hub 219 extends spatially in an area axially between the carrier plate of the carrier ST_VS of the transfer gearset VS on the housing wall side and the cylindrical working surface of the hub 623 provided for the piston 615 of the servomechanism 610 of clutch F, radially above a cylindrical section of the hub 623 of the input element 620 of clutch F close to the transfer gearset, and is mounted to rotate on this cylindrical section of the hub 623. At the end of the hub 219 on the housing wall side, the support disk 218 is welded to this hub 219. This cylindrical support disk 218 formed geometrically as a pot open in the direction of the transfer gearset VS extends axially adjacent to the diaphragm plate 615 of the servomechanism 610 of clutch F on the side of this diaphragm plate 615 facing the transfer gearset, radially outward as far as a diameter just under the inner disk carrier 620 of the clutch F, such that a cylindrical section of the support disk 218 extends radially under this inner disk carrier 620 (or radially under the disk packet 600 of clutch F), axially toward the transfer gearset VS. Axially between the support disk 218 and the diaphragm plate 215, are arranged the pressure chamber 211 and the pressure equalization chamber 212 of the servomechanism 210 of clutch B, the pressure chamber 211 and the pressure equalization chamber 212 being separated from one another by the piston 214 of the servomechanism 210, and the pressure equalization chamber 212 being arranged closer to the transfer gearset VS than is the pressure chamber 211. The piston 214, sealed against pressure medium, is mounted to move axially on the inside diameter of the cylindrical section of the support disk 218 and on a cylindrical section of the hub 219. The restoring element 213, here made as a cup spring, pre-stresses the piston 214 against the diaphragm plate 215 welded to the hub 219. The pressure chamber 211 is formed by an inner casing surface of the support disk 218, the piston 214 and a cylindrical section of the hub 219. The pressure equalization chamber 212, which can be filled with unpressurized lubricant to offset the dynamic pressure of the pressure chamber 211 which always rotates at the speed of the ring gear HS_VS of the transfer gearset VS, is formed by the piston 214 and the diaphragm plate 215 sealed against lubricant at its outer diameter and axially movable relative to the piston 214.

For the supply of pressure medium to the pressure chamber 211 of the servomechanism 210 of clutch B, the hub GN (or transmission guide vane shaft) fixed on the transmission housing, the hub 623 of the input element 620 of clutch F and the hub 219 of the servomechanism 210 of clutch B, have corresponding ducts and holes. Lubricant is supplied to the pressure equalization chamber 212 of the servomechanism 210 of clutch B through holes in the hub 623 of the input element 620 of clutch F, and holes in the hub 219 of the servomechanism 210 of clutch B and the transfer gearset VS. When the pressure chamber 211 is filled with pressure medium to engage the clutch B, the piston 214 of the servomechanism 210 moves against the spring force of the restoring element 213 axially toward the main gearset HS, and the already mentioned pressure plate of the piston 214, viewed spatially in an area radially over the diaphragm plate 215 and the carrier plate of the carrier ST_VS on the housing wall side, engages radially from the inside axially between the disk sets 600, 200 of clutches F, B arranged next to one another, and acts upon the side of the disk set of clutch B facing toward clutch F.

The output element 630 of clutch F is formed as an outer disk carrier to hold externally toothed lining disks of the disk set 600. The output element 230 of clutch B is formed as an outer disk carrier to hold externally toothed lining disks of the disk set 200. The output element 330 of brake C is formed as an inner disk carrier to hold internally toothed lining disks of the disk set 300. In a manner advantageous from the viewpoint of production technology, the outer disk carrier 630 of clutch F, the outer disk 230 of clutch B and the inner disk carrier 330 of brake C are made as one piece, geometrically in the form of a cylindrical ring which encloses the disk set 600, the clutch B (as far as the small area of the servomechanism 210 arranged axially on the side of the disk set 600 remote from the transfer gearset), the transfer gearset VS arranged radially under the disk set 200, the clutch E and the clutch A, radially in the axial direction.

For the brakes C and D, a common outer disk carrier ZYLCD is provided, which is positively connected to the transmission housing GG. Geometrically, this disk carrier is made as a cylinder with an inner central carrier, such that a first cylindrical section 320 extends from the central carrier axially toward the transfer gearset VS and holds the externally toothed steel disks of the disk set 300 of brake C at its inside diameter. The first cylindrical section 320 of the disk carrier ZYLCD can thus be interpreted as the input element of the brake C. A second cylindrical section 420 of the disk carrier ZYLCD extends from the central carrier axially toward the main gearset HS, and at its inside diameter holds the externally toothed steel disks of the disk set 400 of brake D. The second cylindrical section 420 of the disk carrier ZYLCD can thus be interpreted as the input element of the brake D. The output element 430 of brake D, correspondingly made as the inner disk carrier to hold internally toothed lining disks of the disk set 400 of brake D, is arranged spatially radially under the disk set 400 and is connected with the coupled carrier ST_HS of the main gearset HS, the carrier plate of this carrier ST_HS near the transfer gearset and the inner disk carrier 430 being made as one piece in a manner advantageous from the viewpoint of production technology. A servomechanism 310 for actuating the disk set 300 of brake C, and a servomechanism 410 for actuating the disk set 400 of brake D, are integrated in the disk carrier ZYLCD common to the two brakes C and D. The two servomechanisms 310, 410 are arranged in an area axially between the disk sets 300, 400, axially directly adjacent to one another and separated from one another only by a casing surface of the disk carrier ZYLCD. In accordance with its association, the servomechanism 310 of brake C is positioned closer to the transfer gearset VS than is the servomechanism 410 of brake D. Correspondingly, the servomechanism 410 of brake D is also closer to the main gearset HS than is the servomechanism 310 of brake C. The actuation directions of the two servomechanisms 310, 410 when engaging the disk sets 300 and 400 respectively associated with them, is different. When a pressure chamber 311 of the servomechanism 310 is pressurized with pressure medium to engage brake C, a piston 314 of this servomechanism 310 moves against the spring force of a restoring element 313 of this servomechanism 310, here made as a cup spring, axially in the direction of the transfer gearset VS, and actuates the disk set 300 associated with it. In accordance with the shift logic of the transmission, the brake D must be shifted at a very different pressure level. To be able nevertheless to engage the brake D very sensitively and comfortably, the servomechanism 410 has two pressure chambers 411 that can be controlled independently of one another. The pressure differential between these two pressure chambers acts upon a piston 414 of the servomechanism 410. When the brake D is engaged, the piston 414 moves against the spring force of a restoring element 413 of this servomechanism 410, in this case made as a cup spring, axially toward the main gearset HS, and actuates the disk set 400 associated with it. For the supply of pressure medium to the servomechanisms 410 and 510 of the brakes C, D, corresponding ducts and holes are provided in the transmission housing GG and in the disk carrier ZYLCD.

Kinematically, the ring gear HO_HS of the main gearset HS forms the output element of the main gearset HS made as a two-carrier, four-shaft transmission, and is connected to the drive output shaft AB of the transmission on the side of the main gearset HS facing away from the transfer gearset VS.

Figure 13:
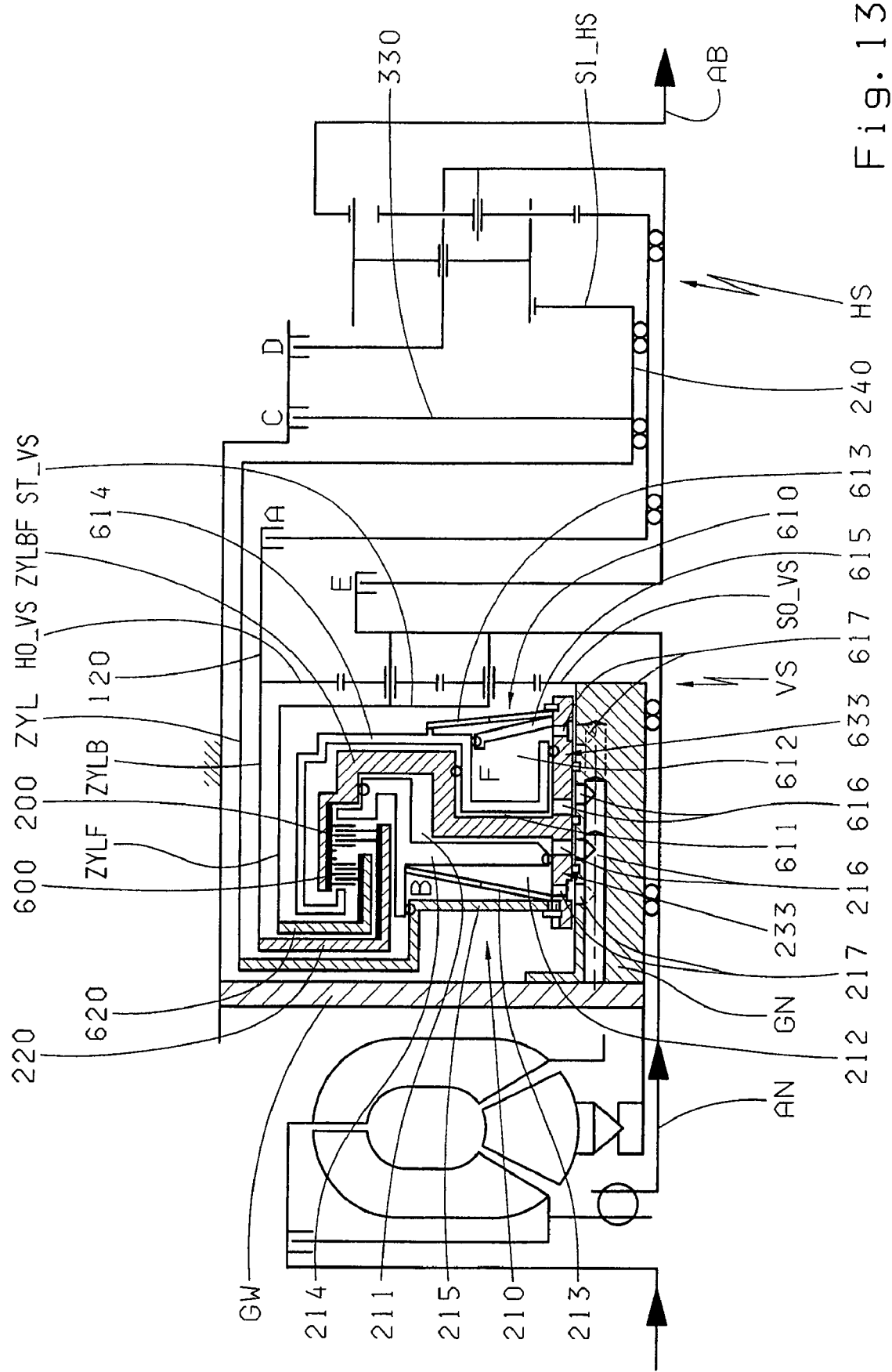
FIG. 13 is an example of an eleventh transmission layout according to the invention.

Referring to FIG. 13, an eleventh example of the transmission layout according to the present invention will now be explained. Similarly, to the transmission layouts or component arrangements according to the invention described so far, the two clutches B and F form a structural group which can be preassembled in a manner advantageous from the standpoint of production technology, which is arranged on the side of the transfer gearset VS facing away from the main gearset HS, spatially axially between the transfer gearset VS and an outer wall GW of the transmission fixed on the transmission housing, radially over a hub GN fixed on the transmission housing and extending axially between this outer wall GW and the transfer gearset VS. This structural group comprises a disk carrier ZYLBF common to the two clutches B, F and formed as an outer disk carrier, a disk set 200 of clutch B and a servomechanism 210 of clutch B associated with this disk set 200, a disk set 600 of clutch F and a servomechanism 610 of clutch F associated with this disk set 600, an inner disk carrier 220 of clutch B and an inner disk carrier 620 of clutch F. On the one hand, the disk sets 200, 600 of the two clutches B, F are arranged axially next to one another, with the disk set 200 of clutch B closer to the transfer gearset VS (and main gearset HS) than is the disk set 600 of clutch F. On the other hand, the servomechanisms 210, 610 of the two clutches B, F are at least largely also arranged axially next to one another, but the servomechanism 610 of clutch F (as far as a pressure plate of this servomechanism 610 which acts directly on the disk set 600) is closer to the transfer gearset VS (and main gearset HS) than is the servomechanism 210 of clutch B, as will be explained in more detail later. The disk carrier ZYLBF forms the output element of both clutches B, F and in accordance with the kinematic coupling described, is in rotationally fixed connection with the first input element (i.e., here the first sun gear S1_HS) of the main gearset HS, as will also be explained in more detail later.

Geometrically, the disk carrier ZYLBF common to the two clutches B, F has an essentially cylindrical structure and is mounted to rotate on the hub GN fixed to the transmission housing which, starting from the housing wall GW, extends axially into the inner space of the transmission toward the transfer gearset VS. The sun gear SO_VS of the transfer gearset VS is fixed onto this hub GN by suitable connection means. In contrast to the example represented in FIG. 13, the hub GN and the housing wall GW can also be made as one piece; for example, the hub GN can also be a guide vane shaft of a torque converter arranged in the force flow between the drive input shaft AN and the drive engine of the transmission. On the outer diameter of the disk carrier ZYLBF a cylindrical section is provided, on whose inside diameter both the outer disks of the disk set 200 of clutch B and the outer disks of the disk set 600 of clutch F are arranged, so that—as already mentioned—the disk set 200 is positioned closer to the transfer gearset VS than is the disk set 600. Starting from the end of the cylindrical section of the disk carrier ZYLBF close to the transfer gearset, a meander-shaped section of the disk carrier ZYLBF extends radially inward as far as the hub of the disk carrier ZYLBF. This hub is divided into two hub sections 633 and 233. Starting from the inside diameter of the meander-shaped section of the disk carrier ZYLBF, the hub section 633 extends axially in the direction of the transfer gearset VS and is—as can be seen from the nomenclature chosen— associated with the output element of the clutch F. The other hub section 233 is associated with the output element of clutch B and extends, starting from the inside diameter of the meander-shaped section of the disk carrier ZYLBF, axially toward the housing wall GW.

The servomechanism 210 of clutch B, comprising a pressure chamber 211, a pressure equalization chamber 212, a piston 214, a restoring element 213, and a diaphragm plate 215, is arranged completely inside a cylindrical space formed by the disk carrier ZYLBF, essentially radially above the hub section 233. The piston 214, sealed against pressure medium, is mounted to move axially on the disk carrier ZYLBF. The pressure chamber 211 is arranged on the side of the meander-shaped section of the disk carrier ZYLBF facing away from the transfer gearset VS, and is formed by a casing surface of the disk carrier ZYLBF (specifically, by part of the meander-shaped section of the disk carrier ZYLBF and part of the hub section 233) and the piston 214. To offset the rotational pressure of the rotating pressure chamber 211 of the servomechanism 210, dynamic pressure compensation is provided by way of the pressure equalization chamber 212 when filled with unpressurized lubricant, which is arranged on the side of the piston 214 facing away from the transfer gearset VS. The pressure equalization chamber 212 is formed by the piston 214 and the diaphragm plate 215, which is fixed axially on the end of the hub section 233 of the disk carrier ZYLBF close to the housing wall, sealed against lubricant and axially movable relative to the piston 214. Thus, the pressure chamber 211 is arranged closer to the transfer gearset VS (and the main gearset HS) than is the pressure equalization chamber 212. The piston 214 is pre-stressed axially against the hub section 233 of the disk carrier ZYLBF by the restoring element 213, in this case for example made as a cup spring. When the pressure chamber 211 is pressurized with pressure medium to engage the clutch B, the piston 214 moves axially in the direction opposite to the transfer gearset VS (and main gearset HS), and actuates the disk set 200 associated with it against the spring force of the restoring element 213.

Viewed spatially, the servomechanism 610 of clutch F is arranged at least largely closer to the transfer gearset VS and main gearset HS than is the servomechanism 210 of clutch B, spatially at least mainly in an area radially over the hub section 633 of the disk carrier ZYLBF close to the transfer gearset. The servomechanism 610 of clutch F comprises a pressure chamber 611, a pressure equalization chamber 612, a partly meander-shaped piston 614, a restoring element 613 and a disk-shaped diaphragm plate 615. The piston 614 is largely adapted geometrically to the outer contour of the disk carrier ZYLBF facing the transfer gearset VS, and is mounted to move axially on the disk carrier ZYLBF. The hub section 633 and the meander-shaped section of the disk carrier ZYLBF are sealed against pressure medium relative to the piston 614. The pressure chamber 611 is arranged on the side of the meander-shaped section of the disk carrier ZYLBF facing the transfer gearset VS and is formed by a casing surface of the disk carrier ZYLBF (specifically, by part of the meander-shaped section of the disk carrier ZYLBF and part of the hub section 633) and the piston 614. Along its further geometrical course the piston 614 extends radially outward to a diameter larger than the outer diameter of the disk carrier ZYLBF, and overlaps the two axially adjacent disk sets 200, 600 in the axial and radial direction, acting upon the disk set 600 of clutch F associated with it on the side of the disk set 600 that faces away from the transfer gearset VS. The section of the piston 614 which overlaps the two axially adjacent disk sets 200, 600 has previously been referred to as "the pressure plate of the servomechanism 610" and for reasons to do with assembly, is made as a separate component one end of which acts upon the disk set 600 and the other end of which is fixed on the outer diameter of the piston of the servomechanism 610 by suitable means, for example with positive locking. Instead of a rotationally symmetrical pressure plate, actuation fingers attached on the outer diameter of the piston of the servomechanism 610, distributed around the circumference, can also of course be provided. To offset the rotational pressure of the rotating pressure chamber 611 of the servomechanism 610, dynamic pressure compensation by way of the pressure equalization chamber 612 which can be filled with unpressurized lubricant is provided, this being arranged on the side of the piston 614 facing toward the transfer gearset VS. The pressure equalization chamber 612 is formed by the piston 614 and the diaphragm plate 615 which is fixed axially on the end of the hub section 633 of the disk carrier ZYLBF close to the transfer gearset, sealed against lubricant and able to move axially relative to the piston 614. The pressure equalization chamber 612 is thus arranged closer to the transfer gearset VS (and main gearset HS) than is the pressure chamber 611. The piston 614 is pre-stressed axially against the hub section 633 of the disk carrier ZYLBF by the restoring element 613, in this case made for example as a cup spring, this cup spring 613 being arranged outside the pressure equalization chamber 612, i.e., on the side of the diaphragm plate 615 facing toward the transfer gearset VS. When the pressure chamber 611 is pressurized with pressure medium to engage the clutch F, the piston 614 moves axially toward the transfer gearset VS (and main gearset HS) and actuates the disk set 600 associated with it against the spring force of the restoring element 613.

The pressure chamber 611 of the servomechanism 610 of clutch F is thus separated from the pressure chamber 211 of the servomechanism 210 of clutch B only by a casing surface of the disk carrier ZYLBF common to the two clutches B, F. The actuation directions of the servomechanisms 210, 610 when the respectively associated disk sets 200 and 600 are actuated to close the clutches, are opposite.

By virtue of the mounting of the disk carrier ZYLBF on the hub GN attached to the transmission housing, pressure medium and lubricant can be supplied to the two clutches B, F in a simply designed manner, through corresponding ducts and holes which pass partly within the housing hub GN and partly within the hub of the disk carrier ZYLBF. The pressure medium supply to the pressure chamber 211 of the servomechanism 210 of clutch B is indexed 216, the lubricant supply to the pressure equalization chamber 212 of the servomechanism 210 of clutch B is indexed 217, the pressure medium supply to the pressure chamber 611 of the servomechanism 610 of clutch F is indexed 616, and the lubricant supply to the pressure equalization chamber 612 of the servomechanism 610 of clutch F is indexed 617.

The inner disk carrier 620 of clutch F forms the input element of clutch F. Geometrically, this inner disk carrier 620 is formed as a cylinder. A cylindrical section of the inner disk carrier 620 has on its outer diameter a carrier profile to hold internally toothed disks of the disk set 600 of clutch F (near the housing wall), and extends starting from the end of this disk set 600 close to the transfer gearset, axially in the direction of the housing wall. A disk-shaped section of this inner disk carrier 620 is connected to the cylindrical section of the inner disk carrier 620 at its end near the housing wall, and extends, starting from this cylindrical section of the inner disk carrier 620, radially outward as far as a diameter larger than the outer diameter of the piston 615 or pressure plate of the servomechanism 610 of clutch F. On its outer diameter, the disk-shaped section of the inner disk carrier 620 is in rotationally fixed connection with a cylindrical connecting element ZYLF, for example with positive locking by way of a carrier profile. In turn, this cylindrical connecting element ZYLF encloses at least the disk sets 200, 600 of the two clutches B, F arranged next to one another and the servomechanism 610 of clutch F completely in the axial direction (and therefore also the outer disk carrier ZYLBF common to both clutches B, F at least largely in the axial direction), and is connected at its end nearer the transfer gearset with a carrier plate of the coupled carrier ST_VS of the transfer gearset VS facing away from the main gearset HS. For example, the inner disk carrier 620 of clutch F and the cylindrical connecting element ZYLF can also be made as one piece. Since the carrier ST_VS is in rotationally fixed connection via its carrier plate facing the main gearset HS with the drive input shaft AN, the inner disk carrier or input element 620 of the clutch F always rotates at the speed of the drive input shaft AN.

The inner disk carrier 220 of clutch B forms the input element of clutch B. Geometrically, this inner disk carrier is formed as a cylinder. A cylindrical section of this inner disk carrier 220 has on its outer diameter a carrier profile to hold internally toothed disks of the disk set 200 of clutch B (close to the transfer gearset) and extends, starting from the end of this disk set 200 nearer the transfer gearset, axially in the direction of the housing wall as far as an area between the radially outer section of the diaphragm plate 215 of the servomechanism 210 of clutch B and the disk-shaped section of the inner disk carrier 620 of clutch F. A disk-shaped section of this inner disk carrier 220 is connected at the end of the cylindrical section of the inner disk carrier 220 nearer the housing wall to the cylindrical section, and starting from this cylindrical section of the inner disk carrier 220, extends axially between the radially outer section of the diaphragm plate 215 and the disk-shaped section of the inner disk carrier 620, radially outward as far as a diameter larger than the outer diameter of the inner disk carrier 620 or the cylindrical connecting element ZYLF. On its outer diameter the disk-shaped section of the inner disk carrier 220 is rotationally fixed to a cylindrical connecting element ZYLB, for example with positive locking by way of a carrier profile. This cylindrical connecting element ZYLB, in turn, encloses the cylindrical connecting element ZYLF completely in the axial direction, and is in rotationally fixed connection with the ring gear HO_HS of the transfer gearset VS. Thus, the inner disk carrier or input element 220 of clutch B always rotates at the same speed as this ring gear HO_HS. Since the input element 120 of clutch A, also rotationally fixed to this ring gear HO_HS, is adjacent to the ring gear HO_HS on the side of the transfer gearset VS facing toward the main gearset HS, the input element 120 (here, for example, the outer disk carrier) of clutch A and the cylindrical connecting element ZYLB can be made as one piece, for example also together with the ring gear HO_VS. It can, however, also be provided that the inner disk carrier 220 of clutch B and the cylindrical connecting element ZYLB are made as one piece.

As a special design feature, the diaphragm plate 215 of the servomechanism 210 of clutch B can also be used for speed and torque transfer between the disk carrier ZYLBF, which forms the output element of the two clutches B, F, and the sun gear S1_HS of the main gearset HS close to the transfer gearset, which here for example forms the first input element of the main gearset HS. For this, the diaphragm plate 215 is connected rotationally fixed at the end of the hub of the disk carrier ZYLBF close to the housing wall, to the hub section 233 of the disk carrier ZYLBF, in this case for example by way of a carrier profile. Along its geometrical course, the diaphragm plate 215 extends radially outward axially adjacent to the housing wall GW, and is connected in the area of its outer diameter to the cylindrical connecting element ZYL, for example by way of a carrier profile. This cylindrical connecting element ZYL, in turn, is geometrically formed as a pot open toward the housing wall GW. An ring casing surface of the connecting element ZYL encloses the structural group comprising the two clutches B, F and the cylindrical connecting element ZYLB, the transfer gearset VS and the two clutches E, A completely in the axial direction. A disk-shaped pot bottom of this connecting element ZYL is connected to the ring casing surface of the connecting element ZYL at its end near the main gearset and extends radially inward in the area axially adjacent to the clutch A on its side facing the main gearset HS. In its hub area the cylindrical connecting element ZYL is in rotationally fixed connection both with the output element 330 of the brake C and (via a sun shaft 240) with the sun gear S1_HS of the main gearset HS near the transfer gearset (here again, for example, forming the first input element of the main gearset HS). Consequently, the servomechanisms 210, 610 of the two clutches B, F always rotate with the speed of this sun gear S1_HS.

The spatial arrangement, structure and kinematic connection of the other transmission structural elements (shift elements E, A, C and D, main gearset HS) of the eleventh transmission layout according to the invention shown in FIG. 13, correspond to those shown in FIG. 2, and need not therefore be described again here.

In the following three example embodiments of component arrangements according to the invention shown in FIGS. 14, 15, and 16, it is provided—in combination with the relevant gearset layout according to FIGS. 1A and 1B—that a structural group comprising the shift elements B, F and C is arranged at least mainly on the side of the transfer gearset VS facing away from the main gearset HS, spatially at least mainly axially between the transfer gearset VS and an outer wall GW of the transmission fixed to the transmission housing, and at least mainly radially over a hub GN fixed on the transmission housing which extends axially between this outer wall GW and the transfer gearset VS. In this arrangement, the disk set 200 of clutch B always has a larger diameter than the disk set 600 of clutch F, and the clutch F is always arranged inside a cylindrical space formed by an output element 230 of clutch B. In these three example embodiments, the main gearset HS is again for example made as a Ravigneaux planetary gearset, arranged co-axially with the transfer gearset VS made as a simple planetary gearset of double planetary structure. For example, the drive input shaft AN and the drive output shaft AB are arranged co-axially with one another, but for those with knowledge of the field, it is easy to envisage an axis-parallel or angled position of the drive input and drive output shafts involving no particularly great redesigning effort.

Figure 14:
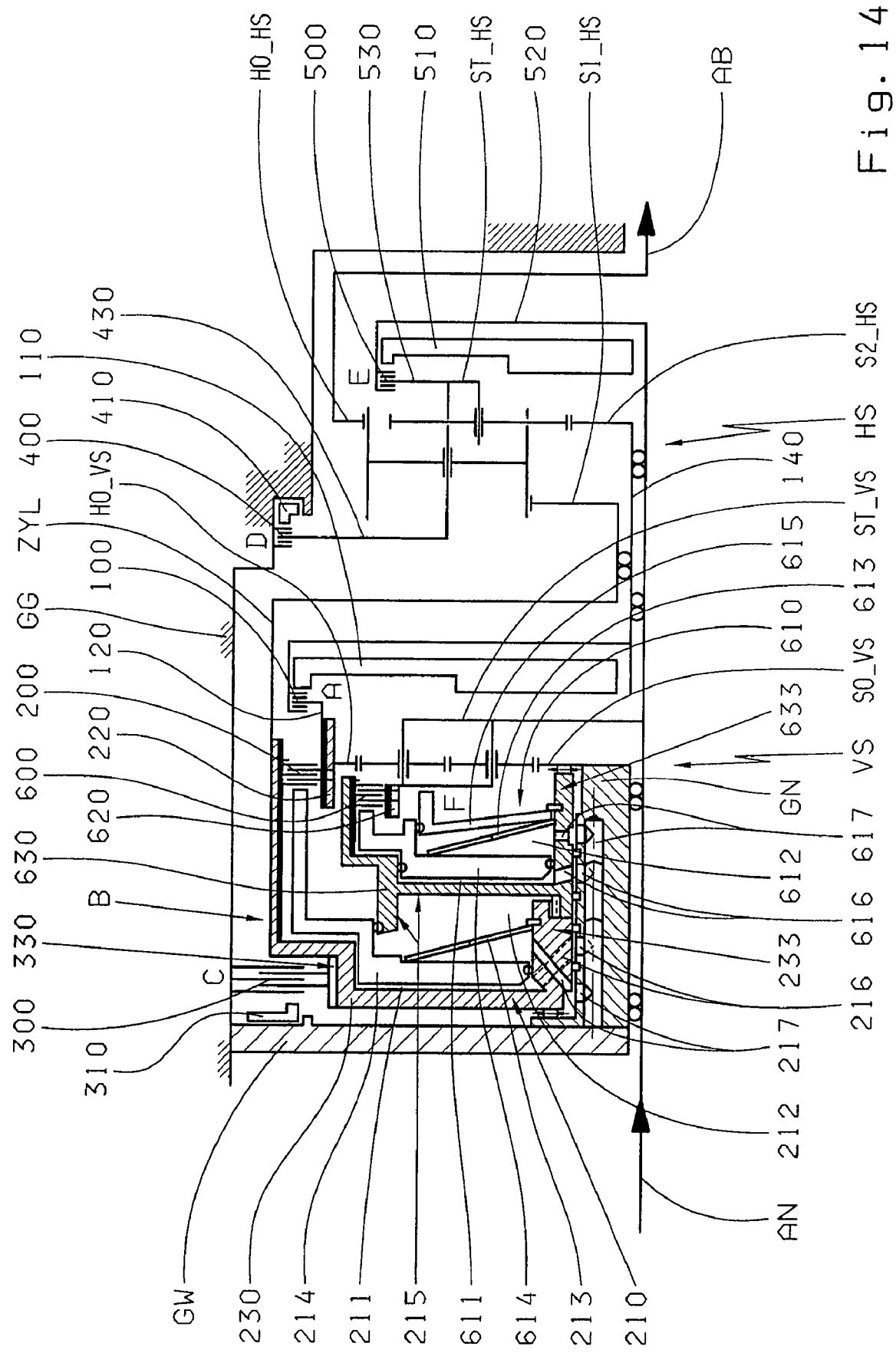
FIG. 14 is an example of a twelfth transmission layout according to the invention.

Referring to FIG. 14, a twelfth example transmission layout according to the present invention will now be explained in detail. As already indicated, the two clutches B, F form a structural group arranged mainly on the side of the transfer gearset VS facing away from the main gearset HS, spatially mainly axially between the transfer gearset VS and a housing wall GW fixed on the transmission housing facing toward a drive engine of the transmission (not shown) which is in active connection with the drive input shaft AN, directly adjacent to the transfer gearset VS and the housing wall GW. This structural group comprises the two clutches B, F and each of the clutches B, F having a respective output element 230 and 630 made as outer disk carriers, respective disk sets 200 and 600, and respective servomechanisms 210 and 610 for actuating the respective disk sets 200 and 600. In accordance with the specified kinematic coupling, these two outer disk carriers 230, 630 are rotationally fixed to the first input element of the main gearset HS—i.e., here to its first sun gear S1_HS—as will be explained in greater detail later. The disk set 200 of clutch B has a larger diameter than the disk set 600 of clutch F. Essentially, the clutch F is arranged inside a cylindrical space formed by the output element 230 or outer disk carrier of clutch B. In contrast to the component arrangements or transmission layouts according to the invention described earlier, in this case the brake C, for example, made as a disk brake, is also arranged on the side of the transfer gearset VS facing away from the main gearset HS, in an area axially between the transfer gearset VS and the housing wall GW fixed to the transmission housing, axially adjacent to the housing wall. Of course, the housing wall GW and the transmission housing GG can also be made as one piece. The clutch A and the brake D are arranged axially between the transfer gearset VS and the main gearset HS. In contrast to the component arrangements or transmission layouts according to the invention described earlier, the clutch E is now arranged on the side of the main gearset HS facing away from the transfer gearset VS.

The clutch E, arranged kinematically in accordance with the gearset layout of the relevant prior art according to FIG. 1A between the drive input shaft AN and the third input element of the main gearset HS, is axially directly adjacent to the main gearset HS on the side of the latter facing away from the transfer gearset VS. Correspondingly, an input element 520 of the clutch E is connected to the drive input shaft AN and an output element 530 of the clutch E is connected to the coupled carrier ST_HS of the main gearset HS. The input element 520 is in this case made for example as an outer disk carrier to hold externally toothed disks of the disk set 500 of clutch E. Correspondingly, the output element 530 of clutch E is made as an inner disk carrier to hold internally toothed disks of the disk set 500 of clutch E. In the example shown, the disk set 500 is arranged on a diameter approximately the same as the diameter of the ring gear HO_HS of the main gearset HS. Although this disk diameter requires a relatively large number of disks for the disk set 500, in the area of the transmission output it enables a slim housing structure suitable for a so-termed standard drive. In combination with the non-coaxial arrangement of the drive input and drive output shaft AN, AB, those with knowledge of the field can if necessary arrange the disks of clutch E even on a larger diameter. Geometrically, the cylindrical outer disk carrier 520 of clutch E is made as a pot open in the direction of the main gearset HS, within which the disk set 500 and the servomechanism 510 to actuate this disk set 500 are arranged. The drive input shaft AN connected with a hub of the outer disk carrier 520 passes through the transmission completely along its axial course as far as the outer wall of the transmission housing GG on the drive output side. A section of the drive output shaft AB connected to the ring gear HO_HS radially completely overlaps the clutch E in the axial direction. The servomechanism 510, here illustrated only schematically for the sake of simplicity, is arranged on the side of the disk set 500 remote from the main gearset and, when engaging the clutch E, actuates the disk set axially in the direction of the main gearset HS. Preferably, the servomechanism 510 also comprises dynamic pressure compensation, since a pressure chamber of this servomechanism 510 (not shown) rotates always at the speed of the drive input shaft AN.

The brake D, arranged kinematically between the coupled carrier ST_HS of the main gearset HS and the transmission housing GG in accordance with the gearset layout of the relevant prior art according to FIG. 1A, is made for example as a disk brake. Spatially, this brake D is arranged close to the main gearset HS in the area of the inside diameter of the transmission housing GG, and an output element 430 formed as an inner disk carrier to hold internally toothed disks of the disk set 400 of brake D is rotationally fixed to the carrier plate of the coupled carrier ST_HS of the main gearset HS, facing toward the transfer gearset VS. An outer disk carrier to hold externally toothed disks of the disk set 400 of brake D is in this case, for example, integrated directly in the transmission housing GG, but can of course also be made as a separate component, which is then connected rotationally fixed to the transmission housing GG. A servomechanism of the brake D for actuating the disk set 400, shown in a simplified representation, is indexed 410 and is in this case for example also integrated in the transmission housing GG, but can equally well for example be integrated in a separate outer disk carrier of the brake D. When the brake D is engaged, the servomechanism 410 actuates the disk set 400 associated with it axially in the direction of the transfer gearset VS.

Viewed in the direction of the main gearset HS, the clutch A is axially adjacent to the transfer gearset VS. In accordance with the gearset layout of the relevant prior art according to FIG. 1A, the clutch A is arranged kinematically between the output element of the transfer gearset VS and the second input element of the main gearset HS. Correspondingly, an input element 120 of clutch A is connected with the ring gear HO_VS of the transfer gearset VS and an output element 130 of clutch A is connected to the second sun gear S2_HS of the main gearset HS (remote from the transfer gearset). The input element 120 is here made for example as an inner disk carrier to hold internally toothed disks of the disk set 100 of clutch A. Of course, the ring gear HO_VS and the input element or inner disk carrier 120 can be made as one piece. In the example shown, the disk set 100 is arranged on a larger diameter than the ring gear HO_VS. The output element 130 of clutch A is here formed as an outer disk carrier to hold externally toothed disks of the disk set 100 and is connected via a sun shaft 140 to the second sun gear S2_HS of the main gearset HS remote from the transfer gearset. This sun shaft 140 encloses the drive input shaft AN in part, and along its axial course passes centrally through the first sun gear S1_HS of the main gearset HS close to the transfer gearset. Of course, the sun shaft 140 and the sun gear S2_HS can also be made as one piece. Geometrically, the cylindrical outer disk carrier 130 of clutch A is formed as a pot open in the direction of the transfer gearset VS, within which the disk set 100 and a servomechanism 110 to actuate this disk set 100 are arranged. This servomechanism 110, represented here only schematically for the sake of simplicity, is arranged on the side of the disk set 100 close to the main gearset and actuates the disk set when engaging the clutch A axially in the direction of the transfer gearset VS. Preferably, the servomechanism 110 also comprises dynamic pressure compensation, since a pressure chamber (not shown) of the servomechanism 110 always rotates with the speed of the second sun gear S2_HS of the main gearset HS.

The clutch B is, arranged spatially mainly radially over the hub GN fixed to the transmission housing, by which the sun gear SO_VS of the transfer gearset VS is also fixed relative to the transmission housing GG. The disk set 200 of clutch B is arranged at least partially in an area radially over the ring gear HO_VS of the transfer gearset VS on a comparatively large diameter. Correspondingly, the input element 220 of clutch B made as an inner disk carrier to hold internally toothed disks of the disk set 200 is also arranged at least in part in the area over the ring gear HO_VS of the transfer gearset VS and is in rotationally fixed connection with this ring gear HO_VS. Of course, the inner disk carrier 220 and the ring gear HO_VS can be made in one piece. Of course, the spatial position of the disk set 200 of clutch B is not limited to that shown in FIG. 14, and can be displaced axially to one side or the other.

Geometrically, the output element 230 of clutch B made as an outer disk carrier is formed as a cylindrical pot open in the direction of the transfer gearset VS and the main gearset HS, with a largely cylindrical casing, a disk-shaped pot bottom and a hub 233. The disk-shaped pot bottom of the outer disk carrier 230 is axially directly adjacent to the housing wall GW and extends largely parallel to this in the radial direction. At the inside diameter of the pot bottom is connected the hub 233 of the outer disk carrier 230, which extends radially over the hub GN fixed to the transmission housing in the axial direction approximately as far as the middle of the hub GN, being mounted to rotate on this hub GN. At the outer diameter of the pot bottom is connected the casing of the outer disk carrier 230, which extends—with radial steps in the example shown—axially in the direction of the transfer gearset VS and the main gearset HS as far as over the disk set 200 here arranged radially over the ring gear HO_VS of the transfer gearset VS. The section of the casing of the outer disk carrier 230 near the housing wall is at the same time formed as the output element 330 of the brake C, and has at its outer diameter a suitable carrier profile for engaging internally toothed disks of the disk set 300 of this brake C. At the inside diameter of the section of the casing of the outer disk carrier 230 near the transfer gearset a suitable carrier profile is provided for holding externally toothed disks of the disk set 200 of clutch B. The servomechanism 210 of clutch B, comprising a pressure chamber 211, a pressure equalization chamber 212, a piston 214 and a restoring element 213, is arranged completely inside the cylindrical space formed by the outer disk carrier 230 of clutch B, essentially radially above the hub 233 of the outer disk carrier 230. The piston 214 is mounted to move axially on the outer disk carrier 230 and is sealed with respect to pressure medium against the latter. The pressure chamber 211 is formed by an inner casing surface of the outer disk carrier 230 and the piston 214. Correspondingly, the pressure chamber 211 always rotates at the speed of the outer disk carrier 230. To offset the rotational pressure of the rotating pressure chamber 211, dynamic pressure compensation is provided by the pressure equalization chamber 212 when filled with unpressurized lubricant, this pressure equalization chamber 212 being arranged closer to the transfer gearset VS (and main gearset HS) than is the pressure chamber 211. The pressure equalization chamber 212 is arranged on the side of the piston facing toward the transfer gearset VS, and is formed by the piston 214 and a casing surface 215 of the output element or outer disk carrier 630 of the clutch F facing toward the pressure chamber 211, this outer disk carrier 630 being sealed against lubricant and axially movable relative to the piston 214. From the nomenclature chosen for the casing surface 215 of the outer disk carrier 630 involved in the formation of the pressure equalization chamber 212, it can be seen that the outer disk carrier 630 of clutch F at the same time has the function of a diaphragm plate for the servomechanism 210 of clutch B. The piston 214 is pre-stressed axially against the hub 233 of the outer disk carrier 230 by the restoring element 213, in this case for example made as a cup spring. When the pressure chamber 211 is pressurized with pressure medium to engage the clutch B, the piston 214 moves axially toward the transfer gearset VS and main gearset HS, and actuates the disk set 200 associated with it against the spring force of the restoring element 213. The mounting of the outer disk carrier 230 of clutch B on the hub GN attached to the transmission housing provides relatively simply designed pressure medium and lubricant supply for the clutch B via corresponding ducts and holes, passing partly within the housing hub GN and partly within the hub 233 of the outer disk carrier 230. The pressure supply to the pressure chamber 211 of the servomechanism 210 of clutch B is indexed 216, and the lubricant supply to the pressure equalization chamber 212 of the servomechanism 210 of clutch B is indexed 217.

The clutches B and F are nested one inside the other, the clutch F being, in principle, inside the clutch B. Correspondingly to the position of the disk set 200 of clutch B in an area radially over the transfer gearset, the clutch F is arranged spatially completely inside a cylindrical space formed by the piston 214 of the servomechanism 210 of clutch B. The disk set 600 of clutch F is axially directly adjacent to the transfer gearset VS and, in the example shown, is arranged approximately on the diameter of the ring gear HO_VS of the transfer gearset VS.

The input element 620 of clutch F is made as an inner disk carrier to hold internally toothed disks of the disk set 600 of this clutch F, and is in rotationally fixed connection with a carrier plate of the coupled carrier ST_VS of the transfer gearset VS remote from the main gearset. Of course, the carrier plate and the inner disk carrier 620 can also be made as one piece. On its side near the main gearset, the coupled carrier ST_VS of the transfer gearset VS is in rotationally fixed connection with the drive input shaft AN.

The outer disk carrier 630 of clutch F, which accommodates the disk set 600 and the servomechanism 610, is formed geometrically as a cylindrical pot open toward the transfer gearset VS and main gearset HS, with a casing largely in the shape of a cylindrical ring, a disk-shaped pot bottom and a hub 633. The casing of the outer disk carrier 630, in the shape of a radially stepped cylindrical ring in the example shown, extends starting from the end of the disk set 600 on the transfer gearset side axially toward the housing wall GW as far as the piston 214 of the servomechanism 210 of the clutch B. On the inside diameter of its end facing the transfer gearset VS, the casing of the outer disk carrier 630 has a suitable carrier profile to hold externally toothed disks of the disk set 600 of clutch F. To form the pressure equalization chamber 212 of the servomechanism 210 of the clutch B, the casing of the outer disk carrier 630, sealed against lubricant at its end near the housing wall, is mounted to move axially relative to the piston 214. Approximately in the middle of the cylindrical-ring-shaped casing of the outer disk carrier 630 is connected the disk-shaped pot bottom of the outer disk carrier 630, which extends radially inward as far as just above the hub GN attached to the transmission housing. At the inside diameter of the pot bottom is connected the hub 633 of the outer disk carrier 630, which extends axially toward the transfer gearset VS as far as just before the sun gear SO_VS and is mounted to rotate on the hub GN fixed on the transmission housing.

The servomechanism 610 of clutch F, comprising a pressure chamber 611, a pressure equalization chamber 612, a piston 614, a restoring element 613 and a diaphragm plate 615, is arranged completely inside a cylindrical space formed by the outer disk carrier 630 of clutch F, and radially above the hub 633. The piston 614 is mounted to move axially on the outer disk carrier 630 and sealed against pressure medium on to it. The pressure chamber 611 is formed by an inner casing surface of the outer disk carrier 630 facing toward the transfer gearset VS and by the piston 614. Correspondingly, the pressure chamber 611 always rotates at the speed of the outer disk carrier 630. To offset the rotational pressure of the rotating pressure chamber 611, dynamic pressure compensation is provided by the pressure equalization chamber 612 when filled with unpressurized lubricant, this pressure equalization chamber 612 being arranged closer to the transfer gearset VS (and the main gearset HS) than is the pressure chamber 611. The pressure equalization chamber 612 is formed by the piston 614 and the diaphragm disk 615, which is fixed axially at the end of the hub 633 of the outer disk carrier 630 close to the transfer gearset, sealed against lubricant and axially movable relative to the piston 614. The piston 614 is pre-stressed against the hub 633 by the restoring element 613 in this case for example made as a cup spring. When the pressure chamber 611 is pressurized with pressure medium to engage the clutch F, the piston 614 moves axially toward the transfer gearset VS (and main gearset HS), and actuates the disk set 600 associated with it against the spring force of the restoring element 613. The mounting of the outer disk carrier 630 of clutch F on the hub GN fixed on the transmission housing enables relatively simply designed pressure medium and lubricant supply to the clutch F via corresponding ducts and holes which pass partly within the housing hub GN and partly within the hub 633 of the outer disk carrier 630. The pressure medium supply to the pressure chamber 611 of the servomechanism pressure equalization chamber 612 of the servomechanism 610 of clutch F is indexed 617.

Viewed spatially, the servomechanism 610 of clutch F is arranged closer to the main and transfer gearsets HS, VS than is the servomechanism 210 of clutch B, and the pressure chamber 611 of the servomechanism 610 and the pressure equalization chamber 211 of the servomechanism 210 are separated from one another only by a casing surface of the output element or outer disk carrier 630 of clutch F.

In accordance with the gearset layout of the relevant prior art according to FIG. 1A, the first sun gear S1_HS of the main gearset HS, close to the transfer gearset, constitutes the first input element of the main gearset HS. For the kinematic connection of the outer disk carriers 230, 630 of the clutches B, F to this sun gear S1_HS, the hubs 633, 233 of the two outer disk carriers 630, 230 are rotationally fixed with one another, in this case for example with positive locking by way of a suitable carrier profile. On the other hand, the outer disk carrier 230 of clutch B is rotationally fixed—for example with positive locking—in the area of its end facing toward the main gearset HS, to a cylindrical connecting element ZYL. This connecting element ZYL, in turn, is formed as a pot open in the direction of the housing wall GW, with a cylindrical-ring-shaped casing which encloses the clutch A radially in the axial direction, and with a disk-shaped pot bottom which extends on the side of the output element or outer disk carrier 130 of clutch A facing the main gearset HS, adjacent to this output element or outer disk carrier 130, radially inward to a diameter just above the sun shaft 140, and is connected in its hub area with the sun gear S1_HS of the main gearset HS near the transfer gearset. The outer disk carrier 630 of clutch F is thus rotationally fixed to the sun gear S1_HS by virtue of the outer disk carrier 230 of clutch B. Correspondingly, the servomechanisms 210, 610 of the two clutches B, F always rotate at the speed of the first input element—i.e., here the first sun gear S1_HS of the main gearset HS.

An outer disk carrier to hold externally toothed outer disks of the disk set 300 of brake C is in this case for example integrated directly in the transmission housing GG, but can of course also be made as a separate structural element, which is then in rotationally fixed connection with the transmission housing GG. A servomechanism of the brake C for actuating the disk set 300, indexed 310 and represented in a simplified manner, is for example integrated in the housing wall GW in this case, but can for example also be integrated in a separate outer disk carrier of the brake C. When the brake C is engaged, the servomechanism 310 actuates the disk set 300 associated with it axially toward the transfer gearset VS and main gearset HS.

Figure 15:
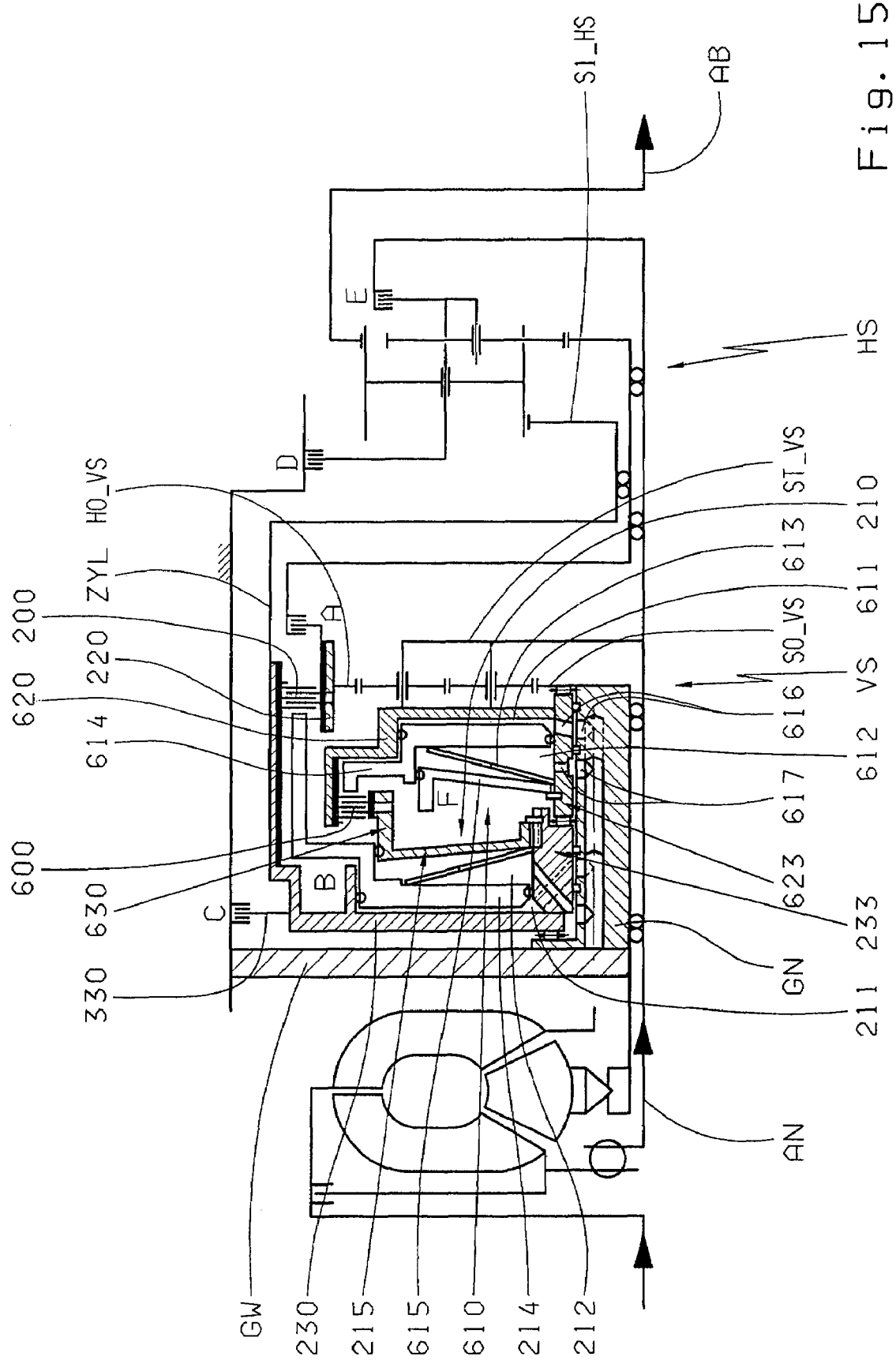
FIG. 15 is an example of a thirteenth transmission layout according to the invention.

Referring to FIG. 15, a thirteenth example transmission layout according to the present invention will now be explained, which is based on the twelfth transmission layout according to the invention described with reference to FIG. 14. The essential differences compared with FIG. 14 concern the design of the clutch F and its mechanical connection to the drive input shaft AN and to the first input element of the main gearset HS. Viewed spatially, the three shift elements B, C, F—as in FIG. 14—are arranged at least mainly in an area axially between the housing wall GW fixed on the transmission housing and the transfer gearset VS, and the disk set 200 of clutch B is arranged for example at least partly radially over the transfer gearset VS, with the clutch F axially adjacent to the transfer gearset VS.

The input element 220 of clutch B connected with the ring gear HO_VS of the transfer gearset VS and made as an inner disk carrier, is the same as in FIG. 14. The output element 230 of clutch B connected by way of the cylindrical connecting element ZYL with the sun gear S1_HS of the main gearset near the transfer gearset and made as an outer disk carrier, corresponds essentially to the example embodiment shown in FIG. 14, but with the rotationally fixed connection between the output element 630 of clutch F and the hub 233 of the output element 230 of clutch B is formed by way of a carrier profile of different detailed design. Essentially, the servomechanism 210 of clutch B arranged inside the outer disk carrier 230 is also the same as in FIG. 14, except only that a different design is used for the pressure equalization chamber 212 of the servomechanism 210 on the side of the piston 214 facing the transfer gearset. In contrast to FIG. 14, this pressure equalization chamber 212 is now formed by the piston 214 and a section of the inner disk carrier of the clutch F indexed 215 in accordance with its function, as will be described in more detail later. As in FIG. 14, the servomechanism 210 of clutch B always rotates at the speed of the first input element of the main gearset HS, i.e., here always at the speed of the sun gear S1_HS of the main gearset HS close to the transfer gearset.

In contrast to FIG. 14, the input element 620 of clutch F connected to the drive input shaft AN is now made as an outer disk carrier to hold externally toothed disks of the disk set 600 of the clutch F. Geometrically, this outer disk carrier 620 is made as a cylindrical pot open toward the housing wall GW. The largely disk-shaped pot bottom of this outer disk carrier 620 is arranged immediately axially adjacent to the transfer gearset VS, permanently connected to the coupled carrier ST_VS of the transfer gearset VS, and extends parallel to the transfer gearset VS in the radial direction in an area radially between the hub GN fixed on the transmission housing, on to which the sun gear SO_VS of the transfer gearset VS is fixed, and a diameter corresponding approximately to the diameter of the ring gear HO_VS of the transfer gearset VS. This pot bottom of the outer disk carrier 620 can at the same time be a carrier plate of the carrier ST_VS. The largely cylindrical-ring-shaped casing of the outer disk carrier 620 is connected at the outer diameter of the pot bottom and extends axially toward the housing wall GW as far as over the disk set 600 of clutch F, axially approximately as far as the middle of the hub GN fixed on the housing. On the inside diameter of its end near the housing wall, the casing of the outer disk carrier 620 has a suitable carrier profile to hold externally toothed disks of the disk set 600. Viewed axially, this disk set 600 is here, for example, arranged approximately in the middle between the housing wall GW and the transfer gearset VS. A hub 623 of the outer disk carrier 620 is connected at the inside diameter of the pot bottom of the outer disk carrier 620, and extends axially in the direction of the housing wall GW as far as the end of the hub 233, close to the transfer gear, of the output element or outer disk carrier 230 of clutch B, here for example approximately as far as the middle of the hub GN fixed on the housing. The hub 623 of the outer disk carrier 620 encloses the hub GN fixed on the housing, and is mounted to rotate on it. In contrast to FIG. 14, no carrier profile, but instead an axial bearing is provided between the two hubs 623 and 233 mounted to rotate on the hub GN fixed to the housing.

The servomechanism 610 of clutch F is arranged completely inside a cylindrical space formed by the outer disk carrier 620 of clutch F, spatially radially over the hub 623 of this outer disk carrier 620, and acts on the disk set 600 of clutch F from its side facing the transfer gearset VS. The servomechanism 610 comprises a pressure chamber 611, a pressure equalization chamber 612, a piston 614, a restoring element 613 and a diaphragm plate 615. The piston 614 is mounted to move axially on the outer disk carrier 620 and sealed on it against pressure medium. The pressure chamber 611 is formed by an inner casing surface of the outer disk carrier 620 facing toward the housing wall GW and the piston 614. In contrast to FIG. 14, the pressure chamber 611 now always rotates at the speed of the drive input shaft AN. To offset the rotational pressure of the rotating pressure chamber 611, dynamic pressure compensation is provided by the pressure equalization chamber 612 when filled with unpressurized lubricant, and the pressure chamber 611 is arranged closer to the transfer gearset VS (and main gearset HS) than is the pressure equalization chamber 612. The pressure equalization chamber 612 is formed by the piston 614 and the diaphragm plate 615, which is fixed at the end of the hub 623 of the outer disk carrier 620 near the housing wall, sealed against lubricant and able to move axially relative to the piston 614. The piston 614 is pre-stressed against the hub 623 by the restoring element 613 here for example made as a cup spring. When the pressure chamber 611 is pressurized with pressure medium to engage the clutch F, the piston 614 moves axially toward the housing wall GW or in the direction opposite to the transfer gearset VS, and actuates the disk set 600 associated with it against the spring force of the restoring element 613. The mounting of the outer disk carrier 620 of clutch F on the hub GN fixed to the transmission housing enables simply designed pressure medium and lubricant supply to clutch F via corresponding ducts and holes that pass partly within the housing hub GN and partly within the hub 623 of the outer disk carrier 620. The pressure medium supply to the pressure chamber 611 of the servomechanism 610 of clutch F is indexed 616, and the lubricant supply to the pressure equalization chamber 612 of the servomechanism 610 of clutch F is indexed 617.

In contrast to FIG. 14, the output element 630 of clutch F connected with the first input element of the main gearset HS, i.e., here with the sun gear S1_HS of the main gearset HS close to the transfer gearset, is now made as an inner disk carrier to hold internally toothed disks of the disk set 600 of clutch F. For this, the inner disk carrier 630 is connected rotationally fixed in its hub area to the hub 233 of the outer disk carrier 230 of clutch B, here for example with positive locking by way of a suitable torque-transmitting carrier profile. A special design feature is that the inner disk carrier 630 of clutch F at the same time fulfils the function of a diaphragm plate to form the pressure equalization chamber 211 for the dynamic pressure compensation of the servomechanism 210 of clutch B. For this a section of the inner disk carrier 630, indexed 215 in accordance with its function, is sealed against lubricant and mounted to move axially relative to the piston 214 of the servomechanism 210.

The spatial arrangement and design of the other transmission structural elements of the twelfth transmission layout according to the invention shown in FIG. 15 correspond to those shown in FIG. 14, and need not, therefore, be described again here.

Figure 16:
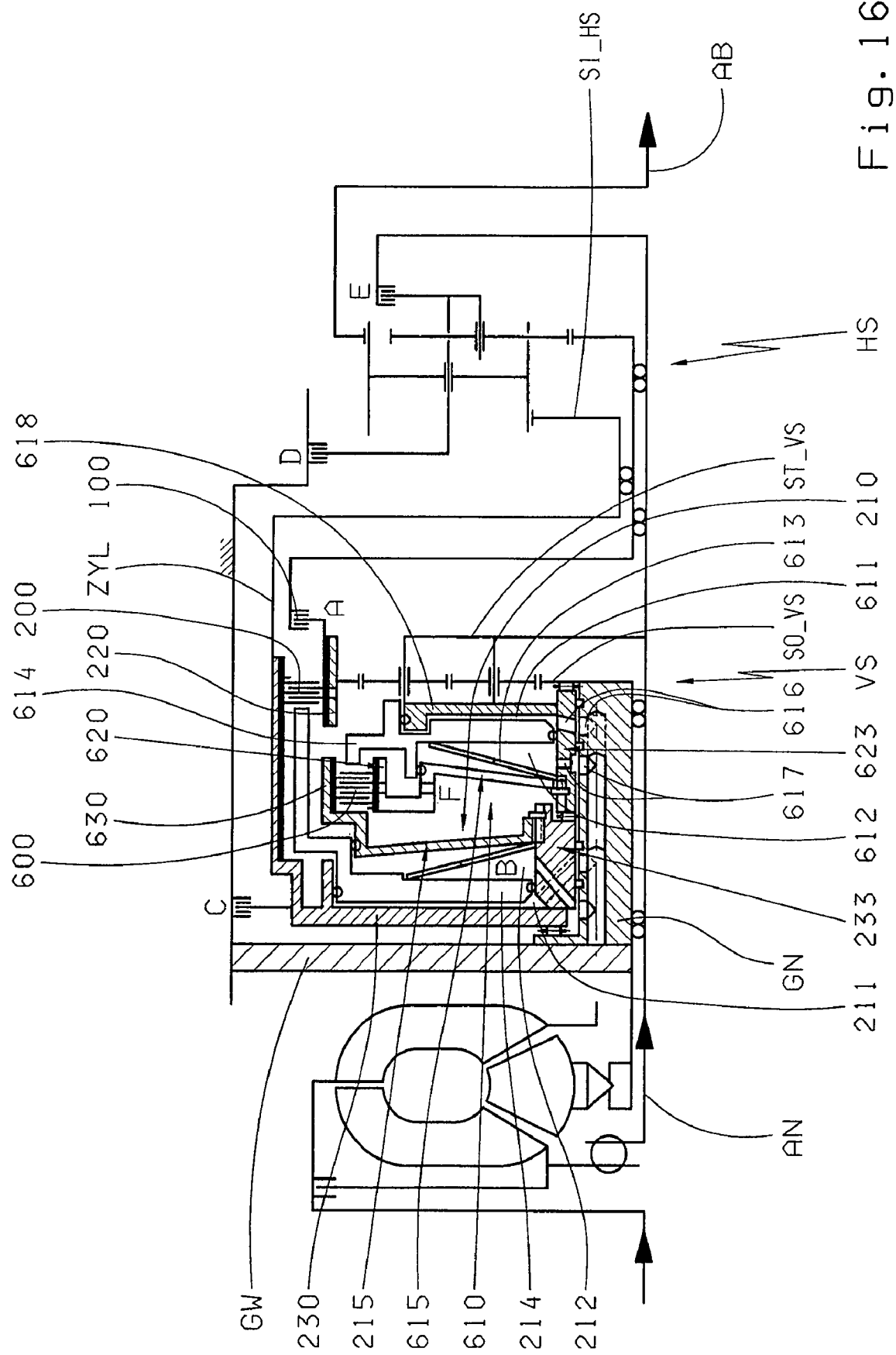
FIG. 16 is an example of a fourteenth transmission layout according to the invention.

Referring to FIG. 16, a fourteenth example transmission layout according to the present invention will now be explained, which is based on the thirteenth transmission layout according to the invention described with reference to FIG. 15. The essential differences from FIG. 15 concern the design of the clutch F and its mechanical connection to the drive input shaft AN and to the first input element of the main gearset HS. Viewed spatially, the three shift elements, B, C, F—as in FIG. 15—are arranged at least mainly in an area axially between the housing wall GW fixed on the transmission housing and the transfer gearset VS, and the disk set 200 of clutch B is arranged, for example, at least partially radially over the transfer gearset VS, with the clutch F axially directly adjacent to the transfer gearset VS.

The input element 220 of clutch B connected to the ring gear HO_VS of the transfer gearset VS and made as an inner disk carrier, is the same as in FIG. 15, as also is the output element 230 of clutch B connected by way of the cylindrical connecting element ZYL to the sun gear S1_HS of the main gearset HS near the transfer gearset VS and made as an outer disk carrier. In essence, the servomechanism 210 of clutch B arranged inside the outer disk carrier 230 is also the same as in FIGS. 14 and/or 15, except in that the formation of the pressure equalization chamber 212 of the servomechanism 210 arranged on the side of the piston 214 of the servomechanism 210 close to the transfer gearset is differently designed. In contrast to FIGS. 14 and/or 15, this pressure equalization chamber 212 is now formed by the piston 214 and a section of the outer disk carrier of clutch F indexed 215 in accordance with its function, as will be explained in more detail later. As in FIGS. 14 and/or 15, the servomechanism 210 of clutch B always rotates at the speed of the first input element of the main gearset HS, i.e., here always at the speed of the sun gear S1_HS of the main gearset HS close to the transfer gearset VS.

As in FIG. 15, the disk set 600 of clutch F is arranged spatially in an area approximately in the middle between the housing wall GW and the transfer gearset VS, so that the servomechanism 610 of clutch F associated with this disk set 600 always rotates at the speed of the drive input shaft AN and actuates the disk set 600 axially toward the housing wall GW when clutch F is engaged. In contrast to FIG. 15, the input element 620 of clutch F connected with the drive input shaft AN by way of the coupled carrier ST_VS of the transfer gearset VS is now made as an inner disk carrier to hold internally toothed disks of the disk set 600 of clutch F. This inner disk carrier 620, spatially arranged essentially radially under the disk set 600, is at the same time formed as the diaphragm plate 615 of a dynamic pressure compensation system of the servomechanism 610 of clutch F. In its hub area the inner disk carrier 620 or diaphragm plate 615 is connected rotationally fixed to a hub 623, in this case for example with positive locking by way of a carrier profile at the end of the hub 623 on the housing wall side. A locking ring is provided to fix the inner disk carrier 620 and diaphragm plate 615 axially on the hub 623. In turn, this hub 623 is spatially arranged axially between the hub 233 of the output element or outer disk carrier 230 of the clutch B and the transfer gearset VS, and is mounted to rotate on the hub GN fixed on the transmission housing, on which the hub 233 is also mounted to rotate and on which the sun gear SO_VS of the transfer gearset VS is fixed. Axially between the hub 233 and the hub 623 and axially between the hub 623 and the sun gear SO_VS, in each case an axial bearing is provided. At the end of the hub 623 near the transfer gearset a support disk 618 is connected rotationally fixed to the hub 623, in this case for example by welding. Of course, the support disk 618 and the hub 623 can also be made as one piece. The support disk 618 extends axially directly next to the transfer gearset VS, radially outward as far as the outer diameter of the carrier ST_VS, and is connected rotationally fixed to the latter. Thus, the support disk 618 can also be a carrier plate of the coupled carrier ST_VS of the transfer gearset VS facing away from the main gearset HS.

A piston 614 associated with the servomechanism 610 of clutch F is arranged spatially largely on the side of the support disk 618 facing away from the transfer gearset VS, mounted to move axially on the hub 623 and the support disk 618, and sealed against pressure medium on the hub 623 and the support disk 618. A pressure chamber 611 of the servomechanism 610 is formed by this piston 614 and a casing surface of the support disk 618, and a small axial section of the outside diameter of the hub 623. The pressure medium supply 616 to the pressure chamber 611 passes partly within the hub 623 and partly within the hub GN fixed on the transmission housing. To offset the dynamic pressure of the pressure chamber 611 which always rotates at the speed of the drive input shaft AN, the servomechanism 610 comprises a pressure equalization chamber 612 that can be filled with unpressurized lubricant, which is arranged on the side of the piston 614 opposite the pressure chamber 611 and is formed by the piston 614 and the diaphragm plate 615. For this, the piston 614 is fixed on the diaphragm plate 215, which is as already said fixed on the hub 623 and at the same time formed as a torque-transmitting inner disk carrier 620 of the clutch F, sealed against lubricant and axially movable. The lubricant supply 617 to the pressure equalization chamber 612 passes partly within the hub 623 and partly within the hub GN fixed on the transmission housing. To restore the piston 614, a restoring element 613 made for example as a length-saving cup spring is provided, which is held axially between the piston 614 and the diaphragm plate 615.

Correspondingly, the output element 630 of clutch F is now made as an outer disk carrier to hold externally toothed disks of the disk set 600 of clutch F. Geometrically, this outer disk carrier 630 is made as a cylindrical pot open in the direction of the transfer gearset VS, with a largely cylindrical-ring-shaped casing on whose inside diameter a carrier profile is provided to hold the outer disks of the disk set 600, and with a disk-shaped pot bottom which extends radially inward on the side of the disk set 600 away from the transfer gearset, starting from the largely cylindrical-ring-shaped casing parallel to the pressure chamber 211 of the servomechanism 210 of clutch B, and is connected in its hub area rotationally fixed to the hub 233 of the output element or outer disk carrier 230 of clutch B, in this case for example by a carrier profile at the end of this hub 233 on the side of the transfer gearset. A locking ring is provided to fix the outer disk carrier 630 axially on the hub 233. As a special design feature, the outer disk carrier 630 of clutch F at the same time has the function of a diaphragm plate to form the pressure equalization chamber 212 of the servomechanism 210 arranged on the side of the piston 214 of the servomechanism 210 close to the transfer gearset. The corresponding section of the outer disk carrier 630, sealed against lubricant and axially movable relative to the piston 214, is indexed 215.

The spatial arrangement and design of the other transmission structural elements of this fourteenth transmission layout according to the invention shown in FIG. 16 corresponds to those shown in FIG. 15 and essentially in FIG. 14, and need not therefore be described again here.

Figure 17:
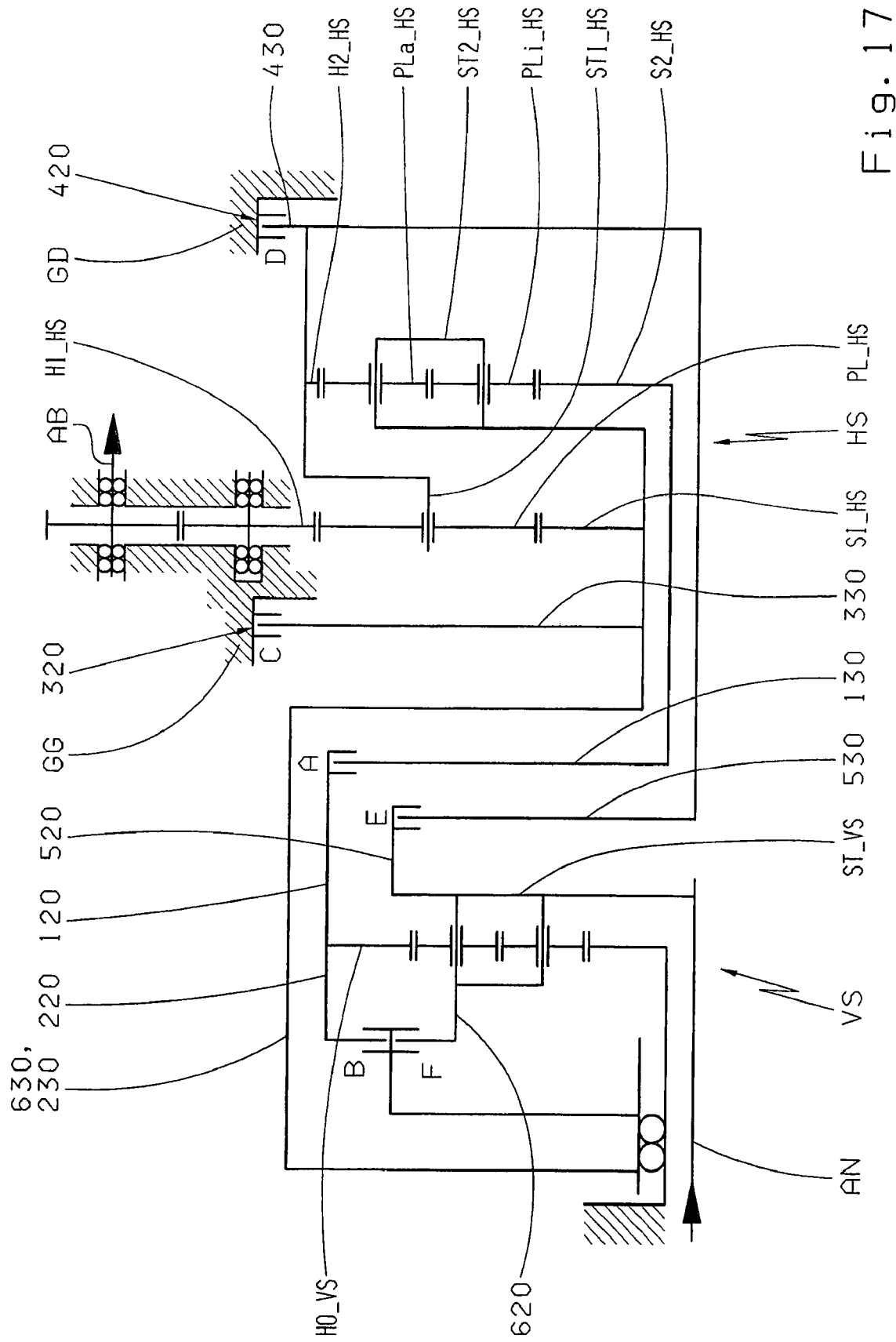
FIG. 17 is an example of a fifteenth transmission layout according to the invention, based on the transmission layout of FIG. 2, with a first alternative main gearset.

Referring to FIG. 17, a fifteenth example of a transmission layout according to the invention will now be described, which is based on the transmission layout shown in FIG. 2, but with a first alternative main gearset. As before, the main gearset HS is made as a two-carrier, four-shaft planetary transmission with three input elements and one output element, but in this case it comprises two simple planetary gearsets coupled to one another, the first made as a single planetary structure and the second as a double planetary structure. The first, single planetary structure of the main gearset HS faces toward the transfer gearset VS and comprises a sun gear S1_HS, an ring gear H1_HS, and a carrier ST1_HS with planetary gears PL_HS mounted to rotate on it. The planetary gears PL_HS mesh with the sun gear S1_HS and the ring gear H1_HS. The second single planetary gearset of the main gearset HS is arranged on the side of the first single planetary gearset of the main gearset HS facing away from the transfer gearset VS and comprises a sun gear S2_HS, an ring gear H2_HS, and a coupled carrier ST2_HS with inner and outer planetary gears PLi_HS, PLa_HS mounted to rotate on it. The inner planetary gears PLi_HS mesh with the sun gear S2_HS and the outer planetary gears PLa_HS, and the outer planetary gears PLa_HS mesh with the inner planetary gears PLi_HS and the ring gear H2_HS.

The sun gear S1_HS and the coupled carrier ST2_HS are connected with one another and form the first input element of the main gearset HS, which is in turn connected to the output elements 230, 630 of the two clutches B, F and the output element 330 of the brake C. As in FIG. 2, the output element 230 of clutch B and the output element 630 of clutch F are made as an integral component, the input element 220 of clutch B is connected with the ring gear HO_VS of the transfer gearset VS, the input element 620 of clutch F is connected with the drive input shaft AN via the coupled carrier ST_VS of the transfer gearset VS, and the input element 320 of brake C is connected to the transmission housing GG. The sun gear S2_HS remote from the transfer gearset constitutes the second input element of the main gearset HS, which is in turn connected with the output element 130 of clutch A. As in FIG. 2, the input element 120 of clutch A is connected with the ring gear HO_VS of the transfer gearset VS. The carrier ST1_HS and the ring gear H2_HS are connected with one another and form the third input element of the main gearset HS, which is in turn connected with the output element 530 of clutch E and the output element 430 of brake D. As in FIG. 2, the input element 520 of clutch E is connected with the drive input shaft AN and the input element 420 of brake D is connected with the transmission housing GG (in this case via a housing cover GD fixed on the transmission housing). The ring gear H1_HS closer to the transfer gearset forms the output element of the main gearset HS, which is in turn connected with the drive output shaft AB. The shift logic of this fifteenth transmission layout according to the invention shown in FIG. 17 corresponds to the shift logic of the relevant transmission type illustrated in FIG. 1B.

As regards the spatial arrangement of the individual transmission components, the example embodiment shown in FIG. 17 is essentially based on the arrangement shown in FIG. 2, but in contrast to FIG. 2 the axis of the drive output shaft AB is now for example parallel to the axis of the drive input shaft AN and the brake D is arranged on the side of the main gearset HS facing away from the transfer gearset VS. As already mentioned several times, in all the transmission layouts and component arrangements according to the invention illustrated so far, it is possible without particularly great design effort to modify the coaxial arrangement of the drive input and drive output shafts in such manner that the axis of the drive input and the axis of the drive output shafts are parallel or at an angle to one another. FIG. 17 now shows a corresponding example embodiment with a sun gear arranged kinematically between the ring gear H1_HS of the main gearset HS and the drive output shaft AB, whereas a differential usually provided between the output side of the sun gear and the drive output shaft AB is not shown in this case for the sake of simplicity.

Figure 18:
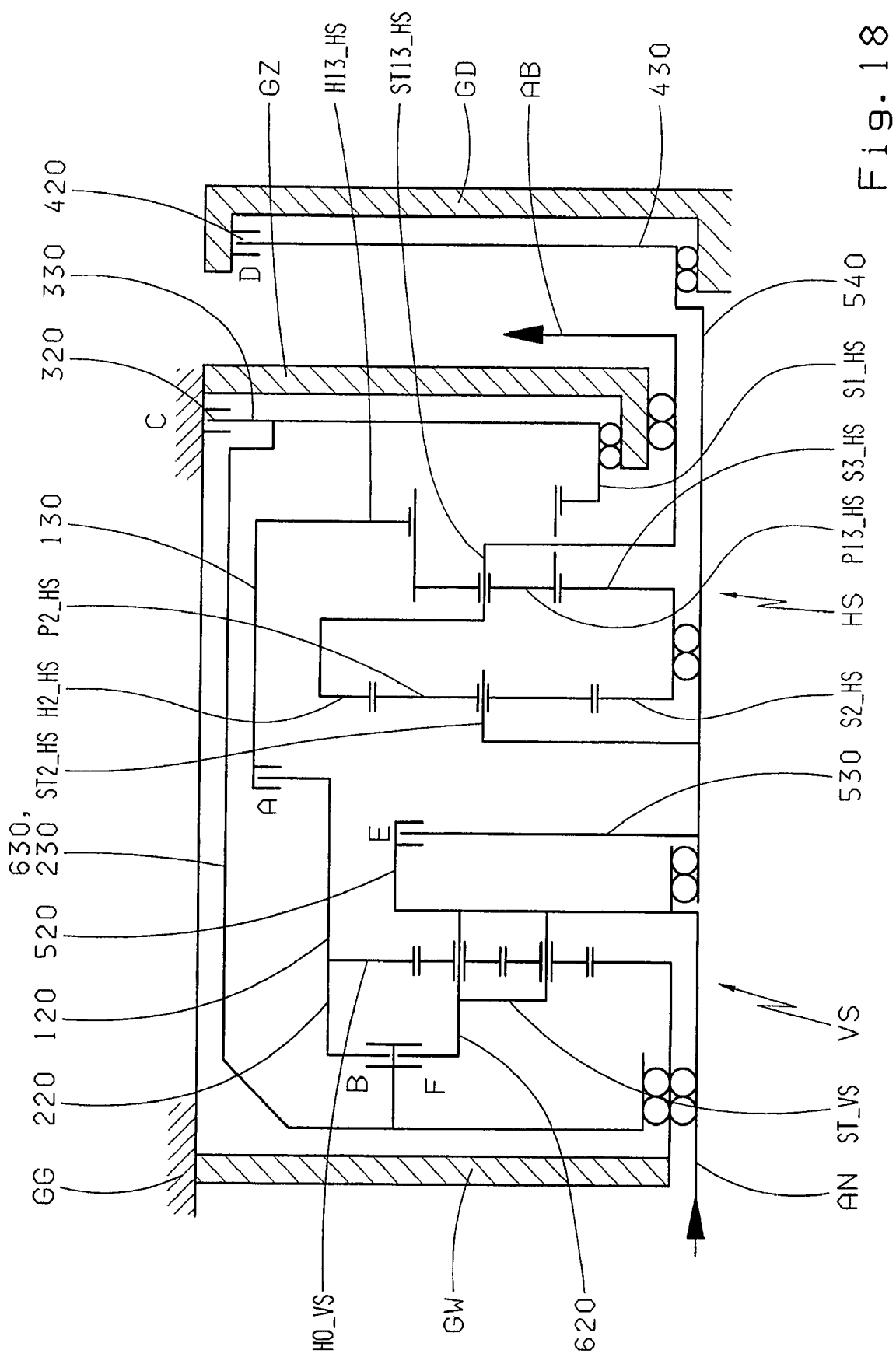
FIG. 18 is an example of a sixteenth transmission layout according to the invention, based on the transmission layout of FIG. 2, with a second alternative main gearset.

Referring to FIG. 18, a sixteenth example transmission layout according to the present invention will now be explained, again based on the transmission layout shown in FIG. 2, but with a second alternative main gearset. The "new" main gearset HS is now made as a "three-carrier, five-shaft planetary transmission reduced to a two-carrier unit", with three individual planetary gearsets, two of these combined in a single-carrier unit. This single-carrier unit of the main gearset HS assembled from two individual planetary gearsets comprises two separate sun gears S1_HS, S3_HS, only one ring gear H13_HS and one coupled carrier ST13_HS with planetary gears P13_HS mounted to rotate on it, and can also be interpreted as a "planetary gearset with a divided sun gear". The remaining, other individual planetary gearset of the main gearset HS comprises a sun gear S2_HS, an ring gear H2_HS and a carrier ST2_HS, with short planetary gears P2_HS mounted to rotate on it, and is arranged close to the transfer gearset. As in FIG. 2, the "new" main gearset HS has three input elements not connected to one another and one output element. The shift logic of this sixteenth transmission layout according to the invention shown in FIG. 18 corresponds to the shift logic of the relevant transmission type illustrated in FIG. 1B.

The sun gear S3_HS is arranged axially between the sun gear S2_HS close to the transfer gearset and the sun gear S1_HS arranged on the side of the main gearset HS opposite to the transfer gearset VS, and is on the one hand fixed with the sun gear S2_HS and on the other hand in active connection with the sun gear S1_HS via the long planetary gears P13_HS. The two sun gears S1_HS, S2_HS can for example also be made in one piece. The sun gear S1_HS remote from the transfer gearset forms the first input element of the main gearset HS, which is in turn connected with the output elements 230, 630 of the two clutches B, F and the output element 330 of brake C. As in FIG. 2, the output element 230 of clutch B and the output element 630 of clutch F are integral with each other, the input element 220 of clutch B is connected with the ring gear HO_VS of the transfer gearset VS, the input element 620 of clutch F is connected with the drive input shaft AN via the coupled carrier ST_VS of the transfer gearset VS, and the input element 320 of brake C is connected with the transmission housing GG (in this case via an intermediate housing wall GZ connected to the transmission housing). The ring gear H13_HS remote from the transfer gearset forms the second input element of the main gearset HS, which is in turn connected with the output element 130 of clutch A. As in FIG. 2, the input element 120 of clutch A is connected with the ring gear HO_VS of the transfer gearset VS. The carrier ST2_HS close to the transfer gearset forms the third input element of the main gearset HS, which is, in turn, connected with the output element 530 of clutch E and the output element 430 of brake D. As in FIG. 2, the input element 520 of clutch E is connected with the drive input shaft AN and the input element 420 of brake D is connected with the transmission housing GG (in this case via a housing cover GD connected to the transmission housing). The ring gear H2_HS close to the transfer gearset and the carrier ST13_HS remote from the transfer gearset are in fixed connection with one another and form the output element of the main gearset HS, which is in turn connected with the drive output shaft AB.

The spatial arrangement of the transfer gearset VS and the four clutches A, B, E and F relative to the main gearset HS and relative to one another, shown in FIG. 18, correspond, in principle, to the example arrangement shown in FIGS. 2 and 17. The particular design of the main gearset HS with a "divided sun gear" now enables the two brakes C and D to be arranged on the side facing away from the transfer gearset VS. The brake C is closer to the main gearset HS than is the brake D, and the brake D is arranged in the area of an outer wall of the transmission—in this case in the area of the housing cover GD. The brake C is arranged close to the main gearset HS and on its side facing away from the main gearset HS is axially adjacent to the intermediate housing wall GZ, which is in turn arranged axially between the main gearset HS and the housing cover GD, such that the sun gear S1_HS of the main gearset HS is mounted to rotate on the intermediate housing wall GZ. For the kinematic connection of the carrier ST13_HS of the main gearset HS coupled with the ring gear H2_HS to the drive output shaft AB, a carrier plate of the carrier ST13_HS facing away from the transfer gearset VS engages in the radial direction axially between the two sun gears S3_HS, S1_HS. A hub of this carrier plate connected to the drive output shaft AB or a hub section of the drive output shaft AB, connected with the carrier plate, passes centrally in the axial direction through the sun gear S1_HS of the main gearset HS remote from the transfer gearset, and through the intermediate housing wall GZ, and is mounted to rotate on the intermediate housing wall. For the kinematic connection of the output element 430 of brake D to the output element 530 of clutch E and to a carrier plate of the carrier ST2_HS of the main gearset HS close to the transfer gearset, a carrier shaft 540 is provided, which passes centrally completely through the main gearset HS. Thus, the drive output shaft AB or a sun gear (not shown) kinematically interposed between the output element of the main gearset HS and the drive output shaft, engages spatially in the radial direction, axially between the intermediate housing wall GZ and the output element 430 of brake D.

Figure 19:
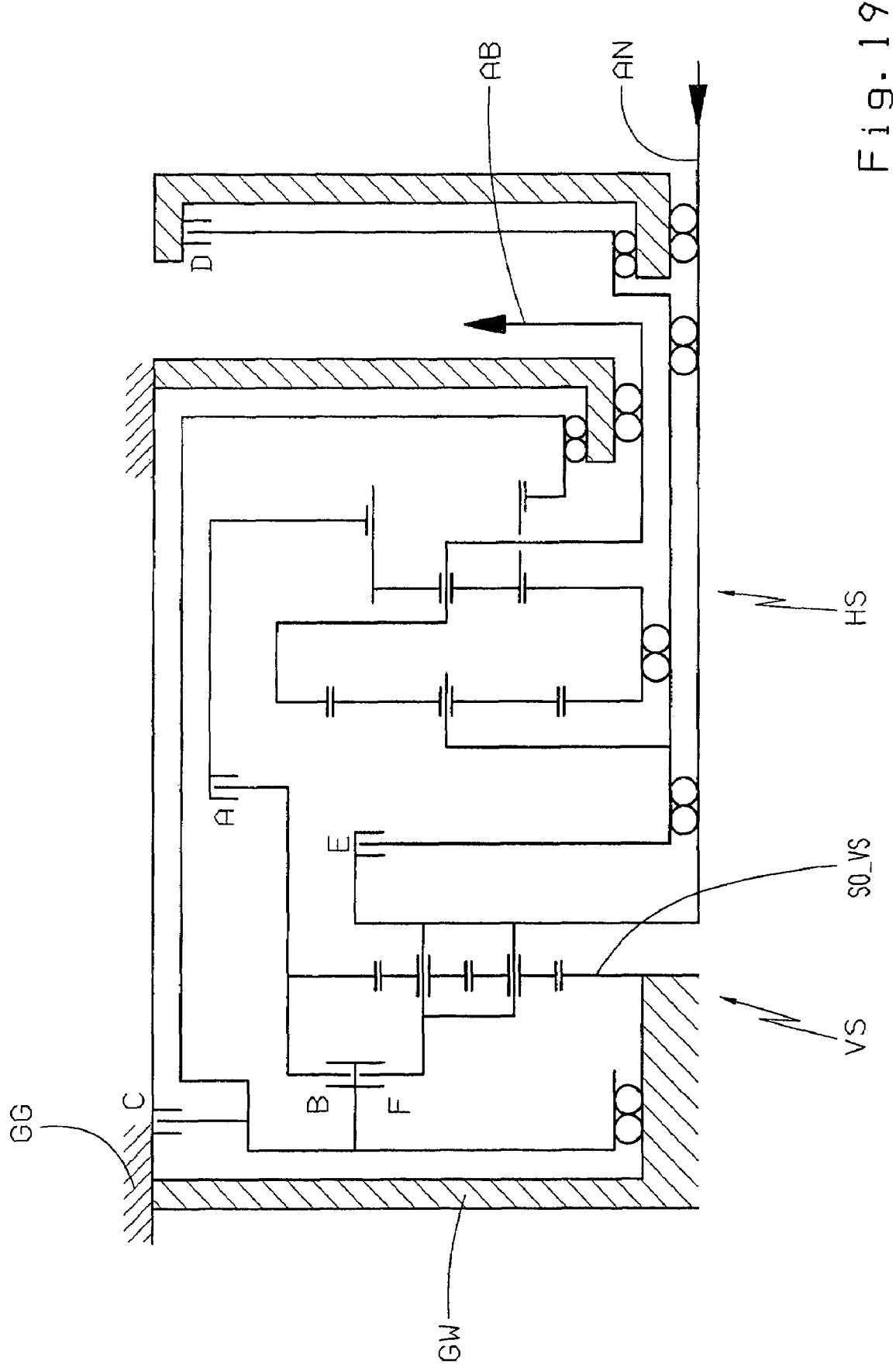
FIG. 19 is an example of a seventeenth transmission layout according to the invention, based on the transmission layout of FIG. 18.

For a person with knowledge of the field, it is easy to see from FIG. 18 that no particular modifications would be required in order to change the spatial position of the drive engine of the transmission (not shown) actively connected with the drive input shaft AN relative to the planetary gearsets VS, HS. This is made more clear by FIG. 19 which shows a seventeenth example transmission layout according to the present invention. In contrast to FIG. 18, the drive engine actively connected with the drive input shaft AN is now arranged on the side of the main gearset HS opposite to the transfer gearset VS. Correspondingly, the brake D and the drive output of the transmission referred to as a sun gear or the drive output shaft AB of the transmission are also now arranged close to the drive engine.

A further detailed difference from FIG. 18 concerns the spatial position of the brake C. As can be seen from FIG. 19, this brake C is now for example arranged on the side of the transfer gearset VS facing away from the main gearset HS, close to the clutch B in the area of the housing wall GW fixed to the transmission housing or the housing cover fixed to the transmission housing, on which the sun gear SO_VS of the transfer gearset VS is also fixed. Of course, such a spatial position of the brake C can also be combined with the component arrangement shown in FIG. 18.

Figure 20:
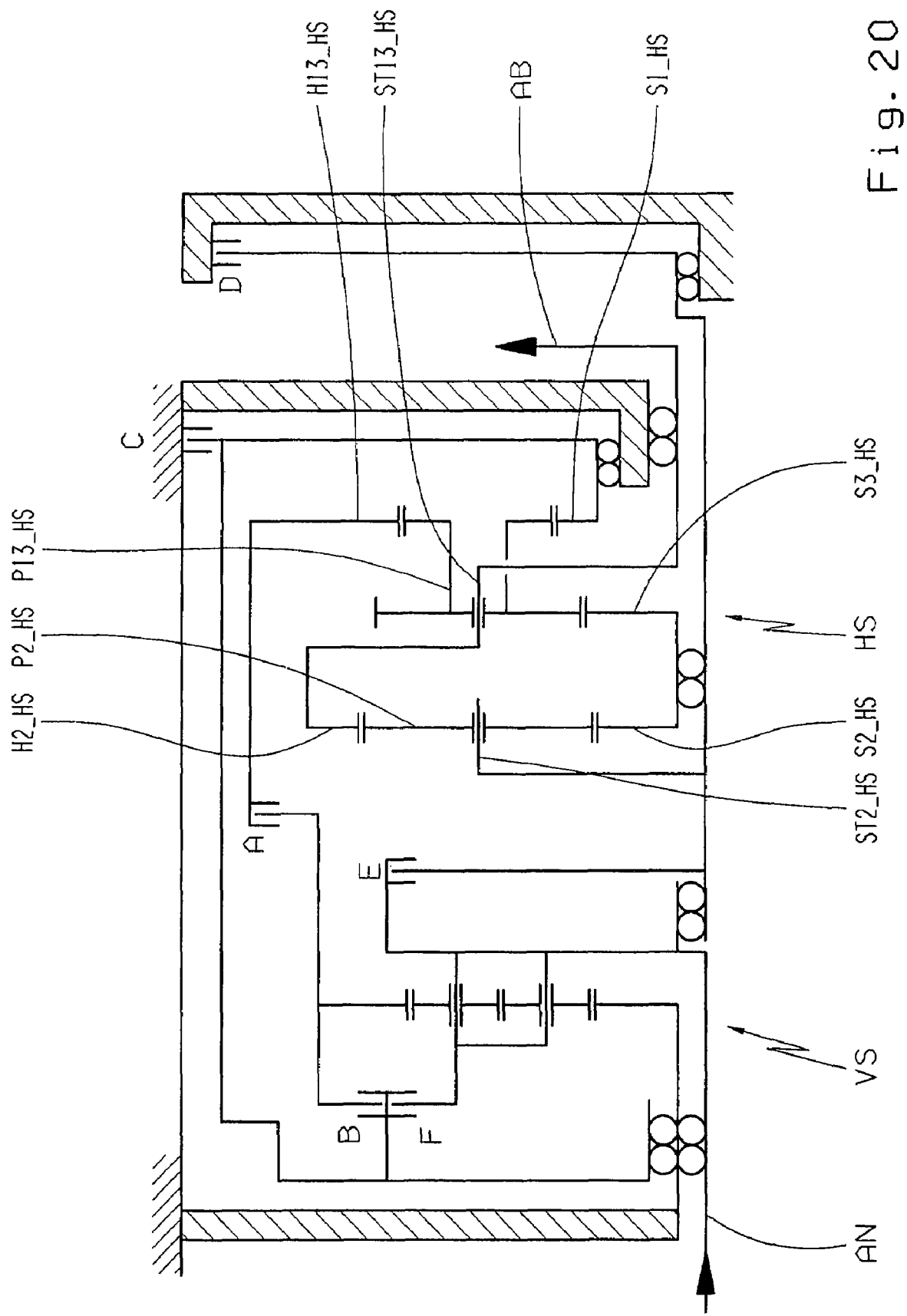
FIG. 20 is an example of an eighteenth transmission layout according to the invention, based on the transmission layout of FIG. 18, with a third alternative main gearset.

As already explained in the context of the description of FIG. 18, the division of a central gear (i.e., a sun or ring gear) of a single planetary gearset into two separate central gears not only provides an additional degree of freedom in relation to component coupling to this originally undivided central gear, but also an additional degree of freedom in relation to the gear shifts of the transmission. This will now be explained in more detail with reference to an eighteenth example embodiment of a transmission layout according to the present invention, which is illustrated in FIG. 20. The eighteenth embodiment is based on the transmission layout described above in FIG. 18, but with a main gearset HS of alternative design.

As can be seen in FIG. 20, in this eighteenth example embodiment both the spatial arrangement of components and the kinematic coupling of the planetary gearset VS and HS, the six shift elements A to F, and the drive input and drive output shafts AN, AB are entirely the same as in the sixteenth example embodiment described earlier in detail with reference to FIG. 18. As in FIG. 18, the "new" main gearset HS is made as a "three-carrier, five-shaft planetary transmission reduced to a two-carrier unit", with three individual planetary gearsets, two of them combined in a single-carrier unit, which comprises separate sun gears (S1_HS, S3_HS), a coupled carrier (ST13_HS) and only one ring gear (H13_HS). In contrast to FIG. 18, the planetary gears P13_HS of the main gearset HS mounted to rotate on the coupled carrier ST13_HS are now made as stepped planetaries with different numbers of teeth for the two sun gears S1_HS and S3_HS of the main gearset HS. Correspondingly, the first and third sun gears S1_HS, S3_HS of the main gearset HS now have different numbers of teeth. For example, the coupled ring gear H13_HS of the main gearset HS meshes with the matching teeth of the long planetary gears P13_HS of the main gearset HS, with which the first sun gear S1_HS of the main gearset HS also meshes. Of course, in a different design it could also be provided that the coupled ring gear (H13_HS) of the main gearset meshes with the matching teeth of the long planetary gears (P13_HS) of the main gearset, with which the third sun gear (S3_HS) of the main gearset also meshes. As in FIG. 18, the "new" main gearset HS thus has three input elements not connected with one another and one output element.

The division of a central gear (i.e., a sun or ring gear) of an individual planetary gearset into two separate central gears offers not only an additional degree of freedom in relation to component coupling to the originally undivided central gear, but also an additional degree of freedom in relation to the speed diagram layout of the transmission. This will now be explained in more detail with reference to a nineteenth example embodiment of a transmission layout according to the present invention, illustrated in FIG. 21. This nineteenth example embodiment is again based on the transmission layout described with reference to FIG. 18, but with another alternative design of the main gearset HS. In principle, it is possible with no problems to divide all the central gears (sun gears, ring gears) of the multi-component main gearset HS, from the component standpoint, into two or more components, as in the example shown in FIGS. 18, 19 and 20, while keeping the number of main gearset carriers at two, so that these divided central gears are in each case kinematically in active connection with one another via the planetary gears associated with them. Of course, the planetary gears corresponding to this divided central gear can be made as un-stepped or stepped planetary gears. In the example embodiment shown in FIG. 21A, by virtue of a division of the central gear, which was previously connected to the output elements 230, 330 and 630 of the three shift elements B, C, and F, two of the three previously coincident lines relating to these three shift elements in the shift scheme of the transmission are separated from one another, as will be explained in more detail later with reference to a shift scheme illustrated in FIG. 21B.

Figure 21A:
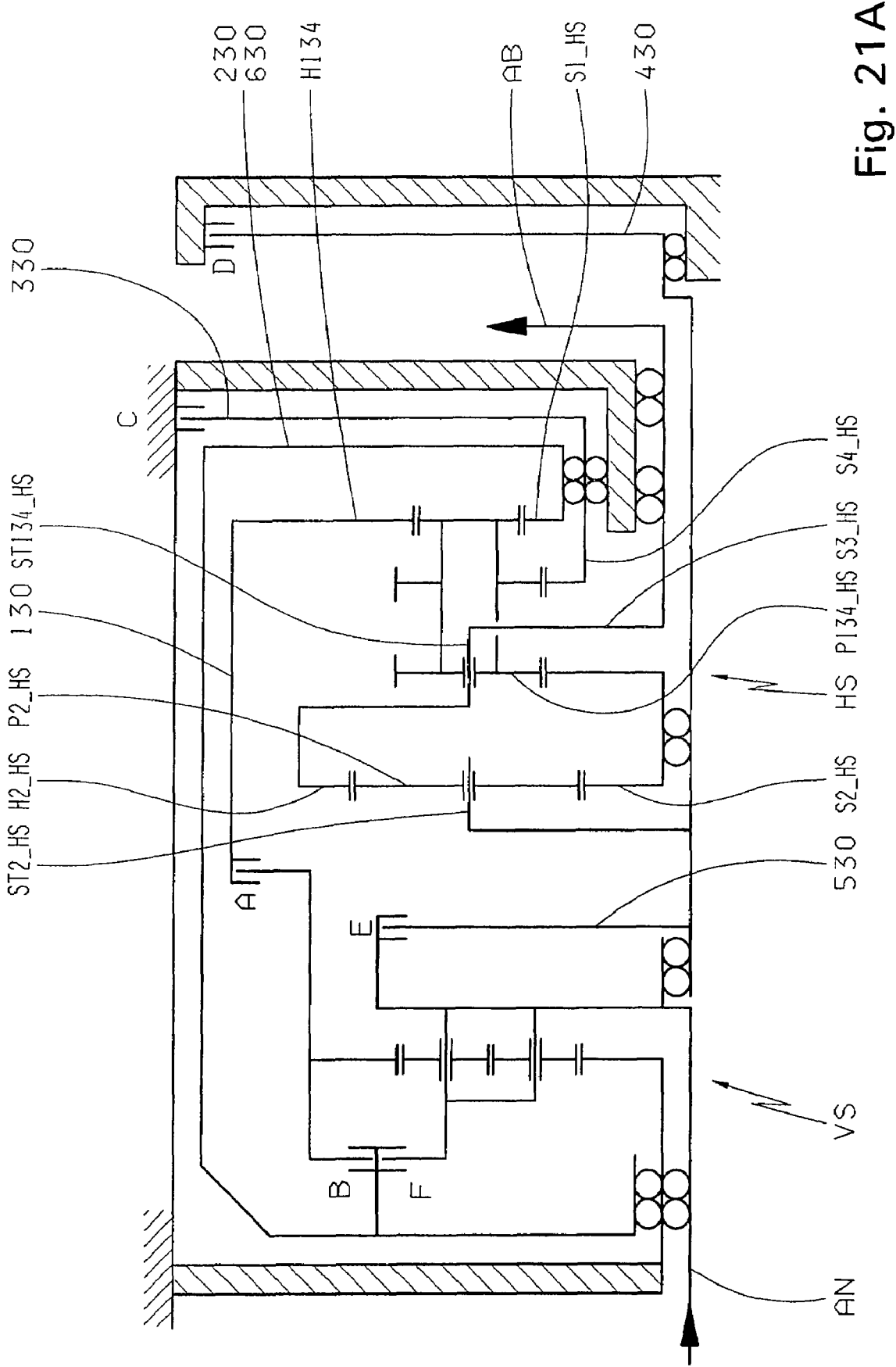
FIG. 21A is an example of a nineteenth transmission layout according to the invention, based on the transmission layout of FIG. 18, with a fourth alternative main gearset.
Figure 21B:
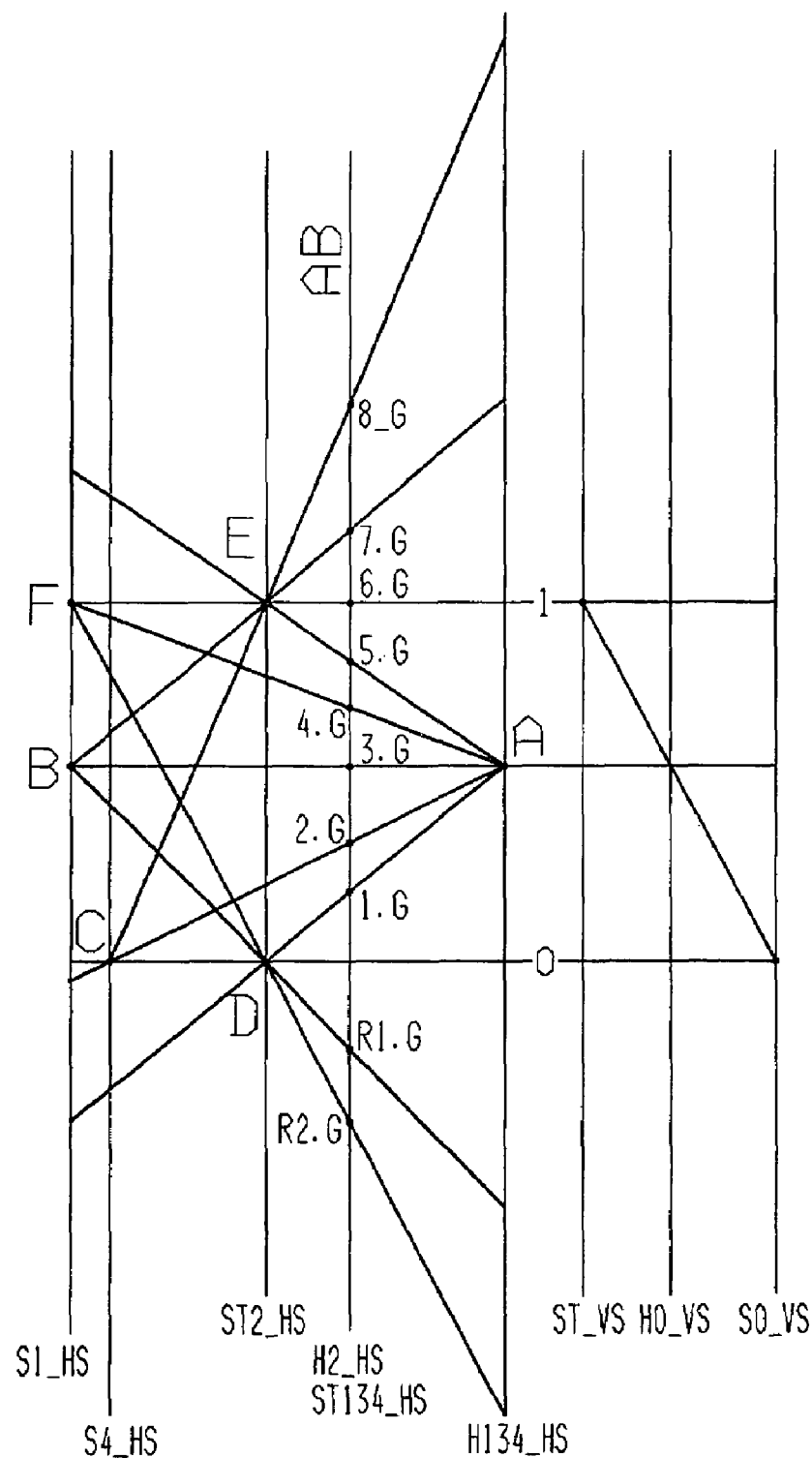
FIG. 21B is a speed diagram for the transmission of FIG. 21A.

As can be seen in FIG. 21, the main gearset HS is now made as a "four-carrier planetary gearset reduced to a two-carrier unit", comprising four coupled individual planetary gearsets with a total of four non-coupled input elements and one output element. The main gearset HS comprises four sun gears S4_HS, S2_HS, S3_HS, S4_HS, one simple ring gear H2_HS, one coupled ring gear H134_HS, a simple carrier ST2_HS with short planetary gears P2_HS mounted to rotate on it, and a coupled carrier ST134_HS with long planetary gears P134_HS mounted to rotate on it. The two sun gears S3_HS, S4_HS are spatially arranged axially next to one another between the other two sun gears S2_HS and S1_HS, with the sun gear S3_HS adjacent to the sun gear S2_HS closer to the transfer gearset and the sun gear S4_HS adjacent to the sun gear S1_HS remote from the transfer gearset. The two sun gears S2_HS, S3_HS are coupled with one another. The long planetary gears P134_HS shown in FIG. 21A are for example stepped planetary gears and mesh with the three sun gears, S1_HS, S3_HS and S4_HS. In this case the coupled ring gear H134_HS meshes, for example, with the planetary teeth with which the sun gear S1_HS also meshes. The short planetary gears P2_HS mesh with the simple ring gear H2_HS and the sun gear S2_HS. A carrier plate of the coupled carrier ST134_HS connected to the drive output shaft AB extends radially inward axially between the sun gears S3_HS and S4_HS.

The first sun gear S1_HS of the main gearset HS forms its first input element and is permanently in rotationally fixed connection with the common output elements 230, 630 of the two clutches B and F. The coupled ring gear H134_HS of the main gearset HS forms its second input element and is permanently in rotationally fixed connection with the output element 130 of clutch A. The simple carrier ST2_HS of the main gearset HS forms its third input element and is permanently in rotationally fixed connection both with the output element 530 of clutch E and with the output element 430 of brake D. The sun gear S4_HS forms the fourth input element of the main gearset, and like FIG. 18, is permanently rotationally fixed with the output element 330 of brake C. The simple ring gear H2_HS and the coupled carrier ST134_HS of the main gearset are coupled with one another and form the output element of the main gearset HS permanently connected with the output shaft AB.

In the example shown in FIG. 21A, if the fixed transmission ratio of the first of the four coupled planetary gearsets of the main gearset HS, defined by the ratio between the numbers of teeth on the ring gear H134_HS and the sun gear S1_HS, is higher than the fixed transmission ratio of the fourth of the four coupled gearsets of the main gearset HS, defined by the ratio between the numbers of teeth on the ring gear H134_HS and the sun gear S4_HS and by the ratio between the numbers of teeth on the steps of the stepped planetary gears P134_HS of the main gearset HS, then on the one hand the "new" curve of the fourth input element (S4_HS) of the main gearset in the speed diagram will be close to the curve of the first input element (S1_HS) of the main gearset to the right of it, i.e., closer to the curve of the drive output element (H2_HS or ST134_HS) of the main gearset than is the curve of the first input element (S1_HS) of the main gearset. On the other hand, the curve of the third input element (ST2_HS) of the main gearset in the speed diagram will also be to the right of the curve of the fourth input element (S4_HS) of the main gearset, i.e., closer to the curve of the drive output element (H2_HS or ST134_HS) of the main gearset than is the "new" curve of the fourth input element (S4_HS) of the main gearset. Thus, relative to the input elements of the main gearset, in the speed diagram only the two shift elements B, F and the two shift elements D, E will lie respectively on a common curve, whereas the shift element C will have a curve of its own.

It is expressly understood that the alternative main gearset types described with reference to FIGS. 17 to 21 can be combined without problems with any of the component arrangements described previously in FIGS. 2 to 16.

REFERENCE NUMERALS

A first shift element, clutch
B second shift element, clutch
C third shift element, brake
D fourth shift element, brake
E fifth shift element, clutch
F sixth shift element, clutch
AN drive input shaft
AB drive output shaft
GD housing cover
GG transmission housing
GN hub on the housing wall
GW housing wall
GZ intermediate housing wall
NAN toothed profile for drive input speed determination
ZYL cylindrical connecting element
ZYLB cylindrical connecting element
ZYLF cylindrical connecting element
ZYLAB disk carrier common to the first and second shift elements
ZYLBF disk carrier common to the second and sixth shift elements
ZYLCD disk carrier common to the third and fourth shift elements
VS transfer gearset
HO_VS ring gear of the transfer gearset
SO_VS sun gear of the transfer gearset
ST_VS (coupled) carrier of the transfer gearset
P1_VS inner planetary gear of the transfer gearset
P2_VS outer planetary gear of the transfer gearset
HS main gearset
HO_HS (single) ring gear of the main gearset
H1_HS first ring gear of the main gearset
H13_HS coupled (first) ring gear of the main gearset
H134_HS coupled (first) ring gear of the main gearset
H2_HS second ring gear of the main gearset
S1_HS first sun gear of the main gearset
S2_HS second sun gear of the main gearset
S3_HS third sun gear of the main gearset
S4_HS fourth sun gear of the main gearset
ST_HS coupled (single) carrier of the main gearset
ST1_HS first carrier of the main gearset
ST13_HS coupled (first) carrier of the main gearset
ST134_HS coupled (first) carrier of the main gearset
ST2_HS second carrier of the main gearset
P1_HS long planetary gear of the main gearset
P13_HS coupled long planetary gear of the main gearset
P2_HS short planetary gear of the main gearset
PL_HS first planetary gear of the main gearset
PLa_HS outer planetary gear of the main gearset
PLi_HS inner planetary gear of the main gearset
100 disks of the first shift element
110 servomechanism of the first shift element
111 pressure chamber of the servomechanism of the first shift element
112 pressure equalization chamber of the servomechanism of the first shift element
113 restoring element of the servomechanism of the first shift element
114 piston of the servomechanism of the first shift element
115 diaphragm plate of the servomechanism of the first shift element
120 input element of the first shift element
123 hub of the input element of the first (and second) shift element
130 output element of the first shift element
140 second sun shaft
150 carrier disk
200 disks of the second shift element
210 servomechanism of the second shift element
211 pressure chamber of the servomechanism of the second shift element
212 pressure equalization chamber of the servomechanism of the second shift element
213 restoring element of the servomechanism of the second shift element
214 piston of the servomechanism of the second shift element
215 diaphragm plate of the servomechanism of the second shift element
216 pressure medium supply to the pressure chamber of the servomechanism of the second shift element
217 lubricant supply to the pressure equalization chamber of the servomechanism of the second shift element
218 support disk of the servomechanism of the second shift element
219 hub of the servomechanism of the second shift element
220 input element of the second shift element
223 hub of the input element of the second shift element
230 output element of the second shift element
233 hub of the output element of the second shift element
240 first sun shaft
250 carrier plate
300 disks of the third shift element
310 servomechanism of the third shift element
311 pressure chamber of the servomechanism of the third shift element
313 restoring element of the servomechanism of the third shift element
314 piston of the servomechanism of the third shift element
320 input element of the third shift element
330 output element of the third shift element
400 disks of the fourth shift element
410 servomechanism of the fourth shift element
411 pressure chambers of the servomechanism of the fourth shift element
413 restoring element of the servomechanism of the fourth shift element
414 piston of the servomechanism of the fourth shift element
420 input element of the fourth shift element
430 output element of the fourth shift element
500 disks of the fifth shift element
510 servomechanism of the fifth shift element
511 pressure chamber of the servomechanism of the fifth shift element
512 pressure equalization chamber of the servomechanism of the fifth shift element
513 restoring element of the servomechanism of the fifth shift element
514 piston of the servomechanism of the fifth shift element
545 diaphragm plate of the servomechanism of the fifth shift element
520 input element of the fifth shift element
530 output element of the fifth shift element
540 carrier shaft
600 disks of the sixth shift element
610 servomechanism of the sixth shift element
611 pressure chamber of the servomechanism of the sixth shift element
612 pressure equalization chamber of the servomechanism of the sixth shift element 613 restoring element of the servomechanism of the sixth shift element
614 piston of the servomechanism of the sixth shift element
615 diaphragm plate of the servomechanism of the sixth shift element
616 pressure medium supply to the pressure chamber of the servomechanism of the sixth shift element
617 lubricant supply to the pressure equalization chamber of the servomechanism of the sixth shift element
618 support disk of the servomechanism of the sixth shift element
620 input element of the sixth shift element
622 disc-shaped section of the input element of the sixth shift element
623 hub of the input element of the sixth shift element
630 output element of the sixth shift element
633 hub of the output element of the sixth shift element

The invention claimed is:

1. A multi-stage automatic transmission comprising:
a drive input shaft (AN);
a drive output shaft (AB);
a transfer gearset (VS);
a main gearset (HS); and
at least first, second, third, fourth, fifth and sixth shift elements (A, B, C, D, E, F);
the transfer gearset (VS) being a double planetary gearset;
an output element of the transfer gearset (VS) rotates at a rotational speed lower than a rotational input speed of the drive input shaft (AN);
an input element of the transfer gearset (VS) being integral with the drive input shaft (AN);
another element of the transfer gearset (VS) being coupled to a housing (GG) of the transmission;
the main gearset (HS) being a coupled planetary gearset with a plurality of input elements and one output element, each of the plurality of input elements being uncoupled from a remainder of the plurality of input elements;
the output element of the main gearset (HS) being integral with the drive output shaft (AB);
an input element (120) of the first shift element (A) being coupled to the output element of the transfer gearset (VS);
an output element (130) of the first shift element (A) being coupled to a second input element of the main gearset (HS);
an input element (220) of the second shift element (B) being coupled to the output element of the transfer gearset (VS);
an output element (230) of the second shift element (B) being coupled to a first Input element of the main gearset (HS);
an input element of the third shift element (C) being coupled to the transmission housing (GG);
an output element (330) of the third shift element (C) being coupled to one of the first input element of the main gearset (HS) and another input element of the main gearset (HS) similar the first input element of the main gearset (HS) in a speed diagram;
an input element of the fourth shift element (D) being coupled to the transmission housing (GG);
an output element (430) of the fourth shift element (D) being coupled to a third input element of the main gearset (HS);
an input element (520) of the fifth shift element (E) being coupled to the drive input shaft (AN);
an output element (530) of the fifth shift element (E) being coupled to the third input element of the main gearset (HS);
an input (620) of the sixth shift element (F) being coupled to the drive input shaft (AN);
an output element (630) of the sixth shift element (F) being coupled to one of the first input element of the main gearset (HS) and a further input element of the main gearset (HS) similar the first input element of the main gearset (HS) in a speed diagram;
a structural group, comprising the second and the sixth shift elements (B, F), being substantially located on a side of the transfer gearset (VS) opposite the main gearset (HS), and a first side of the main gearset further comprising;
a disk carrier of the second shift element (B) supporting a disk set (200) of the second shift element (B);
a servomechanism (210) of the second shift element (B) communicating with and controlling the disk set (200) of the second shift element (B);
a disk set (600) of the sixth shift element (F);
a disk carrier of the sixth shift element (F) supporting the disk set (600) of the sixth shift element (F); and
a servomechanism (610) of the sixth shift element (F) communicating with and controlling the disk set (600) of the sixth shift element (F).

2. A multi-stage automatic transmission comprising:
a drive input shaft (AN);
a drive output shaft (AB);
first, second, third, fourth, fifth and sixth shift elements (A, B, C, D, E, F);
a transfer gearset (VS); and
a main gearset (HS);
the transfer gearset (VS) being a planetary gearset and the main gearset (HS) being a coupled planetary gearset with a plurality of input elements and one output element, and each of the plurality of input elements being uncoupled from a remainder of the plurality of input elements;
an input element of the transfer gearset (VS) is integral with the drive input shaft (AN);
another input element of the transfer gearset (VS) rotates at a rotational weed lower than a rotational input weed of the drive input shaft (AN) and an output element of the transfer gearset (VS) being integral with an input element (120) of the first shift element (A) and an input element (220) of the second shift element (B);
a first input element of the main gearset (HS) being integral with an output element (230) of the second shift element (B), an output element (330) of the third shift element (C) and an output element (630) of the sixth shift element (F);
a second input element of the main gearset (HS) being integral with an output element (130) of the first shift element (A);
a third input element of the main gearset (HS) being integral with an output element (430) of the fourth shift element (D) and an output element (530) of the fifth shift element (E);
an output element of the main gearset (HS) being integral with the drive output shaft (AB);
an input element of the third shift element (C) and an input element of the fourth shift element (D) are each fixed to a housing (GG) of the transmission;
an input element (520) of the fifth shift element (E) and an input element (620) of the sixth shift element (F) are each coupled to the drive input shaft (AN);

a structural group, comprising the second and the sixth shift elements (B, F), being substantially located on a side of the transfer gearset (VS) opposite the main gearset (HS);

a side of the transfer gearset (VS), opposite the main gearset (HS), further comprising:

a disk carrier of the second shift element (B) supporting a disk set (200) of the second shift element (B);

a servomechanism (210) of the second shift element (B) controlling the disk set (200) of the second shift element (B);

a disk set (600) of the sixth shift element (F);

a disk carrier of the sixth shift element (F) supporting the disk set (600) of the sixth shift element (F); and a servomechanism (610) of the sixth element (F) controlling the disk set (600) of the sixth shift element (F).

3. The multi-stage automatic transmission according to claim 2, wherein the structural group is axially located between the transfer gearset (VS) and a housing wall (GW) of the transmission housing (GG), and the housing wall (GW) extends radially and is located on the side of the transfer gearset (VS) opposite the main gearset (HS).

4. The multi-stage automatic transmission according to claims 2, wherein the structural group is axially located adjacent the transfer gearset (VS), and the first shift element (A) is axially located at least partially between the transfer gearset (VS) and the main gearset (HS).

5. The multi-stage automatic transmission according to claim 2, wherein the structural group is axially located adjacent one of a servomechanism (110) and a disk set (100) of the first shift element (A).

6. The multi-stage automatic transmission according to claim 2, wherein the fifth shift element (E) is axially located between the transfer gearset (VS) and the main gearset (HS) and axially adjacent the transfer gearset (VS).

7. The multi-stage automatic transmission according to claim 6, wherein the output element (230) of the second shift element (B) is coupled to the output element (630) of the sixth shift element (F) and completely radially and axially overlaps the transfer gearset (VS), the first shift element (A) and the fifth shift element (E).

8. The multi-stage automatic transmission according to claim 6, wherein the output element (230) of the second shift element (B) is integral with the first input element of the main gearset (HS) and the output element (630) of the sixth shift element (F), coupled to the first input element of the main gearset (HS) and completely radially and axially overlaps the transfer gearset (VS), the first shift element (A) and the fifth shift element (E).

9. The multi-stage automatic transmission according to claim 2, wherein the fifth shift element (E) is axially located adjacent the main gearset (HS) on a side of the main gearset (HS) opposite the transfer gearset (VS).

10. The multi-stage automatic transmission according to claim 9, wherein the output element (230) of the second shift element (B) is coupled to the output element (630) of the sixth shift element (F) and completely radially and axially overlaps the transfer gearset (VS) and the first shift element (A).

11. The multi-stage automatic transmission according to claim 9, wherein the output element (230) of the second shift element (B) is coupled to the first input element of the main gearset (HS) and the output element (630) of the sixth shift element (F), integral with the first input element of the main gearset (HS), completely radially and axially overlaps the transfer gearset (VS) and the first shift element (A).

12. The multi-stage automatic transmission according to claim 2, wherein when viewed in an axial direction, the disk set (200) of the second shift element (B) is radially located, at least partly, over the disk set (600) of the sixth shift element (F).

13. The multi-stage automatic transmission according to claim 2, wherein when viewed in an axial direction, the disk set (600) of the sixth shift element (F) is radially located, at least partly, above the disk set (200) of the second shift element (B).

14. The multi-stage automatic transmission according to claim 2, wherein the disk set (200) of the second shift element (B) is axially located adjacent the disk set (600) of the sixth shift element (F).

15. The multi-stage automatic transmission according to claim 2, wherein the disk set (200) of the second shift element (B) is radially located, at least partly, about the transfer gearset (VS).

16. The multi-stage automatic transmission according to claim 2, wherein the disk set (200) of the second shift element (B) is located closer to the main gearset (HS) than the disk set (600) of the sixth shift element (F).

17. The multi-stage automatic transmission according to claim 2, wherein a common disk carrier (ZYLBF) supports disks of the second and the sixth shift elements (B, F) and is coupled to the first input element of the main gearset (HS).

18. The multi-stage automatic transmission according to claim 2, wherein the output element (630) of the sixth shift element (F) is coupled to the first input element of the main gearset (HS) via the output element (230) of the second shift element (B).

19. The multi-stage automatic transmission according to claim 2, wherein the sixth shift element (F) and the second shift element (B) are coupled, via a common output element to the first input element of the main gearset (HS).

20. The multi-stage automatic transmission according to claim 2, wherein a pressure chamber (611) and a pressure equalization chamber (612) of a servomechanism (610) of the sixth shift element (F) always rotate at a rotational speed of the first input element of the main gearset (HS).

21. The multi-stage automatic transmission according to claim 2, wherein a pressure chamber (611) and a pressure equalization chamber (612) of a servomechanism (610) of the sixth shift element (F) always rotate at the rotational input speed of the drive input shaft (AN).

22. The multi-stage automatic transmission according to claim 2, wherein a pressure chamber (211) and a pressure equalization chamber (212) of the servomechanism (210) of the second shift element (B) always rotate at a rotational speed of the first element of the main gearset (HS).

23. The multi-stage automatic transmission according to claim 2, wherein a pressure chamber (211) and a pressure equalization chamber (212) of the servomechanism (210) of the second shift element (B) always rotate at a rotational speed of the output element of the transfer gearset (VS).

24. The multi-stage automatic transmission according to claim 2, wherein the disk set (600) and a servomechanism (610) of the sixth shift element (F), are at least substantially located inside a coupling space defined by a disk carrier of the second shift element (B).

25. The multi-stage automatic transmission according to claim 2, wherein the disk set (200) and the servomechanism (210) of the second shift element (B) are at least substantially located inside a coupling space of the second shift element (B) which is formed by a disk carrier of the sixth shift element (F).

26. The multi-stage automatic transmission according to claim 2, wherein the servomechanism (210) of the second shift element (B) and a servomechanisms (610) of the sixth shift element (F) are respectively substantially located on sides of the disk sets (200, 600) of the second and sixth shift elements (B, F) opposite the transfer gearset (VS).

27. The multi-stage automatic transmission according to claim 2, wherein the servomechanism (210) of the second shift element (B) and a servomechanisms (610) of the sixth shift element (F) are respectively at least substantially located on sides of the disk sets (200, 600) of the second and sixth shift elements (B, F) facing the transfer gearset (VS).

28. The multi-stage automatic transmission according to claim 2, wherein the servomechanism (210) of the second shift element (B) is at least substantially located on a side of the disk set (200) of the second shift element (B) opposite the transfer gearset (VS), and a servomechanism (610) of the sixth shift element (F) is at least substantially located on a side of the disk set (600) of the sixth shift element (F) facing the transfer gearset (VS).

29. The multi-stage automatic transmission according to claim 2, wherein the input element (620) of the sixth shift element (F) is mounted on a rotationally fixed hub (GN) of a housing wall (GW) of the transmission housing (GG).

30. The multi-stage automatic transmission according to claim 2, wherein at least one of the output element (630) of the sixth shift element (F) and the output element (230) of the second shift element (F) is mounted on a rotationally fixed hub (GN) of a housing wall (GW) of the transmission housing (GG).

31. The multi-stage automatic transmission according to claim 2, wherein the input element (220) of the second shift element (B) is mounted on the input element (620) of the sixth shift element (F).

32. The multi-stage automatic transmission according to claim 2, wherein the input element (220) of the second shift element (B) is mounted on one of the output element (630) of the sixth shift element (F) and the output element (230) of the second shift element (B).

33. The multi-stage automatic transmission according to claim 2, wherein an input element (130) of the first shift element (A) is coupled to an output element of the transfer gearset (VS) and is mounted on the input element (620) of the sixth shift element (F).

34. The multi-stage automatic transmission according to claim 2, wherein a hub (GN) of a housing wall (GW) of the transmission housing (GG) includes ducts for the supply of at least one of pressure medium and lubricant to at least one of a servomechanism (610, 210, 110) of the sixth, the second and the first shift elements (F, B, A).

35. The multi-stage automatic transmission according to claim 2, wherein a disk set (100) of the first shift element (A) and the disk set (200) of the second shift element (B) are radially located at substantially similar diameters.

36. The multi-stage automatic transmission according to claim 2, wherein the first and the second shift elements (A,B) have a common disk carrier (ZYLAB) which is coupled to an output element of the transfer gearset (VS).

37. The multi-stage automatic transmission according to claim 2, wherein the transfer gearset (VS) further comprises a sun gear (SO_VS), a ring gear (HO_VS) and a carrier (ST_VS), and the carrier (ST_VS) rotatably supports inner and outer planetary gears (P1_VS, P2_VS), such that:

the inner planetary gears (P1_VS) of the transfer gearset (VS) mesh with the sun gear (SO_VS) and the outer planetary gears (P2_VS) of the transfer gearset (VS);

the outer planetary gears (P2_VS) of the transfer gearset (VS) mesh with the inner planetary gears (P1_VS) and the ring gear (HO_VS) of the transfer gearset (VS);

the carrier (ST_VS) of the transfer gearset (VS) constitutes the input element of the transfer gearset (VS) which is integral with the drive input shaft (AN);

the ring gear (HO_VS) of the transfer gearset (VS) constitutes the output element of the transfer gearset (VS) which is connectable with the input elements of the main gearset (HS); and the sun gear (SO_VS) of the transfer gearset (VS) is fixed to the transmission housing (GG), the main gearset (HS) is a two-carrier, four-shaft transmission having a Ravigneaux gearset structure and comprises first and second sun gears (S1_HS, S2_HS), a ring gear (HO_HS), and a carrier (S1_HS) on which long planetary gears (P1_HS) and short planetary gears (P2_HS) are rotatably supported;

the long planetary gears (P1_HS) of the main gearset (HS) mesh with the ring gear (HO_HS) and the first sun gear (S1_HS) of the main gearset (HS);

the short planetary gears (P2_HS) of the main gearset (HS) mesh with the long planetary gears (P1_HS) and the second sun gear (S2_HS) of the main gearset (HS);

the first sun gear (S1_HS) of the main gearset (HS) forms the first input element of the main gearset (HS) and is integral with the output elements (230, 330, 630) of the second, the third and the sixth shift elements (B, C, F);

the second sun gear (S2_HS) of the main gearset (HS) forms the second input element of the main gearset (HS) and is integral with the output element (130) of the first shift element (A);

the carrier (ST_HS) of the main gearset (HS) forms the third input element of the main gearset (HS) and is integral with the output elements (430, 530) of the fourth and the fifth shift elements (B, E), and the ring gear (HO_HS) of the main gearset (HS) forms the output element of the main gearset (HS) and is integral with the drive output shaft (AB).

38. The multi-stage automatic transmission according to claim 2, wherein the transfer gearset (VS) comprises a sun gear (SO_VS), a ring gear (HO_VSD) and a carrier (ST_VS) on which inner and outer planetary gears (P1_VS, P2_VS) are rotatably supported;

the inner planetary gears (P1_VS) of the transfer gearset (VS) mesh with the sun gear (SO_VS) and the outer planetary gears (P2_VS) of the transfer gearset (VD);

the outer planetary gears (P2_VS) of the transfer gearset (VS) mesh with the inner planetary gears (P1_VS) and the ring gear (HO_VS) of the transfer gearset (VS);

the carrier (ST_VS) of the transfer gearset (VS) forms the input element of the transfer gearset (VS) which is integral with the drive input shaft (AN);

the ring gear (HO_VS) of the transfer gearset (VS) forms the output element of the transfer gearset (VS) and is connectable with the first, the second and the third input elements of the main gearset (HS);

the sun gear (SO_VS) of the transfer gearset (VS) is fixed to the transmission housing (GG);

the main gearset (HS) is a two-carrier, four-shaft transmission with two coupled single planetary gearsets, and comprises first and second sun gears (S1_HS, S2_HS), first and second ring gears (H1_HS, H2_HS), a first carrier (ST1_HS) on which first planetary gears (PL_HS) are rotatably supported, and a second carrier (ST2_HS) on which inner and outer planetary gears (PLi_HS, PLa_HS) are rotatably supported;

the first planetary gears (PL_HS) of the main gearset (HS) mesh with the first ring gear (H1_HS) and the first sun gear (S1_HS) of the main gearset (HS);

the inner planetary gears (PLi_HS) of the main gearset (HS) mesh with the outer planetary gears (PLa_HS) and the second sun gear (S2_HS) of the main gearset (HS);

the outer planetary gears (PLa_HS) of the main gearset (HS) mesh with the inner planetary gears (PLI_HS) and the second ring gear (H2_HS) of the main gearset (HS);

the first sun gear (S1_HS) and the second carrier (ST2_HS) of the main gearset (HS) are coupled to form the first input element of the main gearset (HS), and are integral with second, third and sixth output elements (230, 330, 630) of the second, the third and the sixth shift elements (B, C, F);

the second sun gear (S2_HS) of the main gearset (HS) forms the second input element of the main gearset (HS) and is integral with the output element (130) of the first shift element (A);

the first carrier (ST1_HS) and the second ring gear (S2_HS) of the main gearset (HS) are coupled to form the third input element of the main gearset (HS), and are integral with the fourth and the fifth output elements (430, 530) of the fourth and the fifth shift elements (D, E); and the first ring gear (H1_HS) of the main gearset (HS) forms the output element of the main gearset (HS) and is integral with the drive output shaft (AB).

39. The multi-stage automatic transmission according to claim 2, wherein the transfer gearset (VS) comprises a sun gear (SO_VS), a ring gear (HO_VS) and a carrier (ST_VS), the carrier (ST_VS) rotatably supports inner and outer planetary gears (P1_VS, P2_VS);

the inner planetary gears (P1_VS) of the transfer gearset (VS) mesh with the sun gear (SO_VS) and the outer planetary gears (P2_VS) of the transfer gearset (VS);

the outer planetary gears (P2_VS) of the transfer gearset (VS) mesh with the inner planetary gears (P1_VS) and the ring gear (HO_VS) of the transfer gearset (VS);

the carrier (ST_VS) of the transfer gearset (VS) forms the input element of the transfer gearset (VS) which is integral with the drive input shaft (AN);

the ring gear (HO_VS) of the transfer gearset (VS) forms the output element of the transfer gearset (VS) which is connectable with the first, the second and the third input elements of the main gearset (HS);

the sun gear (SO_VS) of the transfer gearset (VS) is fixed to the transmission housing (GG);

the main gearset (HS) is a three-carrier, five-shaft transmission with first second and third sun gears (S1_HS, S2_HS, S3_HS), a coupled first ring gear (H13_HS), a second ring gear (H2_HS), a coupled first carrier (ST13_HS) rotatably supporting long planetary gears (Pl3_HS) and a second carrier (ST2_HS) rotatably supporting short planetary gears (P2_HS);

the third sun gear (S3_HS) of the main gearset (HS) is axially located between the second and the first sun gears (S2_HS, S1_HS) of the main gearset (HS);

the long planetary gears (P13_HS) of the main gearset (HS) mesh with the coupled first ring gear (H13_HS) and the first and the third sun gears (S1_HS, S3_HS) of the main gearset (HS);

the short planetary gears (P2_HS) of the main gearset (HS) mesh with the second ring gear (H2_HS) and the second sun gear (S2_HS) of the main gearset (HS);

the second sun gear (S2_HS) of the main gearset (HS) is fixed to the third sun gear (S3_HS) of the main gearset (HS);

the first sun gear (S1_HS) of the main gearset (HS) forms the first input element of the main gearset (HS) and is integral with the output elements (230, 330, 630) of the second, the third and the sixth shift elements (B, C, F);

the coupled first ring gear (H13_HS) of the main gearset (HS) forms the second input element of the main gearset (HS) and is integral with the output element (130) of the first shift element (A);

the second carrier (ST2_HS) of the main gearset (HS) forms the third input element of the main gearset (HS) and is integral with the output elements (430, 530) of the fourth and the fifth shift elements (D, E); and the second ring gear (H2_HS) of the main gearset (HS) is fixed to the coupled first carrier (ST13_HS) of the main gearset (HS) to form the output element of the main gearset (HS), which is integral with the drive output shaft (AB).

40. The multi-stage automatic transmission according to claim 39, wherein the coupled first carrier (ST13_HS) of the main gearset (HS) has a carrier plate which radially extends and is axially located between the first and the third sun gears (S1_HS, S3_HS) of the main gearset (HS), a hub is rotationally fixed on the carrier plate of the first carrier (ST13_HS) of the main gearset (HS) and is coupled to the drive output shaft (AB), which axially passes centrally through the first sun gear (S1_HS) of the main gearset (HS).

41. The multi-stage automatic transmission according to claim 39, wherein the long planetary gears (P13_HS) of the main gearset (HS) are stepped planetary gears.

42. The multi-stage automatic transmission according to claim 2, wherein drive passed from the drive input shaft (AN) to the drive output shaft (AB) through selective engagement of the first, the second, the third, the fourth, the fifth and the sixth shift elements (A, B, C, D, E, F) to produce at least first, second, third, fourth, fifth, sixth, seventh and eighth forward speeds such in order to shift from one gear to one of a next higher gear and a next lower gear, only a single one of the first, the second, the third, the fourth, the fifth and the sixth shift elements (A, B, C, D, E, F) is one of engaged and disengaged, the first and the fourth shift elements (A, D) are engaged to produce the first forward gear speed, the first and the third shift elements (A, C) are engaged to produce the second forward gear speed, the first and the second shift elements (A, B) are engaged to produce the third forward gear speed, the first and the sixth shift elements (A, F) are engaged to produce the fourth forward gear speed, the first and the fifth shift elements (A, E) are engaged to produce the fifth forward gear speed, the fifth and the sixth shift elements (E, F) are engaged to produce the sixth forward gear speed, the second and the fifth shift elements (B, E) are engaged to produce the seventh forward gear speed, the third and the fifth shift elements (C, E) are engaged to produce the eighth forward gear speed, and the fourth shift element (D) and one of the second shift element (B) and the sixth shift element (F) are engaged to produce a reverse gear speed.

* * * * *